United States Patent
Allen et al.

(10) Patent No.: US 11,926,929 B2
(45) Date of Patent: Mar. 12, 2024

(54) MELT BLOWN NONWOVEN MATERIALS AND FIBERS INCLUDING STARCH-BASED POLYMERIC MATERIALS

(71) Applicant: BiologiQ, Inc., Idaho Falls, ID (US)

(72) Inventors: Donald R. Allen, Idaho Falls, ID (US); Leopoldo V. Cancio, Vero Beach, FL (US); Fehime Vatansever Ozaltun, Idaho Falls, ID (US); Bradford LaPray, Idaho Falls, ID (US); Bruno R. Pereira, Houston, TX (US); Kenneth L. Kramer, Columbus, IN (US); Steven P. Sherman, Cedar Hills, UT (US)

(73) Assignee: BIOLOGIQ, INC, Idaho Falls, ID (US)

( * ) Notice: Subject to any disclaimer, the term of this patent is extended or adjusted under 35 U.S.C. 154(b) by 49 days.

(21) Appl. No.: 17/327,577

(22) Filed: May 21, 2021

(65) Prior Publication Data
US 2021/0269944 A1    Sep. 2, 2021

Related U.S. Application Data

(63) Continuation-in-part of application No. 16/925,747, filed on Jul. 10, 2020, and a continuation-in-part of
(Continued)

(51) Int. Cl.
*D01D 5/098* (2006.01)
*D01F 9/00* (2006.01)

(52) U.S. Cl.
CPC ............ *D01D 5/0985* (2013.01); *D01F 9/00* (2013.01); *D10B 2401/022* (2013.01); *D10B 2401/041* (2013.01); *D10B 2401/12* (2013.01)

(58) Field of Classification Search
CPC .................................................. D01D 5/0985
See application file for complete search history.

(56) References Cited

U.S. PATENT DOCUMENTS 3,270,874 A    9/1966 Hilton
3,865,603 A    2/1975 Szymanski et al.
(Continued)

FOREIGN PATENT DOCUMENTS

BR    PI0715273 A2    6/2013
BR    PI0715276 A2    6/2013
(Continued)

OTHER PUBLICATIONS

Office Action received for U.S. Appl. No. 15/481,806, dated Jul. 29, 2020.
(Continued)

*Primary Examiner* — Arrie L Reuther
(74) *Attorney, Agent, or Firm* — Workman Nydegger

(57) ABSTRACT

Described are very high molecular weight (e.g., over 2 million, such as 3-20 million g/mol) starch-based materials, and formulations including such, which can be spun in spunbond, melt blown, yarn, or similar processes. Even with such very high molecular weights, the formulations can be processed at commercial line speeds, with spinneret shear viscosities of 1000 sec$^{-1}$, without onset of melt flow instability. The starch-based material can be blended with one or more thermoplastic materials having higher melt flow index value(s), which serve as a diluent and plasticizer, allowing the very viscous starch-based component to be spun under such conditions. The particular melt flow index characteristics of the thermoplastic diluent material can be selected based on what type of process is being used (e.g., spunbond, melt blown, yarn, etc.). The starch-based material may
(Continued)

exhibit high shear sensitivity, strain hardening behavior, and/or very high critical shear stress (e.g., at least 125 kPa).

23 Claims, 24 Drawing Sheets

Related U.S. Application Data application No. 16/925,952, filed on Jul. 10, 2020, now Pat. No. 11,359,088, and a continuation-in-part of application No. 16/925,705, filed on Jul. 10, 2020, which is a continuation-in-part of application No. 16/425,397, filed on May 29, 2019, now Pat. No. 11,149,144, and a continuation-in-part of application No. 16/391,909, filed on Apr. 23, 2019, now Pat. No. 11,111,355, and a continuation-in-part of application No. 15/691,588, filed on Aug. 30, 2017, now Pat. No. 11,046,840, which is a continuation-in-part of application No. 15/481,823, filed on Apr. 7, 2017, now Pat. No. 10,919,203, and a continuation-in-part of application No. 15/481,806, filed on Apr. 7, 2017, now Pat. No. 10,995,201, which is a continuation-in-part of application No. 14/853,725, filed on Sep. 14, 2015, now abandoned, and a continuation-in-part of application No. 14/853,780, filed on Sep. 14, 2015, now abandoned.

(60) Provisional application No. 63/138,161, filed on Jan. 15, 2021, provisional application No. 63/033,676, filed on Jun. 2, 2020, provisional application No. 62/962,706, filed on Jan. 17, 2020, provisional application No. 62/939,460, filed on Nov. 22, 2019, provisional application No. 62/872,582, filed on Jul. 10, 2019, provisional application No. 62/442,432, filed on Jan. 4, 2017, provisional application No. 62/440,399, filed on Dec. 29, 2016, provisional application No. 62/187,231, filed on Jun. 30, 2015.

(56) References Cited

U.S. PATENT DOCUMENTS

| | | |
|---|---|---|
| 4,016,117 A | 4/1977 | Griffin |
| 4,139,699 A | 2/1979 | Hernandez |
| 4,243,480 A | 1/1981 | Hernandez |
| 4,689,106 A | 8/1987 | Becht et al. |
| 4,853,168 A | 8/1989 | Eden et al. |
| 5,026,745 A | 6/1991 | Weil |
| 5,095,054 A | 3/1992 | Lay et al. |
| 5,262,458 A | 11/1993 | Bastioli et al. |
| 5,314,934 A | 5/1994 | Tomka |
| 5,352,716 A | 10/1994 | Chapman et al. |
| 5,362,777 A | 11/1994 | Tomka |
| 5,449,708 A | 9/1995 | Schiltz |
| 5,459,258 A | 10/1995 | Merrill et al. |
| 5,461,093 A | 10/1995 | Yoo et al. |
| 5,462,983 A | 10/1995 | Bloembergen et al. |
| 5,510,401 A | 4/1996 | Dehennau et al. |
| 5,714,445 A | 2/1998 | Trinh et al. |
| 5,810,961 A | 9/1998 | Andersen et al. |
| 6,211,325 B1 | 4/2001 | Sun et al. |
| 6,472,497 B2 | 10/2002 | Loercks et al. |
| 6,605,657 B1 | 8/2003 | Favis et al. |
| 6,709,526 B1 | 3/2004 | Bailey et al. |
| 6,783,854 B2 | 8/2004 | Bond |
| 6,818,295 B2 | 11/2004 | Bond et al. |
| 6,841,597 B2 | 1/2005 | Bastioli et al. |
| 6,844,380 B2 | 1/2005 | Favis et al. |
| 6,946,506 B2 | 9/2005 | Bond et al. |
| 7,608,649 B2 | 10/2009 | Sun et al. |
| 7,666,261 B2 | 2/2010 | Bailey et al. |
| 7,740,952 B2 | 6/2010 | Hausmann et al. |
| 7,998,888 B2 | 8/2011 | Shi et al. |
| 8,188,185 B2 | 5/2012 | Wang et al. |
| 8,232,348 B2 | 7/2012 | Changping |
| 8,283,006 B2 | 10/2012 | Wang et al. |
| 8,329,501 B1 | 12/2012 | Robinson et al. |
| 8,329,601 B2 | 12/2012 | Shi et al. |
| 8,466,337 B2 | 6/2013 | Wang et al. |
| 8,470,222 B2 | 6/2013 | Shi et al. |
| 8,802,754 B2 | 8/2014 | Nie et al. |
| 8,807,254 B2 | 8/2014 | Manus |
| 8,889,945 B2 | 11/2014 | Wang et al. |
| 8,927,611 B2 | 1/2015 | Voolapalli et al. |
| 8,927,617 B2 | 1/2015 | Funk et al. |
| 8,969,224 B2 | 3/2015 | Masuda et al. |
| 9,023,918 B1 | 5/2015 | Mistry et al. |
| 9,056,968 B2 | 6/2015 | Matsuo |
| 9,273,207 B2 | 3/2016 | Bastioli |
| 9,327,438 B2 | 5/2016 | Wang et al. |
| 9,464,188 B2 | 10/2016 | Wang et al. |
| 9,884,471 B2 | 2/2018 | Neuman et al. |
| 9,925,706 B2 | 3/2018 | Bond et al. |
| 10,131,783 B2 | 11/2018 | Schmidt et al. |
| 10,214,634 B2 | 2/2019 | Lapray et al. |
| 10,239,292 B2 | 3/2019 | Nissenbaum et al. |
| 10,494,521 B2 | 12/2019 | Lu et al. |
| 10,752,759 B2 | 8/2020 | Lapray et al. |
| 10,906,209 B2 | 2/2021 | Kann |
| 10,919,203 B2 | 2/2021 | Lapray et al. |
| 10,920,044 B2 | 2/2021 | Lapray et al. |
| 11,111,355 B2 | 9/2021 | Lapray et al. |
| 11,111,363 B2 | 9/2021 | Lapray et al. |
| 11,149,144 B2 | 10/2021 | Lapray et al. |
| 11,359,088 B2 | 6/2022 | Allen et al. |
| 11,674,014 B2 | 6/2023 | Lapray et al. |
| 11,674,018 B2 | 6/2023 | Lapray et al. |
| 2002/0006989 A1 | 1/2002 | Bastioli et al. |
| 2002/0168517 A1 | 11/2002 | Husemann et al. |
| 2002/0168518 A1 | 11/2002 | Bond et al. |
| 2002/0188041 A1 | 12/2002 | Bond et al. |
| 2003/0077444 A1 | 4/2003 | Bond et al. |
| 2003/0119949 A1 | 6/2003 | Favis et al. |
| 2003/0166779 A1 | 9/2003 | Khemani |
| 2003/0203196 A1 | 10/2003 | Trokhan et al. |
| 2007/0129468 A1 | 6/2007 | Bastioli et al. |
| 2008/0103232 A1 | 5/2008 | Lake et al. |
| 2008/0287592 A1 | 11/2008 | Favis et al. |
| 2009/0042468 A1 | 2/2009 | Suzuki et al. |
| 2009/0048368 A1 | 2/2009 | Bash et al. |
| 2009/0311455 A1 | 12/2009 | Bastioli et al. |
| 2009/0324917 A1 | 12/2009 | Wang et al. |
| 2010/0003434 A1 | 1/2010 | Bastioli et al. |
| 2010/0048764 A1 | 2/2010 | Gijsman et al. |
| 2010/0115836 A1 | 5/2010 | Julian |
| 2010/0159777 A1 | 6/2010 | Wang et al. |
| 2010/0305240 A1 | 12/2010 | Schmidt et al. |
| 2010/0311874 A1 | 12/2010 | Mentink et al. |
| 2010/0311905 A1 | 12/2010 | Mentink et al. |
| 2011/0287929 A1 | 11/2011 | Smith et al. |
| 2012/0048769 A1 | 3/2012 | Sivik et al. |
| 2012/0059097 A1 | 3/2012 | Liao et al. |
| 2012/0077905 A1 | 3/2012 | Chen et al. |
| 2012/0130331 A1 | 5/2012 | Wang et al. |
| 2012/0139154 A1 | 6/2012 | Huneault et al. |
| 2012/0220697 A2 | 8/2012 | Deaner et al. |
| 2012/0283364 A1 | 11/2012 | Sarazin et al. |
| 2012/0316257 A1 | 12/2012 | Bastioli |
| 2013/0001289 A1 | 1/2013 | Tedford |
| 2013/0052901 A1 | 2/2013 | Bond et al. |
| 2013/0136879 A1 | 5/2013 | Capuzzi |
| 2013/0157031 A1 | 6/2013 | Wang et al. |
| 2013/0157032 A1 | 6/2013 | Wang et al. |
| 2014/0011921 A1 | 1/2014 | Bash et al. |
| 2014/0079935 A1 | 3/2014 | Broyles |
| 2014/0087980 A1 | 3/2014 | Mitrovich et al. |
| 2014/0272370 A1 | 9/2014 | Broyles et al. |
| 2015/0045454 A1 | 2/2015 | Kong et al. |
| 2015/0166746 A1 | 6/2015 | Brule et al. |
| 2016/0107426 A1 | 4/2016 | Leufgens |

(56) References Cited

U.S. PATENT DOCUMENTS

| | | |
|---|---|---|
| 2017/0002184 A1 | 1/2017 | Lapray et al. |
| 2017/0002185 A1 | 1/2017 | Lapray et al. |
| 2017/0210889 A1 | 7/2017 | Lapray et al. |
| 2017/0218184 A1 | 8/2017 | Lapray et al. |
| 2017/0283597 A1 | 10/2017 | Lapray et al. |
| 2017/0348933 A1 | 12/2017 | Lundell et al. |
| 2017/0355179 A1 | 12/2017 | Sehanobish et al. |
| 2017/0362418 A1 | 12/2017 | Lapray et al. |
| 2018/0100060 A1 | 4/2018 | Lapray et al. |
| 2019/0194426 A1 | 6/2019 | Lapray et al. |
| 2019/0256681 A1 | 8/2019 | Lapray et al. |
| 2019/0276664 A1 | 9/2019 | Lapray et al. |
| 2019/0315942 A1 | 10/2019 | Lapray et al. |
| 2019/0315947 A1 | 10/2019 | Lapray et al. |
| 2019/0330770 A1 | 10/2019 | Shi et al. |
| 2020/0339766 A1 | 10/2020 | Chateau et al. |
| 2020/0339781 A1 | 10/2020 | Lapray et al. |
| 2020/0339784 A1 | 10/2020 | Lapray et al. |
| 2020/0339803 A1 | 10/2020 | Allen et al. |
| 2020/0377705 A1 | 12/2020 | LaPray et al. |
| 2021/0060828 A1 | 3/2021 | Pimenta |
| 2021/0277207 A1 | 9/2021 | Allen et al. |
| 2021/0277556 A1 | 9/2021 | Allen et al. |
| 2021/0324186 A1 | 10/2021 | Lapray et al. |
| 2021/0363335 A1 | 11/2021 | Lapray et al. |
| 2022/0227949 A1 | 7/2022 | Allen et al. |

FOREIGN PATENT DOCUMENTS

| | | |
|---|---|---|
| BR | PI0817531 B1 | 8/2019 |
| BR | 112013002928 B1 | 6/2020 |
| BR | 112020012930 A2 | 12/2020 |
| BR | 102020022378 A2 | 5/2022 |
| CA | 1031088 A | 5/1978 |
| CA | 2827702 A1 | 3/2014 |
| CN | 1312838 A | 9/2001 |
| CN | 1603361 A | 4/2005 |
| CN | 101171292 A | 4/2008 |
| CN | 101589097 A | 11/2009 |
| CN | 101805499 A | 8/2010 |
| CN | 101932647 A | 12/2010 |
| CN | 102066467 A | 5/2011 |
| CN | 102153786 A | 8/2011 |
| CN | 102329436 A | 1/2012 |
| CN | 102639594 A | 8/2012 |
| CN | 102850626 A | 1/2013 |
| CN | 103087482 A | 5/2013 |
| CN | 103289165 A | 9/2013 |
| CN | 103627153 A | 3/2014 |
| CN | 103819794 A | 5/2014 |
| CN | 103987504 A | 8/2014 |
| CN | 103998195 A | 8/2014 |
| CN | 105531115 A | 4/2016 |
| CN | 105670239 A | 6/2016 |
| CN | 105966014 A | 9/2016 |
| CN | 107709457 A | 2/2018 |
| CN | 107793619 A | 3/2018 |
| CN | 107835837 A | 3/2018 |
| CN | 107922662 A | 4/2018 |
| CN | 108276744 A | 7/2018 |
| DE | 2917219 A1 | 11/1980 |
| EP | 0326517 A1 | 8/1989 |
| EP | 0497706 A1 | 8/1992 |
| EP | 0786328 A2 | 7/1997 |
| EP | 1930487 A1 | 6/2008 |
| EP | 2380932 A1 | 10/2011 |
| EP | 2762307 A1 | 8/2014 |
| GB | 2272699 A | 5/1994 |
| JP | 49-055740 A | 5/1974 |
| JP | 50-086543 A | 7/1975 |
| JP | 04-202567 A | 7/1992 |
| JP | 07-126449 A | 5/1995 |
| JP | 07-258488 A | 10/1995 |
| JP | 08-509750 A | 10/1996 |
| JP | 09-041224 A | 2/1997 |
| JP | 10-259083 A | 9/1998 |
| JP | 11-322962 A | 11/1999 |
| JP | 2003-073539 A | 3/2003 |
| JP | 2003-518541 A | 6/2003 |
| JP | 2003-335966 A | 11/2003 |
| JP | 2004-002613 A | 1/2004 |
| JP | 2004-182877 A | 7/2004 |
| JP | 2004-202567 | 7/2004 |
| JP | 3539955 B2 | 7/2004 |
| JP | 2005-089718 A | 4/2005 |
| JP | 2005-255744 A | 9/2005 |
| JP | 2005-264111 A | 9/2005 |
| JP | 2008-013602 A | 1/2008 |
| JP | 4202567 | 12/2008 |
| JP | 2009-185305 A | 8/2009 |
| JP | 2009-542870 A | 12/2009 |
| JP | 2010-150305 A | 7/2010 |
| JP | 2010-260923 A | 11/2010 |
| JP | 2011-042032 A | 3/2011 |
| JP | 2011-511120 A | 4/2011 |
| JP | 2011-511121 A | 4/2011 |
| JP | 2011-213836 A | 10/2011 |
| JP | 2012-148507 A | 8/2012 |
| JP | 2013-509495 A | 3/2013 |
| JP | 2013-147609 A | 8/2013 |
| JP | 5544303 B2 | 7/2014 |
| JP | 2014-518956 A | 8/2014 |
| JP | 2018-502744 A | 2/2018 |
| JP | 2018-525467 A | 9/2018 |
| JP | 6949736 B2 | 10/2021 |
| KR | 10-2013-0132807 A | 12/2013 |
| KR | 2013-0132807 A | 12/2013 |
| TW | 201538529 A | 10/2015 |
| WO | 00/17270 A1 | 3/2000 |
| WO | 01/48078 A1 | 7/2001 |
| WO | 03/14164 A1 | 2/2003 |
| WO | 2006/116861 A1 | 11/2006 |
| WO | 2007/027163 A2 | 3/2007 |
| WO | 2009/073197 A1 | 6/2009 |
| WO | 2009/103052 A1 | 8/2009 |
| WO | 2011/020170 A1 | 2/2011 |
| WO | 2011/054896 A1 | 5/2011 |
| WO | 2012/088585 A1 | 7/2012 |
| WO | 2013/116945 A1 | 8/2013 |
| WO | 2014/089321 A1 | 6/2014 |
| WO | 2014/190395 A1 | 12/2014 |
| WO | 2014/190935 A1 | 12/2014 |
| WO | 2015/028943 A1 | 3/2015 |
| WO | 2016/109196 A1 | 7/2016 |
| WO | 2016/134994 A1 | 9/2016 |
| WO | 2016/198652 A1 | 12/2016 |
| WO | 2017/004201 A1 | 1/2017 |
| WO | 2018/125897 A1 | 7/2018 |
| WO | 2018/187784 A1 | 10/2018 |
| WO | 2019/043134 A1 | 3/2019 |
| WO | 2019/108056 A1 | 6/2019 |
| WO | 2020/106654 A1 | 5/2020 |

OTHER PUBLICATIONS

Office Action received for U.S. Appl. No. 15/481,806, dated Oct. 12, 2018.

Office Action received for U.S. Appl. No. 15/481,823, dated Dec. 9, 2019.

Office Action received for U.S. Appl. No. 15/481,823, dated Feb. 28, 2019.

Office Action received for U.S. Appl. No. 15/481,823, dated Oct. 12, 2018.

Office Action received for U.S. Appl. No. 15/628,379, dated Apr. 30, 2018.

Office Action received for U.S. Appl. No. 15/691,588, dated Jan. 2, 2019.

Office Action received for U.S. Appl. No. 15/836,555, dated Jul. 14, 2020.

Office Action received for U.S. Appl. No. 16/287,884, dated Jul. 30, 2020.

Office Action received for U.S. Appl. No. 16/391,909 , dated Dec. 1, 2020.

(56) References Cited

OTHER PUBLICATIONS

Office Action received for U.S. Appl. No. 16/456,295, dated Jul. 22, 2020.
Office Action received for U.S. Appl. No. 16/456,303, dated Apr. 9, 2020.
Ohtake, et al., "The Biodegradability of Polyethylene", Material Life, vol. 6, Issue 3, 1994, pp. 125-133.
Ojeda, et al., "Degradability of linear polyolefins under natural weathering, Polymer Degradation and Stability," 2011, pp. 703-707.
Ojeda, Telmo, et al., "Polymer Degradation and Stability" Available as early as Dec. 16, 2010 at www.elsevier.com/locat/polydegstab, 5 pages.
Oluz, Zehra and Teoman Tincer, "Additives for ultraviolet-induced oxidative degradation of low-density polyethylene", J. Appl. Polym. Sci., 133, 43354, Jan. 18, 2016, Wiley Online Library, DOI: 10.1002/app.43354, Accessed Apr. 21, 2018.
PCT International Search Report and the Written Opinion for Application No. PCT/US/18/026610, dated Jul. 13, 2018, 10 pages.
PCT International Search Report and the Written Opinion for Application No. PCT/US17/68492, dated Mar. 16, 2018, 10 pages.
PCT International Search Report and Written Opinion for PCT/US2018/026610 dated Jul. 13, 2018.
PCT Search Report and Written Opinion dated Sep. 14, 2016 for PCT Application No. PCT/US16/40092, 8 pages.
PCT Search Report and Written Opinion dated Sep. 15, 2016 for PCT Application No. PCT/US16/40104, 10 pages.
Pearce "Biodegradable plastic bags carry more ecological harm than good" The Guardian, Jun. 18, 2009.
Requirement for Restriction/Election received for U.S. Appl. No. 16/391,909, dated Sep. 8, 2020.
Ruchuan et al., "Study On Starch-Polyethylene Film", Journal of Tianjin University, No. 2, 1990, pp. 23-29.
S.K. Nayak "Biodegradable PBAT/Starach Nanocomposites" Polymer-Plastics Technology and Engineering, 2010, pp. 1406-1418.
Santos, R. A. L. et al., "Starch/Poly (Butylene Adipate-Co-Terephthalate)/Montmorillonite Films Produced By Blow Extrusion". Quim. Nov. 2014, 37(6), 937-942. (Year: 2014).
Sashiwa et al., "Microbial Degradation Behavior in Seawater of Polyester Blends Containing Poly(3-hydroxybutyrate-co-3-hydroxyhexanoate) (PHBHHx),"Mar. Drugs, vol. 16, 2018, 34, 11 pages.
Schwach et al., "Starch-based biodegradable blends: morphology and interface properties", 2004, Polymer International, vol. 53, pp. 2115-2124, DOI: 10.1002/pi.1636.
Shahin, "In-situ Nano Fibrillation of Polyethylene Terephthalate (PET) in Polypropylene (PP) through Spunbond Process,"Department of Mechanical and Industrial Engineering, 2019, 89 pages.
Shang, Jing, et al. "Photocatalytic Degradation of Polystyrene Plastic under Fluorescent Light." Environmental Science & Technology, Sep. 5, 2003, 37 (19), pp. 4494-4499. American Chemical Society, DOI: 10.1021/es0209464. Accessed Apr. 20, 2018.
Shogren et al. "Biodegradation of starch/polylactic acid/poly(hydroxyester-ether) composite bars in soil" Polymer Degradation and Stability 79 (2003) 405-411.
Sumathi, Tirupati et al., "Production of Laccase By Cochliobolus sp. Isolated from Plastic Dumped Soils and Their Ability to Degrade Low Molecular Weight PVC", Biochemistry Research International 2016 (2016): 9519527. PMC. Web. Apr. 16, 2018.
Tang, et al., "Recent Advances in Starch, Polyvinyl Alcohol Based Polymer Blends, Nanocomposites and their Biodegradability" Carbohydrate Polymers, 2011, vol. 85, pp. 7-16.
Tena-Salcido et al. "Effect of Morphology on the Biodegradation of Thermoplastic Starch in LDPE/TPS Blends" Polymer Bulletin, vol. 60, No. 5, Jan. 30, 2008, pp. 677-688.
Thakore, I.M., et al., "Studies on Biodegradability, morphology and thermo-mechanical properties of LDPE/modified starch blends" published in The European Polymer Journal, vol. 37 2001, pp. 151-160.
The SPC Position Against Biodegradability Additives for Petroleum-Based Plastics Sustainable Packaging Coalition, http://www.sustainablepackaging.org/content/?type=5&id=position-against-biodegradability-additives-for-petroleum-based-plastics Retreived on Sep. 19, 2017, 5 pages.
Thryft, Ann R, "Biodegradable Plastics Standard to Bust Landfill Waste", ENSO Plastics, Nov. 15, 2011. http://ensoplastics.com/theblog/?p=535, Accessed Apr. 23, 2018.
Tokiwa, et al., "Biodegradability of Plastics" in the International Journal of Molecular Sciences, Aug. 26, 2009, vol. 10, pp. 3722-3742.
Transition Metal Salts, Oxo-biodegradable Plastics Association, http://www.biodeg.org/index.html. Accessed Apr. 20, 2018.
Turley "Coca-Cola Collaborates on Bio-PET Project" ChemistryWorld, Jun. 11, 2012, accessed Apr. 6, 2017 at https://www.chemistryworld.com/news/coca-cola-collaborates-on-bio-pet-project/5091.article, 2 pages.
U.S. Appl. No. 15/481,823, filed Apr. 7, 2017, LaPray.
U.S. Application Filed on Apr. 7, 2017, by LaPray, U.S. Appl. No. 15/481,806.
U.S. Application Filed on Apr. 23, 2019, by LaPray, U.S. Appl. No. 16/391,909.
U.S. Application Filed on Aug. 21, 2020, by LaPray, U.S. Appl. No. 16/999,542.
U.S. Application Filed on Aug. 30, 2017, by LaPray., U.S. Appl. No. 15/691,588.
U.S. Application Filed on Feb. 27, 2019, by LaPray, U.S. Appl. No. 16/287,884.
U.S. Application Filed on Jun. 20, 2017, by LaPray, U.S. Appl. No. 15/628,379.
U.S. Patent Application filed on Jul. 10, 2020 by LaPray, U.S. Appl. No. 16/925,705.
"Succeeded in developing a pregelatinized rice manufacturing device without cooking rice", Yamagata University press release material, Aug. 6, 2013. Partial English translation provided.
Abera, Getnet, et al. "The effect of plasticizers on thermoplastic starch films developed from the indigenous Ethiopian tuber crop Anchote (*Coccinia abyssinica*) starch." International journal of biological macromolecules 155 (2020): 581-587.
Fourati, Yesmine, et al. "One-step processing of plasticized starch/cellulose nanofibrils nanocomposites via twin-screw extrusion of starch and cellulose fibers." Carbohydrate polymers 229 (2020): 115554.
Galimzyanova, Rezeda Yu, et al. "Study of the Properties of Compositions Based on Polylactic Acid and Thermoplastic Starch." Key Engineering Materials. vol. 899. Trans Tech Publications Ltd, 2021.
Li, Wei, and Zhifeng Zhu. "Effects of some amino plasticizers on plasticization of starch sizing agents [J]." Journal of Textile Research 5 (2011).
Machine translation of CN 103087482 (Year: 2013).
Müller, Dieter H., and Andreas Krobjilowski. "Meltblown fabrics from biodegradable polymers." International Nonwovens Journal 1 (2001): 1558925001os-1000106.
Non-Final Office Action received for U.S. Appl. No. 16/925,952, dated Oct. 15, 2021, 9 pages.
U.S. Appl. No. 15/481,823.
U.S. Appl. No. 16/925,705.
U.S. Appl. No. 16/925,747.
Final Office Action received for U.S. Appl. No. 16/925,705, dated Jan. 18, 2022, 12 pages.
Final Office Action received for U.S. Appl. No. 16/925,747, dated Jan. 18, 2022, 12 pages.
Notice of Allowance received for U.S. Appl. No. 16/925,952, dated Feb. 9, 2022, 7 pages.
U.S. Appl. No. 15/836,555, filed Dec. 8, 2017.
U.S. Appl. No. 16/925,705, filed Jul. 10, 2020.
U.S. Appl. No. 16/925,747, filed Jul. 10, 2020.
U.S. Appl. No. 17/327,536, filed May 21, 2021.
U.S. Appl. No. 17/327,577, filed May 21, 2021.
U.S. Appl. No. 17/327,590, filed May 21, 2021.
U.S. Appl. No. 63/033,676, filed Jun. 2, 2020.

(56) References Cited

OTHER PUBLICATIONS

Sumathi et al., "Production of laccase by *Cochliobolus* sp. isolated from plastic dumped soils and their ability to degrade low molecular weight PVC," Biochemistry research international 2016, vol. 2018, Jan. 1, 2016, pp. 1-10.
Non-Final Office Action received for U.S. Appl. No. 16/925,705, dated Aug. 23, 2022, 12 pages.
Non-Final Office Action received for U.S. Appl. No. 16/925,747, dated Aug. 23, 2022, 12 pages.
Otake et al., Development of biodegradable LDPE compound and the estimation of its biodegradability and its application to field of civil engineering, Oct. 10, 1996, Journal of the Chemical Society of japan, p. 853-860, Issue 298, https://www.osti.gov/etdeweb/biblio/438201, Nov. 8, 2022.
U.S. Patent Application filed on Jul. 10, 2020 by LaPray, U.S. Appl. No. 16/925,747.
U.S. Patent Application filed on Jul. 10, 2020 by LaPray, U.S. Appl. No. 16/925,952.
Van Soest et al. "Crystallinity in Starch Plastics: Consequences for Material Properties" Trends in Biotechnology, vol. 15, No. 6, Jun. 1, 1997, pp. 208-213.
Vargha et al., "Behavior of Polyethylene Films in Soil, Periodica Polytechnica Chemical Engineering," DOI: 10.3311/ pp. ch. 8281, Creative Commons Attribution, 2016, pp. 60-68.
Vargha, et al., "Behavior of Polyethylene Films in Soil" published in Periodica Polytechnica Chemical Engineering, Nov. 5, 2015 pp. 60-68.
Wootthikanokkhan, et al., "Effect of Blending Conditions on Mechanical, Thermal, and Rheological Properties of Plasticized Poly(lactic acid)/Maleated Thermoplastic Starch Blends," Journal of Applied Polymer Science, 2012, vol. 124, pp. 1012-1019.
Yoshida, et al., "A Bacterium that Degrades and Assimilates Poly(ehylene terphthalate)" Sciense Magazine vol. 351 Issue 6278 Mar. 11, 2016 pp. 1196-1199.
Yu et al., "Morphology and Mechanical Properties of Immiscible Polyethylene/Polyamide12 Blends Prepared by High Shear Processing," Chinese Journal of Polymer Science, 2017, 35(9):1132-1142.
Zhang et al., "Retrogradalion and Antiplasticization of Thermoplastic Starch," Richardson Centre for Functional Foods and Nutraceuticals, University of Manitoba, www.intechopen.com, 19 pages. 2012.
Zhang, et al. "Retrogradation and Antiplasticization of Thermoplastic Starch" Mar. 2012.
Zhong et al., "Biodegradable polymers and green-based antimicrobial packaging materials: A mini-review," Advanced Industrial and Engineering Polymer Research, vol. 3, 2020, pp. 27-35.
"Novel Soil Biodegradable Mulch Film" Radical plastics, Excerpts from the Final Technical Report. Feb. 10, 2021.
Notice of Allowance received for U.S. Appl. No. 16/925,952, dated May 16, 2022, 2 pages.
"Practical Technology on Improving Plastic Function", Edition 1,Author Xu, Tongkao, p. 99, China Light Industry Press.
Non-Final Office Action received for U.S. Appl. No. 17/358,619, dated Jan. 30, 2023, 9 pages.
Restriction Requirement received for U.S. Appl. No. 17/327,536, dated Dec. 2, 2022, 7 pages.
Song et al., "Starch nanoparticle formation via reactive extrusion and related mechanism study", Carbohydrate Polymers, vol. 85, 2011, pp. 208-214.
Restriction Requirement received for U.S. Appl. No. 17/327,590, dated Dec. 2, 2022, 6 pages.
Non-Final Office Action received for U.S. Appl. No. 17/327,536, dated Feb. 8, 2023, 14 pages.
Non-Final Office Action received for U.S. Appl. No. 17/327,590, dated Feb. 10, 2023, 12 pages.
Non-Final Office Action received for U.S. Appl. No. 17/393,110, dated Feb. 9, 2023, 19 pages.
Notice of Allowance received for U.S. Appl. No. 16/925,705, dated Apr. 24, 2023, 3 pages.
Notice of Allowance received for U.S. Appl. No. 16/925,705, dated Feb. 21, 2023, 10 pages.
Notice of Allowance received for U.S. Appl. No. 16/925,705, dated Mar. 9, 2023, 3 pages.
Notice of Allowance received for U.S. Appl. No. 16/925,747, dated Feb. 21, 2023, 9 pages.
Notice of Allowance received for U.S. Appl. No. 16/925,747, dated Mar. 7, 2023, 2 pages.
Tachibana, Y. et al., "Chemical Synthesis of Fully Biomass-Based Poly(butylene succinate) from Inedible-Biomass-Based Furfural and Evaluation of Its Biomass Carbon Ratio". Biomacromolecules 2010, 11, 2760-2765. (Year: 2010).
Ohtake, Y. et al., "Biodegradability of polyethylene", (Polymers), vol. 46, Issue 6, June, p. 419, 1997.
Ohtake, Y. et al., "Development of Biodegradable LOPE Compound and the Estimation of Its Biodegradability and Its Application to Field of Civil Engineering", Journal of the Chemical Society of Japan (chemistry and industrial chemistry), 1996, No. 10, pp. 853-860 (English abstract).
Matsuno, Y., "Starch-based biodegradable polymer", Journal of the Textile Machinery Society of Japan, vol. 49, No. 10, pp. 492-498, 1996.
Gilfillan, "Developing Starch-Based Polymer Composites", Doctor of Philosophy, 2015, pp. 1-128.
Gupta, Apeksha et al. "Visible Range Photocatalysts for Phase Photocatalytic Degradation of Polyethylene and Polyvinyl Chloride" Journal of the Chilean Chemical Society, [S.I.], v. 62, n. 1, Jun. 2017. ISSN 0717-9707. <https://jcchems.com/index.php/JCCHEMS/article/view/156>. Accessed: Apr. 20, 2018.
Huagong et al., "Green Manufacturing Process of Fine Chemical Industry", 2006, Guangdong Science & Technology Press (National Outstanding Press).
Ibbrucker, Constance "Can Additives make plastics biodegradable?" Bioplastics Magazine Jan. 2017, 1 page.
Ibbrucker, Constance "Oxo-degradable plastics increasingly under fire in Europe" European Bioplastics, http://www.european-bioplastics.org/oxo-degradable-plastics-increasingly-under-fire-in-europe/ Feb. 28, 2017, 5 pages.
IDS Statement filed Aug. 21, 2020 in U.S. Appl. No. 16/999,542.
International Search Report issued in PCT Application PCT/US2019/28733, dated Mar. 9, 2019.
Jie Ren "Preparation, characterization and properties of binary and ternary blends with thermoplastic starch, poly (lactic acid) and poly(butylene adipate-co- terephthalate)," Elsevier, Carbohydrate Polymers, 2008, pp. 576-582.
Kalambur, et al. "An Overview of Starch-Based Plastic Blends From Reactive Extrusion" Journal of Plastic Film and Sheeting, 2006, vol. 22, pp. 39-58.
La Fuente, et al., Ozonation of Cassava Starch to Produce Biodegradable Films, Sep. 5, 2019, International Journal of Biological Macromolecules, 713-720, 141 (2019).
Li, Gang, et al., "Biodegradation of Thermoplastic Starch and its Blends with Poly(lactic acid) and Polyethylene: Influence of Morphology" published in Macromolecular Journals of Chemistry and Physics, 2011 pp. 1147-1154.
Luo, Ying, et al. "Accelerating the degradation of polyethylene composite mulches." Plastics Research Online, May 19, 2017. Society of Plastics Engineers (SPE), DOI: 10.2417/spepro.006909. Accessed Apr. 20, 2018.
Machine translation of JP-2008013602-A (Year: 2008).
Marianne Shirai "Thermoplastic starch/polyester films: Effects of extrusion process and poly (lactic acid) addition," Elsevier, Materials Science and Engineering, 2013, pp. 4112-4117.
Meereboer et al., "Review of recent advances in the biodegradability of polyhydroxyalkanoate (PHA) bioplastics and their composites," Green Chem., vol. 22, 2020, pp. 5519-5558.
Ming et al., CN107793619 Machine Translation, Mar. 13, 2018 (Year: 2018).
Nayak, "Biodegradable PBAT/Starch Nanocomposites", Nov. 24, 2010, Polymer-Plastics Technology and Engineering, 49:14, pp. 1406-1418, accessed on Feb. 24, 2013.
Nguyen et al., "Biodegradability of polymer film based on low density polyethylene and cassava starch," International Biodeterioration & Biodegradation, vol. 115, 2016, pp. 257-265.

(56) References Cited

OTHER PUBLICATIONS

Non-Final Office Action received for U.S. Appl. No. 15/691,588, dated Sep. 24, 2020, 10 pages.
Non-Final Office Action received for U.S. Appl. No. 15/836,555, dated Apr. 13, 2021, 12 pages.
Non-Final Office Action received for U.S. Appl. No. 16/391,909, dated Dec. 1, 2020, 10 pages.
Non-Final Office Action received for U.S. Appl. No. 16/425,397, dated Feb. 5, 2021, 13 pages.
Non-Final Office Action received for U.S. Appl. No. 16/925,705, dated Aug. 11, 2021, 15 pages.
Non-Final Office Action received for U.S. Appl. No. 16/925,747, dated Aug. 11, 2021, 15 pages.
Notice of Allowance received for U.S. Appl. No. 15/481,806, dated Jan. 7, 2021, 11 pages.
Notice of Allowance received for U.S. Appl. No. 15/481,823, dated Dec. 9, 2020, 9 pages.
Notice of Allowance received for U.S. Appl. No. 15/481,823, dated Jan. 8, 2021, 2 pages.
Notice of Allowance received for U.S. Appl. No. 15/628,379, dated Oct. 3, 2018.
Notice of Allowance received for U.S. Appl. No. 15/691,588, dated Feb. 24, 2021, 11 pages.
Notice of Allowance received for U.S. Appl. No. 15/836,555, dated May 3, 2021, 6 pages.
Notice of Allowance received for U.S. Appl. No. 16/391,909, dated May 4, 2021, 9 pages.
Notice of Allowance received for U.S. Appl. No. 16/425,397, dated Jun. 18, 2021, 8 pages.
Notice of Allowance received for U.S. Appl. No. 16/456,295, dated Dec. 15, 2020, 3 pages.
Notice of Allowance received for U.S. Appl. No. 16/456,295, dated Nov. 19, 2020, 11 pages.
Notice of Allowance received for U.S. Appl. No. 16/456,303, dated Jul. 1, 2020.
Notice of Allowance received for U.S. Appl. No. 16/456,303, dated Jul. 28, 2020.
Office action for U.S. Appl. No. 14/853,725, dated Apr. 30, 2018, LaPray et al., "Articles Formed with Biodegradable Materials and Strength Characteristics of Same", 19 pages.
Office Action for U.S. Appl. No. 14/853,725, dated Oct. 12, 2018, LaPray et al., "Articles Formed with Biodegradable Materials and Strength Characteristics of Same", 13 pages.
Office Action received for U.S. Appl. No. 15/481,806, dated Apr. 30, 2018.
Office Action received for U.S. Appl. No. 15/481,823, dated Apr. 30, 2018.
Office Action received for U.S. Appl. No. 15/691,588, dated Apr. 30, 2018.
Office Action received for U.S. Appl. No. 15/836,555, dated Aug. 12, 2019.
Office Action received for U.S. Appl. No. 15/691,588, dated May 10, 2019.
Office Action received for U.S. Appl. No. 14/853,725, dated Apr. 28, 2017.
Office Action received for U.S. Appl. No. 14/853,725, dated Oct. 12, 2018.
Office Action received for U.S. Appl. No. 14/853,780, dated Aug. 10, 2018.
Office Action received for U.S. Appl. No. 14/853,780, dated Feb. 28, 2019.
Office Action received for U.S. Appl. No. 14/853,780, dated Nov. 6, 2017.
Office Action received for U.S. Appl. No. 14/853,780, dated Oct. 12, 2016.
Office Action received for U.S. Appl. No. 15/481,806, dated Feb. 28, 2019.

"APR Position Statement- Degradable Additives Use in Bottles, Forms and Films" The Association of Postconsumer Plastic Recyclers, http://plasticsrecycling.org/about/position-statements, Apr. 27, 2015, 1 page.
"Background on Biodegradable Additives" BPI, Feb. 12, 2010.
"BPI Position on Degradable Additives" Feb. 2010, 6 pages.
"Case Study: Compostable vs Oxo Degradable" Natur Bag, Feb. 19, 2019.
"Compostable Plastics 101: An Overview of Compostable Plastics Sponsored by the California Organics Recycling Council" based on information and belief, available at least as early as 2012, 23 pages.
"Discover Polysaccharides" Available at http://polysac3db.cermav.cnrs.fr/discover_starch.html; Accessed Feb. 16, 2017, 10 pages.
"Environmentally Degradable Plastics," Leonardo Da Vinci Program, Contract Nol 1/98/2/05261 /PI/11.1.1.b/CONT, 202 pages. May 4, 1999.
"French Proposal for Law on Biodegradable Plastics" Oxo-Biodegradable Plastics Association, Revised Oct. 31, 2013.
"Mask fire, environmental protection fire, degradable meltdown cloth will be the next tueyere?", https://mp.weixin.qq.com/s/r5PmKPpF1V2TkW9AYZQ2EA, Jun. 3, 2020.
"Oxo-Biodegradable Plastics and Other Plastics with Additives for Degradation" European Bioplastics BackGround Oct. 2015, 5 pages.
"Position Paper on Degradable Additives" SPI Bioplastics Division, issued Feb. 2016.
"Report from the Commission to the European Parliament and the Council on the Impact of the Use of Oxo-Degradable Plastic, Including Oxo-Degradable Plastic Carrier Bags, on the Environment" European Commission, Brussels, Jan. 16, 2018.
"The Flexible Packaging Association Position on Degradable Additives" FPA, Jun. 21, 2010.
"What Are Oxo-biodegradable Additives" MJS Packaging, May 8, 2014.
"Biodegradation of starch-polyethylene films in soil and by microbial cultures", Nov. 1997, Dave, et al. World Journal of Microbiology and Technology, 13, 655-68., World Journal of Microbiology and Technology, 655-668, 13.
Ahmed et al. "Biodegradation of plastics: current scenario and future prospects for environmental safety." Environmental Science and Pollution Research 25.8 7287-7298. p. 7 col1 paragraph 2; Table 1; and Figure 1.
Applicant's Transmittal Letter labeled Information Disclosure Statement Under 37 CFR 1.97 dated Sep. 26, 2018.
Arevalo-Nino et al., "Starch-based extruded plastic films and evaluation of their biodegradable properties" Biodegradation 7: 231-237, 1996.
Arvanitoyannis et al., Biodegradable films made from low density polyethylene (LDPE), rice starch and potato starch for food packaging applications: Part 1, Carbohydrate Polymers, vol. 36, (1998), pp. 89-104.
Bastioli et al. "Starch in Polymers Technology" ACS Symposium Series, Jan. 1, 2012, American Chemical Society/Oxford University Press, XP055490447, vol. 1114, pp. 87-112.
Biodegradable Plastics Standard to Bust Landfill Waste, ENSO Plastic Blog, printed Feb. 20, 2019, 3 pages.
Braskem "Life Cycle Assessment of Green Plastic" Available as early as Mar. 28, 2017, accessed at http://www.braskem.com_site.aspx_plastic-green, 18 pages.
Campo, E. Alfredo, Polymeric Materials and Properties, Science Direct, 2018.
Cardia Biohybrid, Film Blowing/ Blow Moulding Resin, Sep. 8, 2017.
Cardia Bioplastics FAQ [online] [site accessed Oct. 23, 2020 18] URL: http://www.cardiabioplastics.com/our-business/faq.
Cardia Compostable B-F, Blown Film Resin, Biodegradable during Composting in Professionally Managed Facilities, CBP Technical Data Sheet, 110317, 2 pages. 2019.
Chen et al. "Environmental Degradation of Starch/Poly (Lactic Acid) Composite in Seawater" Apr. 6, 2010.
Chen et al., "Environmental Degradation of Starch/Poly(Lactic Acid) Composite in Seawater," Key and Open Laboratory of Marine and Estuarine Fisheries Ministry of Agriculture, East China Sea

(56) References Cited

OTHER PUBLICATIONS

Fisheries Research Institute, Chinese Academy of Fishery Sciences, Polymers and Polymer Composites, vol. 19, No. 7, 2011, pp. 559-566.
Corn Starch/Fisher Scientific, 3 pages [online] [site accessed Sep. 18, 2020] URL: https://www.fishersci.com/shop/products/corn-starch-2/S25580 (undated).
De Guzman "Coca-Cola produces 100% Bio-Based PET Bottle" Green Chemicals Blog, Jun. 9, 2015, 3 pages, accessed on Mar. 28, 2017 at https://greenchemicalsblog.com/2015/06/09/coca-cola-produces-100-bio-based-pet-bottle/ 3 pages.
Droge et al., WO 2016/134994 Machine Translation, Sep. 1, 2016 (Year: 2016).
Emmanuel Schwach "Starch-based biodegradable blends: morphology and interface properties," Polymer International, 2004, pp. 2115-2124.
English Abstract of BY 21006 C1. Apr. 2017.
Environmentally Degradable Plastics Leonardo Da Vinci Program; Jan. 2000-Dec. 2006.
Esmaeili, Atefeh, et al. "Biodegradation of Low-Density Polyethylene (LDPE) by Mixed Culture of Lysinibacillus xylanilyticus and Aspergillus niger in Soil." PLoS One 8(9): e71720, Sep. 23, 2013. https://doi.org/10.1371/journal.pone.0071720. Accessed Apr. 16, 2018.
Examiner Interview Summary received for U.S. Appl. No. 15/836,555, dated Mar. 29, 2021, 2 pages.
Eyheraguibel, et al. "Characterization of oxidized oligomers from polyethylene films by mass spectrometry and NMR spectroscopy before and after biodegradation by a Rhodococcus rhodochrous strain" Chemosphere 184, 2017, pp. 366-374.
Final Office Action received for U.S. Appl. No. 14/853,725, dated Nov. 8, 2017.
Final Office Action received for U.S. Appl. No. 14/853,780, dated May 24, 2017.
Final Office Action received for U.S. Appl. No. 15/481,806, dated Nov. 6, 2019.
Final Office Action received for U.S. Appl. No. 15/481,823, dated Jul. 12, 2019.
Final Office Action received for U.S. Appl. No. 15/481,823, dated Jul. 20, 2020.
Final Office Action received for U.S. Appl. No. 15/481,823, dated Oct. 12, 2018.
Final Office Action received for U.S. Appl. No. 15/691,588, dated Dec. 9, 2019.
Final Office Action received for U.S. Appl. No. 15/836,555, dated Feb. 7, 2020.
Final Office Action received for U.S. Appl. No. 15/836,555, dated Nov. 30, 2020, 27 pages.
Fine Chemical Engineering Green Production Process, I st edition, edited by Qihuang Song, Guangdong Science & Technology Press, published on Mar. 31, 2006, p. 174.
Frankland, Jim, Extrusion: Where's the Data? The Importance of Melt Strength in Extrusion, Plastics Technology, https://www.ptonline.com/articles/what-about-melt-strength, Dec. 18, 2020.
Fujisawa, et al. "Degradation of Polyethylene and Nylon 66 by the Laccase-Mediator System" Journal of Polymers and the Environment, vol. 9, Issue 3, 2001, pp. 103-108.
Gadhave et al., Starch Based Bio-Plastics: The Future of Sustainable Packaging, Open Journal of Polymer Chemistry, 2018, vol. 8, pp. 21-33.
Notice of Allowance received for U.S. Appl. No. 16/925,747, dated May 3, 2023, 2 pages.

MELT BLOWN NONWOVEN MATERIALS AND FIBERS INCLUDING STARCH-BASED POLYMERIC MATERIALS

CROSS-REFERENCE TO RELATED APPLICATIONS

The present application claims the benefit under 35 U.S.C. 119(e) of U.S. Application No. 63/033,676, filed Jun. 2, 2020 and U.S. Application No. 63/138,161 filed Jan. 15, 2021, each of which is incorporated by reference in its entirety herein.

The present application is also a continuation-in-part under 35 U.S.C. 120 of U.S. application Ser. No. 16/925,747, filed Jul. 10, 2020 which claims the benefit under 35 U.S.C. 119(e) of U.S. Application No. 62/872,582 filed Jul. 10, 2019, U.S. Application No. 62/939,460 filed Nov. 22, 2019 and U.S. Application No. 62/962,706 filed Jan. 17, 2020, each of which is incorporated by reference in its entirety herein.

The present application is also a continuation-in-part under 35 U.S.C. 120 of U.S. application Ser. No. 16/925,952 filed Jul. 10, 2020, U.S. application Ser. No. 16/925,705 filed Jul. 10, 2020, U.S. patent application Ser. No. 16/425,397 filed May 29, 2019, U.S. patent application Ser. No. 16/391,909 filed Apr. 23, 2019, and U.S. application Ser. No. 15/691,588 filed on Aug. 30, 2017, which is a continuation-in-part of U.S. application Ser. No. 14/853,725 filed on Sep. 14, 2015 which claims the benefit of U.S. Provisional Patent Application No. 62/187,231 filed on Jun. 30, 2015. U.S. application Ser. No. 15/691,588 is also a continuation in part of U.S. application Ser. No. 14/853,780 filed on Sep. 14, 2015, and a continuation in part of U.S. application Ser. No. 15/481,806 and Ser. No. 15/481,823, both filed on Apr. 7, 2017. U.S. application Ser. No. 15/691,588 also claims the benefit of U.S. Provisional Patent Application No. 62/440,399 filed on Dec. 29, 2016, and U.S. Provisional Patent Application No. 62/442,432 filed on Jan. 4, 2017. The entire contents of each of the foregoing is incorporated by reference herein.

The present application also incorporates by reference each of U.S. application Ser. No. 16/456,303 filed on Jun. 28, 2019 (now U.S. Pat. No. 10,752,759) and U.S. patent application Ser. No. 15/836,555, filed Dec. 8, 2017. The present application also incorporates by reference each of Applicant's Applications (U.S. application Ser. No. 17/327,536 filed on May 21, 2021) and (U.S. application Ser. No. 17/327,590 filed on May 21, 2021).

BACKGROUND

Traditional petrochemical-based plastics are formulated to be strong, lightweight, and durable. For this reason, they are used in large quantities in countless consumer products. However, these plastics are generally not sourced from sustainable materials, are typically not biodegradable to any significant extent, and as a result, hundreds of millions of tons of plastic persists in landfills or in other natural environments (oceans, other waterways, in soil, etc.). In trying to reduce the amount of plastic waste, some articles typically produced using petrochemical-based plastics are being produced using more rapidly biodegradable materials, and/or from a fraction of components sourced from renewable sources.

Many such plastic materials are manufactured in the form of nonwoven, fibrous substrates or other articles comprising thin fibers. While there has been some advancement made in incorporating renewably sourced components into some monolithic plastic articles, and even plastic film materials, little success has been achieved in incorporating such renewable components into nonwoven materials and similar articles formed from thin fibers. This lack of progress is particularly applicable to incorporation of starch-based polymeric materials into such articles. Such is due in no small part to the typically high molecular weight, and complex branched characteristics of typical starch materials, which typically include significant quantities of branched amylopectin. The high molecular weight and accompanying high viscosity characteristics make incorporation of such materials into nonwovens and other thin fibers difficult, where rheological characteristics must be carefully controlled in order to effectively form fibers for spunbond, melt blown, yarn, carded, air laid and similar processes using a desired thermoplastic formulation.

As noted above, most petrochemical-based plastics materials (including those used in production of nonwovens), are typically not readily biodegradable. Examples of such include, but are not limited to polyethylene, polypropylene, polyethylene terephthalate, polyester, polystyrene, ABS, polyvinyl chloride, polycarbonate, nylon, and the like. Such non-biodegradable characteristics are typically the case even for so called "green" versions of such materials (e.g., Green PE made by Braskem), which may be sourced from renewable sources, rather than petrochemical feedstocks. Such "green" versions of the plastics differ little (if at all) in physical properties from their fossil-fuel derived cousins, and can be differentiated, e.g., by minor differences, such as their elevated $C^{14}$ vs. $C^{12}$ content, etc. Even where it is possible to source some components of a plastic material from a renewable source, inclusion of starch-based polymeric materials tends to result in a material that is not capable of manufacture into a nonwoven, e.g., through typical spunbond, melt blown, yarn production and similar processes, due to the poor rheological characteristics of the resulting material, because of the inclusion of the starch-based component in such formulations.

While the literature describes some attempts to incorporate starch or starch derivatives into blends of petrochemical or other plastic materials used in forming nonwovens, such attempts have met with little if any commercial success, due to problems such as those identified above, increased costs, the need to slow down the production line to accommodate such formulations, inferior physical properties of the blends, and the like. For example, while U.S. Pat. Nos. 6,818,295, 6,946,506, 7,666,261, U.S. Publications 2002/0168518, 2002/0188041, 2003/0077444, 2010/0159777, 2019/0330770, and EP 326517A1 may describe various attempts at manufacturing nonwoven articles that would include starch-based polymeric materials, Applicant is not aware of any products currently commercially available that provide such, e.g., due to the problems noted above.

For example U.S. Pat. No. 7,666,261 to P&G describes a composition comprising starch, a high MW polymer that is substantially compatible with starch and has a molecular weight sufficiently high to form effective entanglements or associations with neighboring starch molecules, and at least one additive to improve melt flow and melt processability. The composition is typically a majority starch, with a small amount (e.g., <10%) of the added high molecular weight polymer. The starch needs to be modified, e.g., by decreasing molecular weight to a value of 2 million or less. The starch composition retains about 5-8% bound water, even after formation of a fiber or other article. This reference mentions formation of small fibers (e.g., 5 μm or less).

U.S. Pat. No. 6,946,506, also to P&G, describes a starch composition comprising starch and a biodegradable polymer. Non-biodegradable polymers may also be present (e.g., up to 40%). The composition typically includes a high fraction of starch (e.g., 40-60% typical), with a similar fraction of the biodegradable polymer (e.g., crystallizable PLA is particularly described). The starch composition retains about 5-16% bound water. Small fibers can reportedly be formed (e.g., 10-50 µm). In order to be suitable for use, the starch needs to be modified, to have a molecular weight of no more than 2 million.

U.S. Pat. No. 6,818,295, also to P&G, describes a starch composition comprising starch, a thermoplastic polymer (e.g., PE, PP, PCL) and plasticizer. Acid substituted vinyl polymers such as ethylene acrylic acid Dow Primacor) can be added, as in the examples. It is mentioned as possible to produce highly attenuated fibers including microfibrils formed with the starch matrix. Like the '506 patent noted above, the composition typically includes a high fraction of starch (e.g., 40-60%), with a similar fraction of the thermoplastic polymer. The starch composition retains about 5-16% bound water. Small fibers can reportedly be formed (e.g., 5-30 µm). It is mentioned that the starch needs to be modified to have a molecular weight of no more than 8 million, typically no more than 2 million. Although molecular weight values of up to 8 million may be mentioned, there is no evidence of successful use of such. For example, each of the Examples uses StarDri 100, StaDex 10, or StaDex65 starch products from Staley, and although the actual molecular weight of such products is not mentioned in the patent, they are believed to be no more than about 1 million, as StarDri100 has been measured by Applicant to have a weight average molecular weight of only about 21,000 Daltons.

U.S. 2003/0077444 to P&G recognizes that fiber formation is more difficult than other article formation methods (injection molding, blowing film, etc.) because the time during which the structure forms is very short, requiring very specific rheological and other properties, for proper fiber formation. Starch is particularly problematic, as even if you can form it into fibers, it has low tensile strength, it's sticky, and does not bond well, when trying to form a nonwoven web. Blending starch with a thermoplastic polymer can help, although there are very specific requirements (e.g., melting temperature, spinning characteristics) when doing such. The fibers in this reference are particularly bicomponent fibers (e.g., sheath/core, pie-segmented, etc.). While natural starch may have a MW of up to 60 million, and a wide molecular weight distribution, the starch needs to be modified to have a MW of 2 million or less to work well. The starch is typically included at 40-60%, although it can be higher or lower. Too high of molecular weight of any particular component will make the composition difficult to melt-spin. Preferred polymers for blending include PP, PE polyamides, PVA, ethylene acrylic acid, polyesters, etc. The thermoplastic polymer is typically present at 40-60%, although it could also be higher or lower. Spunbond nonwoven web structures can be formed from such fibers. Fiber diameters are reported to typically be 5-30 µm. At least 15% polymer is required to achieve thermal bondability.

U.S. 2002/0188041 to P&G includes similar disclosure as U.S. 2003/0077444, and is more specifically directed to fibers that include starch, plasticizer, and a biodegradable thermoplastic polymer.

U.S. 2010/0159777 to Kimberly-Clark describes a thermoplastic starch that has been enzymatically debranched (reducing the amylopectin portions), to increase the amylose fraction to 55-60%. The composition further includes a plasticizer. It has an apparent melt viscosity of 1-100 Pa at 1000 sec$^{-1}$ at 160° C. The molecular weight of the debranched starch is stated to be up to 5 million, but more typically 800,000 to 2 million, or significantly less than 2 million, as shown in FIG. 5, after enzymatic debranching.

U.S. 2019/0330770, also to Kimberly-Clark, describes spun fibers formed from a blend of 70-90% polyolefin (e.g., PP or PE) and 10-30% starch, for use in a wet laid nonwoven manufacturing process. It is stated that starch may have a weight average molecular weight of 5 million to 25 million, although there are no examples demonstrating success at such high molecular weights, and like the other references, it seems that the molecular weights must be reduced to be suitable for use, as the actual example used had a reported molecular weight of 2.9 million. This patent identifies a problem with the earlier (2000-2010) references (such as those described above), in that the blends were not actually suitable for running at commercial line speeds, because the fibers would break.

EP 326517A1 simply describes a method for destructing starch.

It would be an advantage in the art to provide fibers, nonwoven articles and methods for manufacture of each, where such could include very high molecular weight starch-based polymeric materials (e.g., molecular weights significantly higher than any successfully demonstrated in the above described references). It would be further advantageous if inclusion of such starch-based polymeric materials were to enhance, or at least not significantly detract from, the mechanical properties of such fibers, nonwovens, or the like, as compared to the base resin material, used alone. It would be a further advantage if such compositions could be processed into fibers and nonwoven webs on conventional equipment, at commercial line speeds, whether using spunbond, melt blown, yarn production processes, or other similar processes involving production of thin fibers from the polymer blend.

SUMMARY

Applicant's copending applications as incorporated by reference above disclose starch-based polymeric materials (e.g., thermoplastic starch materials) that can be blended with various plastic resin materials, while substantially maintaining desired strength and other physical characteristics of the material with which the renewable starch-based material is blended. Such starch-based materials, available under the tradename NuPlastiQ, are believed to achieve a strong intermolecular bond between the starch-based material, and the plastic resin with which it is blended. Such strong bonding is in contrast to what is achieved in numerous prior art attempts to blend such plastic resins with starch or starch-based materials, where the starch or starch-based material simply acts as a filler, typically reducing strength and negatively affecting other physical properties.

Applicant has now found that at least some grades of their starch-based polymeric material, having very high molecular weights, can be formed into thin fibers, e.g., such as are useful in the formation of nonwoven web substrates (e.g., for use in, but not limited to, diapers, sanitary napkins, disposable drapes, hospital gowns, surgical and other masks, pads, wipes and the like). Such thin fibers may be produced through spunbond, melt blown, yarn production processes, or other similar extrusion spinning processes that produce thin fiber structures from the polymer melt or blend. As used herein, "spinning" refers to such processes (spunbond, melt blown, yarn spinning, or similar extrusion processes used to spin thin fibers). While some art exists in which starch has been incorporated to some degree in fibers for making nonwoven webs, it has been critical to carefully control the molecular weight of the starch component included in such compositions, in order for the composition to be processable under the required spinning conditions. For example, the references noted above demonstrate formation of fibers where characteristics of the starch component are tightly controlled (e.g., molecular weight of no more than 2 million), and where the starch component typically exhibits other characteristics that also differ from those of the present embodiments (e.g., water content, including bound water of 5-16%). While native starch is reported to sometimes include molecular weight values far higher than 2 million, none of the art of which Applicant is aware has successfully demonstrated the ability to actually spin compositions that include such very high molecular weight starch materials and make fabric (e.g., nonwoven) or other fiber products therefrom. This is particularly so, given that viscosity increases exponentially with increasing molecular weight, such that those of skill within the art (including at least some of the present inventors) believed it impossible to spin a starch component having a very high molecular weight, e.g., of 5 to 10 million or more. For example, one would expect it to be impossible to achieve the needed rheological characteristics necessary to be able to spin such a composition where the starch-based polymer is included in the formulation to any significant extent, and is of such very high molecular weight.

According to one embodiment, the present invention is directed to a method for spinning a composition that includes a high molecular weight starch-based polymeric material (e.g., having a weight average molecular weight greater than 2, 3, 4, or 5 million, by providing such a starch-based polymeric material, and spinning the composition at a suitable temperature (e.g., in a range of 170° C. to 230° C., up to 205° C., or up to 195° C.), for example, at a shear rate exemplary of commercial spinning manufacturing lines (e.g., process shear rate of about 200 $s^{-1}$, with a spinneret shear rate of about 1000 $s^{-1}$ or more). Under such conditions, and with the particular formulations as described herein, the composition may exhibit a spinneret shear viscosity (e.g., at 1000 $s^{-1}$ and 190° C.) of no more than about 125 Pa·s, no more than 120 Pa·s, no more than 115 Pa·s, no more than 110 Pa·s, no more than 105 Pa·s, no more than 100 Pa·s, no more than 95 Pa·s, no more than 90 Pa·s, no more than 85 Pa·s, no more than 80 Pa·s, no more than 75 Pa·s, no more than 70 Pa·s, no more than 65 Pa·s, no more than 60 Pa·s, no more than 55 Pa·s, no more than 50 Pa·s, no more than 45 Pa·s, no more than 40 Pa·s, no more than 35 Pa·s, no more than 30 Pa·s, no more than 25 Pa·s, or no more than 20 Pa·s. Similarly, the compositions may exhibit a process shear viscosity (e.g., at 200 $s^{-1}$ and 190° C.) of no more than about 600 Pa·s, no more than 500 Pa·s, no more than 400 Pa·s, no more than 300 Pa·s, no more than 275 Pa·s, no more than 250 Pa·s, no more than 240 Pa·s, no more than 230 Pa·s, no more than 220 Pa·s, no more than 210 Pa·s, no more than 200 Pa·s, no more than 190 Pa·s, no more than 180 Pa·s, no more than 170 Pa·s, no more than 160 Pa·s, no more than 150 Pa·s, no more than 140 Pa·s, or no more than 130 Pa·s. Such rheology characteristics are possible even while including a substantial fraction of the starch-based polymeric material having very high molecular weight, where the process is effective to produce fibers including the high molecular weight starch-based polymeric material. Because actual shear threshold values may differ depending on the process employed (e.g., spunbond vs. melt blown vs. yarn), more generally, the process and formulation may simply be configured to provide sufficiently low shear viscosity for the formulation to run through the system at commercial line speeds and shear rates, with the formulation exhibiting rheology characteristics that allow it to avoid onset of melt flow instability within the system (particularly at the spinneret), whether spunbond, melt blown, yarn, or otherwise. The values noted above embrace spinneret and process shear viscosities for each of such processes. By way of more specific example, the shear viscosities for melt blown may be lower than for spunbond, which may be lower than for yarn. For example, melt blown process shear viscosities may be less than 200 Pa·s, such as from 30 Pa·s to 180 Pa·s, or from 50 Pa·s to 150 Pa·s. Melt blown spinneret shear viscosity may be less than 95 Pa·s, less than 80 Pa·s, or less than 60 Pa·s such as from 20 Pa·s to 70 Pa·s, or from 30 Pa·s to 60 Pa·s. Spunbond process shear viscosities may be less than 300 Pa·s or less than 225 Pa·s, such as from 130 Pa·s to 215 Pa·s, or from 150 Pa·s to 200 Pa·s. Spunbond spinneret shear viscosity may be less than 95 Pa·s, such as from 50 Pa·s to 85 Pa·s, or from 60 Pa·s to 80 Pa·s. Yarn process shear viscosities may be less than 600 Pa·s, less than 500 Pa·s, less than 400 Pa·s, or less than 300 Pa·s, such as from 100 Pa·s to 275 Pa·s, or from 150 Pa·s to 250 Pa·s. Yarn spinneret shear viscosity may be less than 120 Pa·s, such as from 50 Pa·s to 95 Pa·s, or from 75 Pa·s to 95 Pa·s.

As will be described herein, and may be appreciated by those of skill in the art, the formulations including the starch-based polymeric material may be differently formulated (e.g., with diluent plasticizer polymers as added to a masterbatch formulation including the starch-based polymeric material) to run through a given particular process. For example, a formulation specifically tailored for a melt blown production process may have shear viscosity characteristics that will be of a lower value than for a spunbond process, and spunbond formulations may have shear viscosity characteristics that will be of a lower value than for a yarn production process. Each formulation may be tailored to ensure that the shear viscosity is configured to run through the fiber spinning process (e.g. melt blown, spunbond, yarn, or otherwise) while avoiding melt flow instability. By way of broad example, a melt blown formulation may be formulated with the starch-based polymeric material, with inclusion of specific diluent plasticizing polymers to provide a process shear viscosity (e.g., at 200 $s^{-1}$) of less than 200 Pa·s. A spunbond formulation may be formulated with the starch-based polymeric material, with inclusion of specific diluent plasticizing polymers to provide a process shear viscosity (e.g., at 200 $s^{-1}$) of less than 300 Pa·s. A yarn production formulation may be formulated with the starch-based polymeric material, with inclusion of specific diluent plasticizing polymers to provide a process shear viscosity (e.g., at 200 $s^{-1}$) of less than 600 Pa·s. As noted above, in any case, the formulation may be formulated (by selection of the diluent plasticizing polymer) to provide a shear viscosity that is sufficiently low to run through the given process, while avoiding melt flow instability. The formulations may also advantageously provide elongational or extensional viscosity values (used interchangeably herein) that are within a desired window, to allow fiber formation. For example, if extensional viscosity is too low, the fiber will break, while if extensional viscosity is too high, then the fiber will not draw as desired.

Under any of such fiber production process conditions it is important that the formulation be maintained below the onset of melt flow instability, e.g., ideally below 100 kPa for a polypropylene dominated formulation. As will be apparent to those of skill in the art, melt flow instability occurs when the critical shear stress (e.g., about 100 kPa for a typical polypropylene) is exceeded. Such critical shear stress values are independent of temperature, and depend on the material characteristics of the formulation (e.g., molecular structures, etc.). By way of example, above such critical shear stress, gross surface irregularities associated with inlet fracture and/or land fracture can occur, resulting in undesirable or unusable manufactured product, due to the irregularities in the extruded product surface. Other characteristics that can be associated with melt flow instability (which are also undesirable) include, but are not limited to draw resonance (which causes pulsation in extruded thickness), and secondary flows (which causes interphase problems in multilayer extrusion products).

Although lower molecular weight starch-based materials (e.g., molecular weight of 1 million or perhaps even less) may also prove suitable for use, by way of example, in an embodiment, the starch-based polymeric material may have a weight average molecular weight of 3 to 20 million, or 5 to 16 million, although it will be apparent that lower molecular weight values may also be suitable for use. By way of further example, an exemplary starch from which the starch-based polymeric material is formed (e.g., formed from the starch and a plasticizer) may have a weight average molecular weight of at least 2, 3, 4 or 5 million, such as 3 to 10 million, or 5-7 million. The starch-based polymeric material may be formed from a starch having a particular amylose content, e.g., at least 10%, at least 20%, or at least 30% amylose content, such as from 20% to 70%, or from 30% to 50% amylose. Any suitable extrusion temperature may be used, such as at least 110° C., or at least 130° C. (e.g., 130° C. to 250° C.). Extrusion of the starch and plasticizer may occur under pressurized conditions.

In an embodiment, the starch-based polymeric material is blended with a thermoplastic polymeric diluent material capable of further plasticizing the starch-based polymeric material, e.g., a polypropylene having a high melt flow index (e.g., at least 35, at least 50, at least 100, for example, from 35 to 2000, from 35 to 1550, from 35 to 1000, or from 35 to 500). The melt flow index (MFI) of the selected diluent material may depend on the process for which the formulation is being provided. For example, melt blown processes may employ a diluent with a relatively higher MFI, spunbond may employ a diluent with an intermediate MFI, and yarn processes may employ a diluent with a relatively lower MFI. Applicant has discovered that although the presently prepared starch-based polymeric materials can have a very high molecular weight (and thus extremely high viscosity characteristics), which makes transport, shear and spinning very difficult, the particular starch-based polymeric materials as described herein (i) appear to be strain hardening (while other starches appear to be strain thinning); (ii) exhibit high shear sensitivity, i.e., the materials are shear thinning, thus that the shear rate can be used to dramatically improve flow characteristics; (iii) exhibit excellent responsiveness to diluents/plasticizers (where the addition of a small amount of such polypropylene or similar thermoplastic polymer having a given melt flow index also dramatically affects flow characteristics); and (iv) exhibit relatively high critical shear stress characteristics (e.g., higher than polypropylene). In addition, the prepared starch-based polymeric materials exhibit (v) excellent responsiveness to extrusion temperature (where the material exhibits significantly decreased viscosity as extrusion temperature increases).

Such characteristics do not appear to be inherent within other starch-based polymeric materials, and indeed, at least some such characteristics appear to be opposite from those of conventional starch-based polymeric materials (e.g., the present starch-based materials appear to be strain hardening vs. other TPS' s being strain thinning). Strain hardening vs. strain thinning is not to be confused with shear thickening vs. shear thinning. For example, shear thickening or shear thinning has to do with how the material behaves when shear is applied (e.g., does it become thicker or thinner upon application of shear). In contrast, strain hardening vs. strain thinning has to do with how the material behaves as a function of time, under strain. If the material exhibits increased extensional or elongational viscosity over time during the drawing procedure, then it is strain hardening. It can be inferred from the literature that typical starch materials, while of course used for thickening, do not exhibit strain hardening behavior, where they would increase in extensional or elongational viscosity as the material is being drawn at a spinneret. Rather, existing starch materials seem too thin at this critical phase of manufacture, causing the material to have a tendency to draw to a point, and break. In addition, the particular starch from which the starch-based polymeric NuPlastiQ material is formed may affect such characteristics (e.g., selection of different grades of corn starch, cassava starch, potato starch, etc. used to make the high molecular weight starch-base material may affect the rheology of the resulting material), as will be detailed hereafter. In any case, suitable starch-based polymeric materials for use in formation of melt blown, spunbond, or yarn fibers as described herein are available from Applicant, under the tradename NuPlastiQ.

NuPlastiQ starch-based materials also exhibit lower water content, as compared to the starch-based materials described as being suitable for spinning in the literature (e.g., <2% total water content, including bound water, as compared to 5% or more, for the materials described in the literature).

Another embodiment is directed to polymeric blends suitable for use in forming thin fibers, e.g., such as can be used for forming a non-woven web through a spunbond process, for use in a melt blown process, or for use in production of yarn. Such compositions include the starch-based polymeric material (e.g., having a weight average molecular weight as described herein), and a thermoplastic polymeric diluent material having a melt flow index configured to further plasticize the starch-based polymeric material, to provide overall desired rheological characteristics. The melt flow index (MFI) of the diluent material may depend on whether the formulation is to be configured for use in a spunbond process, a melt blown process, or a yarn process (or other process), with the MFI of the diluent particularly selected to ensure that: (1) the resulting formulation has sufficiently low shear viscosity to be processed through such system; (2) the resulting formulation avoids melt flow instability when extruded through the spinneret of such system; and (3) the formulation provides proper elongational viscosity to allow fibers to be drawn, without breaking. The two components (the starch-based polymeric material such as NuPlastiQ, and the thermoplastic diluent polymer) are typically intimately dispersed with one another. In an embodiment, the starch-based polymeric material may be present in an amount of up to 75%, up to 60%, up to 50%, or up to 40% by weight of the blend. The thermoplastic polymer may be present in an amount of up to 95%, or up to 90% by weight of the blend (e.g., more typically up to 75%). Of course, in other embodiments, it may be possible to further increase the percentage of starch content, e.g., by adjusting other manufacturing parameters as mentioned herein (e.g., increasing process temperature, within the limits of degradation of the high molecular weight NuPlastiQ or other starch-based polymeric material, increasing shear rate, etc.).

Another embodiment is directed to thin fibers. For example, such thin fibers may be suitable for use in manufacture of a nonwoven web (e.g., whether formed in a spunbond or melt blown process). Thin fibers formed in a yarn process may be used to produce yarn products, or used to produce carded fibers, air laid fibers, or wet laid fibers, for example. Such examples are merely exemplary, and such thin fibers produced by any of the various fiber spinning processes may be used in any of a wide variety of uses, as will be appreciated by those of skill in the art. Such fibers and nonwoven webs include the starch-based polymeric material (e.g., NuPlastiQ) described herein, (e.g., present in an amount of up to 60%), and the thermoplastic polymeric material having a melt flow index that is configured to plasticize the starch-based polymeric material to have rheology characteristics needed to run through whatever spinning process will be employed. The components may be intimately dispersed together, throughout the fiber. Of course, various non-homogenous fiber geometries (e.g., sheath/core, side-by-side, segmented pie, islands in a sea, splittable fibers, or other) can also be achieved, if desired.

Another embodiment is directed to a method for increasing the critical shear stress threshold of a spinning or other extrusion and fiber drawing formulation or associated process, where the method includes providing a thermoplastic spinning or other extrusion and fiber drawing formulation having an initial critical shear stress of a given value (e.g., less than 300 kPa, less than 200 kPa, or less than 125 kPa, such as about 100 kPa), and adding to such formulation a starch-based polymeric material having a critical shear stress that is greater than that of the thermoplastic extrusion formulation. By way of example, the starch-based polymeric material itself may have a critical shear stress of greater than 200 kPa, or greater than 300 kPa. Even when blended as part of a masterbatch, addition of such may allow increases to the critical shear stress to values greater than 100 kPa, such as to 125 kPa, or 150 kPa. In any case, the result is that the starch-based polymeric material increases the initial critical shear stress of the formulation. In an embodiment, the starch-based polymeric material may be added as part of a masterbatch (e.g., a NuPlastiQ BioBlend®), where the starch-based polymeric material is already blended with a given thermoplastic material. Such masterbatch blend may have a lower critical shear stress than the starch-based polymeric material alone, but still higher than the formulation to which it is being added. By way of example, such a masterbatch "BioBlend" may include 50% of the starch-based polymeric material. By way of further example, the masterbatch BioBlend may have a critical shear stress value that is at least 110 kPa, at least 115 kPa, at least 120 kPa, at least 125 kPa, at least 150 kPa, at least 175 kPa or at least 200 kPa.

While the NuPlastiQ starch-based polymers described herein are an example of a starch-based material that can provide the benefits described herein, it will be appreciated that the scope of the present invention extends broadly, to other starch-based materials that might exhibit similar characteristics (e.g., developed at some future time), or even to a material that may be synthesized from starting materials other than starch, which may achieve similar results due to the presence of the same or similar chemical structures or functional groups as the presently described starch-based materials. For example, if a material having a chemical structure similar or identical to NuPlastiQ were synthesized (e.g., in a reactor) starting from non-starch materials, such is also within the scope of the present invention.

Further features and advantages of the present invention will become apparent to those of ordinary skill in the art in view of the detailed description of preferred embodiments below.

BRIEF DESCRIPTION OF THE DRAWINGS

A more particular description of the invention briefly described above will be rendered by reference to specific embodiments as illustrated in the appended drawings. Understanding that these drawings depict only typical embodiments of the invention and are therefore not to be considered limiting of its scope, the invention will be described and explained with additional specificity and detail through the use of the accompanying drawings.

DETAILED DESCRIPTION

I. Definitions

Figure 1:
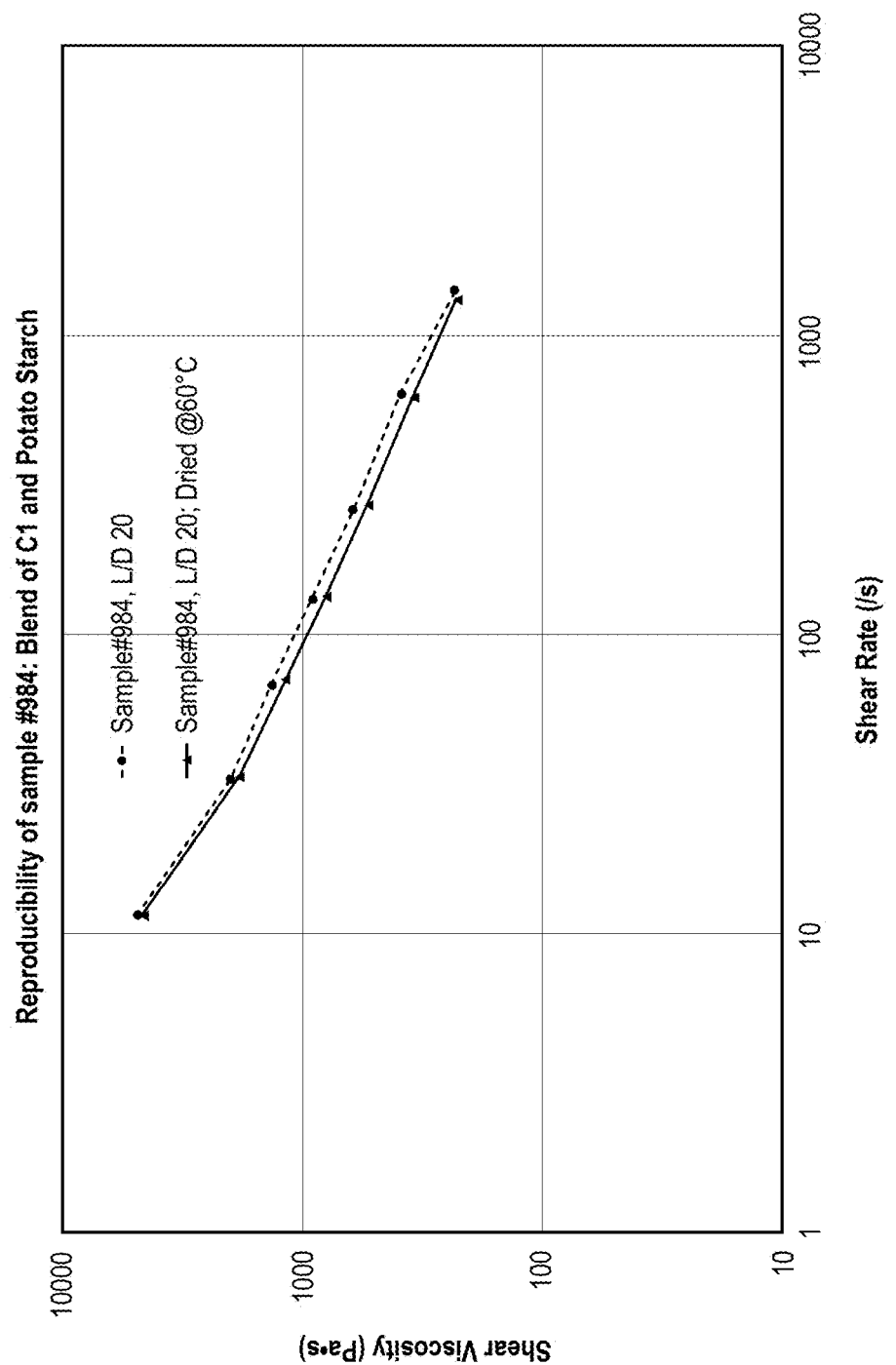
FIG. 1 shows viscosity versus shear rate (a flow curve) for sample 984, which is an exemplary high molecular weight starch-based polymeric material prepared as described in the Examples.

All publications, patents and patent applications cited herein, whether supra or infra, are hereby incorporated by reference in their entirety to the same extent as if each individual publication, patent or patent application was specifically and individually indicated to be incorporated by reference. Such incorporation by reference includes the prosecution history of Applicant's earlier patents, many of which have been allowed/issued.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "starch" can include one, two or more starches.

"Nonwoven," as used herein, refers to a fabric-like material made from staple and/or long fibers, bonded together, for example, by heat, mechanical, chemical, or solvent treatments. Such materials are neither woven nor knitted, but are formed from a web of such fibers which are entangled or otherwise bonded together.

Unless otherwise stated, all percentages, ratios, parts, and amounts used and described herein are by weight, including molecular weights—i.e., weight average molecular weights, vs. number average molecular weights.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 25%, 15%, 10%, within 5%, within 1%, etc. of a stated value.

All numbers expressing quantities of ingredients, constituents, conditions, and so forth used in the specification and claims are to be understood as being modified in all instances by the term "about". Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Some ranges are disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

The phrase 'free of' or similar phrases as used herein means that the composition comprises 0% of the stated component, that is, the component has not been intentionally added to the composition. However, it will be appreciated that such components may incidentally form under appropriate circumstances, may be incidentally present within another included component, e.g., as an incidental contaminant, or the like.

The phrase 'substantially free of' or similar phrases as used herein means that the composition preferably comprises 0% of the stated component, although it will be appreciated that very small concentrations may possibly be present, e.g., through incidental formation, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%.

The term "non-biodegradable" as used herein with regard to a material means that the native material (free of additives added to render it biodegradable) does not degrade (particularly biodegrade), e.g., to carbon dioxide and/or methane to a significant extent in a reasonable limited time period (e.g. one year, 2 years, 3 years, or 5 years) when exposed to various typical disposal conditions, such as in the ocean, in a landfill, industrial or other compost conditions, or to specific ASTM conditions intended to evaluate biodegradability under a specific set of conditions (e.g., ASTM D-5511, D-5526, D-5338, D-6691). However, it is understood that given enough time and exposure to conditions of sunlight, oxygen and degrading microbes, most polymeric materials (e.g., even those that are typically considered "non-biodegradable") will eventually degrade or even biodegrade, usually to some limited extent, over an extended time (e.g., centuries).

The term "biodegradable" as used herein with regard to a material means that the material as described herein does significantly biodegrade (e.g., over 50%) to base molecules such as carbon dioxide, methane and/or water by the action of appropriate microorganisms, within a reasonable limited time frame (e.g., 5 years, 3 years, 2, years, 1 year, etc.) under "ideal" biodegradation conditions (e.g., anaerobic digester, industrial compost, or the like), e.g., such as conditions under various ASTM biodegradability tests (e.g., ASTM D-5511, D-5526, D-5338, or D-6691).

The term "modified" as used, e.g., in describing "modified starch" and the like, refers to physical and/or chemical modifications, including the conversion of a starting starch material to one that includes a lower molecular weight. Applicant's NuPlastiQ material may be considered to comprise a "modified" starch. Starches that may not necessarily fall within the description of the term "modified", may also be suitable, e.g., where they otherwise exhibit characteristics as described herein. Such mechanical and/or chemical modifications may include modification of amylopectin starch component(s) to a more linear amylose structure.

By way of example, some of the literature may suggest amylose (15-30% of the starch units) may contain chains with molecular weight from approximately 40,000 and 340,000 Daltons with the chains containing 250 to 2000 anhydroglucose units. Amylose is an unbranched chain which is coiled in the shape of a helix.

Amylopectin (70-85% of the units in starch) contains chains with molecular weight as high as 80,000,000 Daltons. The foregoing descriptions of amylose and amylopectin are merely exemplary, and it will be appreciated that starches having different characteristics may also be suitable for use.

The descriptions herein are merely exemplary, and it will be appreciated that numerous modifications or variations to such starch components are possible. Applicant's NuPlastiQ materials as described herein are examples of a modified starch-based material, having very high molecular weight, available from Applicant. Determination of molecular weight may be through any desired process, e.g., any of various size exclusion chromatography techniques (e.g., gel permeation chromatography ("GPC") or gel filtration chromatography ("GFC").

Unless indicated otherwise, melt flow index values are in units of g/10 min, under standard conditions (e.g., 230° C. under a load of 2.16 kg for polypropylenes, or 190° C. under a load of 2.16 kg for polyethylenes and other materials).

In reference to various standardized tests (e.g., ASTM or other tests), it will be understood that reference to any such standard refers to the latest update (if any) of such standard, unless otherwise indicated. Any such referenced standards are incorporated herein by reference, in their entirety.

II. Introduction

The present disclosure is directed to, among other things, methods for successfully spinning (e.g., spunbond, melt blown, yarn, or similar spinning processes) a composition that includes a starch-based polymeric material, which may be of very high molecular weight. In an embodiment, the starch-based polymeric material may have a relatively high molecular weight, e.g., greater than 2, 3, 4, or 5 million, such as at least 3 million to 20 million, or 5 to 16 million). Such values may represent weight average molecular weights. Number average molecular weights may be greater than 1, 2, 3, 4, or 5 million, such as 3 to 12 million, 3 to 10 million, or 5 to 7 million. The starch material from which the starch-based polymeric material is formed (e.g., formed from the starch and a plasticizer in a reactive extrusion process) may similarly have a weight average molecular weight greater than 1, 2, 3, 4, or 5 million, such as 3 to 10 million, or 5 to 7 million. Mw to Mn ratios (polydispersity) for the starting starch, or the finished starch-based polymeric material may be at least or greater than 1, such as from 1 to 2, from 1 to 3, from 1 to 4, or even higher.

For example, to be suitable for spunbond processes, the composition needs to be capable of being spun into thin fibers, e.g., having diameters of no more than 30 μm, e.g., no more than 25 μm. Of course, the present processes are suitable for formation of larger fibers, up to any desired size, as well. For example, up to 50 μm, up to 100 μm, or even larger, should such be desired. Melt blown fibers have even more stringent fiber size requirements, e.g., typically less than 5 μm (e.g., 2-10, or 2-4 μm) in diameter. By way of example, yarn fibers may be initially formed at 40 μm to 150 μm, or 40 μm to 100 μm (e.g., about 60 μm), followed by subsequent drawing (e.g., heat drawing) of the as spun yarn to smaller sizes, e.g., such as from 10 μm to 50 μm, or 10 μm to 30 μm (e.g., about 20 μm). The present disclosure describes formulations and processes that can be used for any of such processes.

Even though the contemplated grades of NuPlastiQ as a starch-based polymeric material can have a very high molecular weight (e.g., at least 3 million, 3 to 10 million, 5 to 7 million, 7 to 9 million, or even 10-18 million), Applicant has surprisingly found that it is possible to spin fibers including significant fractions of such a high molecular weight material, at least in part because of the particular characteristics exhibited by this material. For example, even though this starch-based material exhibits very high molecular weight (and thus extremely high zero shear viscosity (Eta-0, $\eta_0$), as well as correspondingly high shear viscosity $\eta_s$ and elongational or extensional $\eta_E$ viscosities), Applicant has discovered that this material also exhibits characteristics that allow it to still be spun, even under process conditions achievable in commercial spunbond, melt blown or yarn production lines, where particular selections are made in the operating parameters, and to the composition formulation. For example, Applicant has discovered that this starch-based material exhibits excellent shear sensitivity, so that even though the zero-shear viscosity can be extremely high (e.g., greater than $10^6$ or $10^7$ Pa·s, which is about at least an order of magnitude higher than conventional TPS materials), shear viscosity can quickly be reduced at commercial production line shear rates (e.g., 200 to 1500 s$^{-1}$), particularly where such is coupled with other "handles" or "levers" that can be adjusted, as noted below.

For example, in addition to excellent shear sensitivity, the starch-based polymeric material has also been found to exhibit excellent responsiveness to thermoplastic diluent plasticizers, where the addition of a polypropylene or similar thermoplastic polymer having a higher melt flow index dramatically improves flow characteristics. The MFI or other characteristics of the diluent selected for use in diluting and plasticizing the starch-based polymeric material so as to be spinnable under conditions as described herein may depend on whether the process is a spunbond process, a melt blown process, a yarn process, or other melt extrusion fiber spinning process. For example, different diluents may be selected, depending on the particular process to be employed.

In addition, the starch-based material exhibits excellent responsiveness to extrusion temperature, in that the material exhibits significantly decreased viscosity as extrusion temperature increases. Thus, by providing spinning conditions where extrusion temperature is in a particular selected range, (e.g., 170° C. to 230° C., 175° C. to 225° C., 180° C. to 200° C., or 180° C. to 195° C.), at a given process shear rate (e.g., about 200 s$^{-1}$ for many spinning process, such as spunbond, melt blown, or yarn) with a given spinneret shear rate and where an effective amount of a higher melt flow index thermoplastic material is compounded with the starch-based polymeric material, to further plasticize the blend, such that the composition is capable of processing through the given system, while avoiding melt flow instability. Actual shear rate varies based on die diameter, flow rate (e.g., GMH: gram/min/hole) and density of the material. Speaking generally, spinneret shear rate may range from 400-10,000 s$^{-1}$, across various yarn, spunbond, melt blown or similar melt extrusion fiber spinning processes.

By way of example, in a spunbond or melt blown process, the composition may exhibit a shear viscosity of no more than about 125 Pa·s, or no more than 95 Pa·s (e.g., no more than 50-65 Pa·s) at 1000 sec$^{-1}$. Under such conditions, spunbond fibers can be produced, e.g., having a diameter of at least 10 μm, such as from 15 μm to 100 μm, from 10 μm to 50 μm or from 15 μm to 30 μm). With appropriate diluent plasticizer selection, melt blown fibers can be produced, e.g., having a diameter of 5 μm or less, such as 2-10 μm, or 2-4 μm. With appropriate diluent plasticizer selection, yarn fibers can be produced, e.g., having a diameter of 40 μm or more, such as 40-150 μm, 40-100 μm, 40-80 μm, such as about 60 μm, which can be drawn down to a smaller final diameter (e.g., 10 μm to 50 μm, 10 μm to 30 μm, such as about 20 μm) after initial fiber formation, in heated drawing rolls typically employed in a yarn process. Of course, spunbond, melt blown, and yarn processes are merely exemplary, and other similar fiber spinning processes may be used, producing a variety of diameter fibers, using the principles detailed herein.

In any case, it is surprising that such "handles" or "levers" are sufficient to achieve fiber spinning, where the composition includes a substantial fraction of a very high molecular weight starch-based polymeric material. This is possible, even where no strain hardening additives are specifically added to the composition. For example, Applicant has further observed that the presently contemplated starch-based polymeric materials employed appear to be strain hardening on their own, rather than strain thinning, as other thermoplastic starch materials appear to be.

Examples of suitable high molecular weight starch-based materials are available from BioLogiQ, under the tradename "NuPlastiQ", particularly those having very high molecular weight as described herein. Some characteristics of NuPlastiQ materials (particularly NuPlastiQ GP and NuPlastiQ CG) are described in various of Applicant's other U.S. applications, (e.g., U.S. application Ser. No. 16/925,705, incorporated by reference in its entirety herein). Many characteristics of the presently described high molecular weight starch-based materials may be similar to those previously described relative to NuPlastiQ GP and NuPlastiQ CG. Other starch-based polymers may also be suitable for use, e.g., where such material may exhibit at least some of the other key characteristics described herein, that enable spinning of such material.

At least in the case of using any of various NuPlastiQ grades as the starch-based material, biodegradability of the resulting blend is increased and/or accelerated. For example, in polymer/NuPlastiQ blends including polymers heretofore considered non-biodegradable, such as polypropylene or polyethylene, a substantial portion or all of the carbon atoms (including those of the PP and PE) in the blended product can be far more quickly converted by microorganisms into $CO_2$ and/or $CH_4$. In other words, NuPlastiQ can render polypropylene and polyethylene biodegradable when blended therewith, in a homogenous mixture, where the NuPlastiQ is intimately dispersed in the polypropylene or polyethylene. Additionally, when blending with polymers heretofore considered to be compostable or biodegradable, such as PLA or others (e.g., PBAT, PBS, PCL, PHA, or the like), the rate and/or extent of biodegradation of such other polymer may be further increased by addition of the NuPlastiQ starch-based material under any given conditions. The rate of microbial conversion depends on several factors such as thickness of the structure, other form of the article (e.g., ground powder vs. larger contiguous piece), number of microorganisms, type of microorganisms, environmental conditions (e.g., pH, moisture, temperature, etc.), ratio of NuPlastiQ starch-based material to the other polymer(s) in the product, type of plastics in the blend, the strength of the carbon bonds in the plastic, etc.

The present embodiments thus allow for thin fiber formation from high molecular weight starch materials, e.g., as used in a spunbond process, a melt blown fiber process a yarn or other fiber melt spinning process, by blending the very high viscosity starch material (e.g., which has viscosity characteristics that may be at least an order of magnitude greater than starches previously described for use in thin fiber formation) with a thermoplastic diluent polymer material, in a manner so as to ensure that the desired rheological properties are obtained (e.g., maintaining shear stress below the critical threshold), when processing such a composition through a spinneret at commercial line shear rates, allowing such a starch composition to advantageously be incorporated into fibers otherwise formed from a conventional thermoplastic material, thus improving the sustainability characteristics of such fibers, and nonwoven webs formed therefrom.

In addition to providing such formulations with increased sustainable biocontent, the present embodiments are also directed to such products (e.g., compositions, thin fibers, nonwoven webs formed therefrom, as well as any articles incorporating such fiber structures) that provide one or more mechanical or physical advantages associated with inclusion of the starch-based polymeric material within the composition. For example, incorporation of the presently contemplated starch-based materials can actually increase the critical shear stress threshold characteristics of the thermoplastic polymeric material with which it is compounded or otherwise blended, e.g., providing a manufacturer additional flexibility in the parameters at which a spunbond, melt blown, yarn or similar fiber production process is run, using conventional resins. For example, typical polypropylene compositions exhibit a critical shear stress of about 100 kPa, above which threshold melt flow instability occurs, which renders it impossible to effectively spin usable fibers under such conditions, above the critical shear stress. The present high molecular weight starch-based polymeric materials may actually increase the applicable critical shear stress threshold, allowing the composition to be effectively processed at higher shear stresses, e.g., up to about 125 kPa, 150 kPa or even 200 kPa, depending on how much of the high molecular weight starch-based material is added to the formulation. Such is a distinct advantage, potentially allowing production of thinner fibers, faster line speeds, etc.

Finally, in addition to the possibility of providing bicomponent or other multicomponent fiber geometries, the present disclosure can provide unusual fiber morphology characteristics, e.g., fibers with "bumps" provided thereon, where such bumps may comprise or consist essentially of the starch component (or another component of the compounded blend from which the fibers are formed). Such bumps may vary (i.e., in their radius or thickness) from the normal generally circular fiber radius or diameter by 1-4 μm, e.g., for a fiber that has a thickness ("diameter") of 15-30 μm.

III. Exemplary Articles and Methods

The present blends and processes can include one or more thermoplastic polymeric materials having a melt-flow index configured to act as a diluent to the starch-based polymeric material. Polypropylene is an example of such a material, although other thermoplastic polymers may also be suitable for use. By way of example, the selected thermoplastic polymer may have a melt flow index (MFI) of at least 35 (e.g., 35 to 2000, such as 35 to 1750, 35 to 1550, 35 to 1250, 35 to 1000, 35 to 750, or 35 to 500). For polypropylene, such MFI values may be at 230° C. with a load of 2.16 kg. For polyethylene, such MFI values may be at 190° C. with a load of 2.16 kg. The MFI or other characteristics of the diluent material(s) employed may depend on whether the formulation is to be used in a spunbond, melt blown, yarn, or other thin fiber extrusion/spinning process, with the selection made to provide the formulation with the needed rheological properties to ensure low enough shear viscosity (e.g., BPI as described herein, measured at 190° C. using a 1 mm diameter die with L/D=30, at 200 $s^{-1}$) for the formulation to run through the system, and with a viscosity that avoids melt flow instability, particularly through high shear conditions associated with the spinneret. In an embodiment, more than one such diluent material may be used, e.g., such as a thermoplastic polymeric material having a melt flow index of 35, and another having a melt flow index of 100 to 2000, 100 to 1750, 100 to 1550, 100 to 1250, 100 to 1000 (e.g., 100 to 500, or 400 to 600, etc.). In an embodiment, a first diluent material may be provided pre-blended with the starch-based polymeric material, e.g., in a NuPlastiQ or other masterbatch. Such a first diluent material included in the masterbatch may have an MFI value that is relatively low, e.g., no more than 200, or no more than 100, such as from 35 to 100. Such a masterbatch may be blended with a second diluent material at the time of processing, with selection of the second diluent material depending on the process to be employed (e.g., spunbond, melt blown, yarn, etc.). In an embodiment, the second diluent material may have a higher MFI value than the first diluent material. Of course, it is also possible to provide the composition fully diluted, without the use of any intermediate masterbatch.

While polypropylene is an example of one particularly suitable material for use in such processes, other thermoplastic materials may also be suitable for use, e.g., including, but not limited to polyethylene, other polyolefins, polyesters such as PLA, PBAT, or the like. For example, some polyesters may be particularly useful in formation of yarn fibers. Examples of suitable thermoplastic materials may have a MFI value greater than that of the starch-based polymeric material, as described herein. Such MFI values are typically noted in units of g/10 min, under standardized conditions (e.g., ASTM D-1238 or other relevant standard). Such values are higher than the melt index of the starch-based polymer. By way of example, the MI for an exemplary high molecular weight NuPlastiQ materials as shown in Table 1 is 6 g/10 min at 170° C. under 21.6 kg load. Such materials are very viscous, exhibiting little flow under standardized testing conditions. As a practical matter, it is very difficult to measure the MFI at a standard temperature of 190° C. using the standard 2.16 kg weight because the value is quite low, and because a significant fraction of any such flow may be due to degradation of the NuPlastiQ material under such conditions, so that any measured values can be quite inconsistent. Because the NuPlastiQ material is stable, and consistent, accurate measurement is possible at 170° C. under a higher load of 21.6 kg, this is the reported conditions for the value shown in Table 1.

The thermoplastic material used as a diluent to improve the rheological characteristics of the starch-based material may be sourced from conventional petrochemical "fossil fuel" sources, or from so-called "green" or renewable sources (e.g., bioPE, bioPET, PLA, other polyesters, and the like). Petrochemical fossil fuel vs. renewable sources may be differentiated from one another using various analytical methods, e.g., one of which can involve determining the ratio of $C^{14}$ vs. $C^{12}$ within the materials. By way of example, petrochemical fossil fuel sources contain no $C^{14}$ content, while materials (even the same material, such as "green" PE vs. conventional fossil fuel PE) sourced from renewable or sustainable materials (renewable and sustainable are used interchangeably herein) will exhibit an elevated content of $C^{14}$ (e.g., perhaps 1 in 1 trillion carbon atoms). Of course other analytical methods exist for identifying and differentiating between two such differently sourced materials (fossil fuel derived vs. renewably sourced). Those of ordinary skill within the art will appreciate that renewable materials are derived from starting materials which can be replenished generation after generation (e.g., renewed within about 100 years or less), rather than fossil fuel sources (which take at least tens of thousands of years to develop). Examples of such renewable source materials include various plant crops, such as various plant starches, sugarcane, corn, or other plant products. The starch-based polymeric materials and the thermoplastic diluent materials having desired MFI characteristics can be provided in any desired form, such as pellets, powders, curdles, slurry, and/or liquids.

The present compositions may be used to form thin fibers used in the manufacture of any desired article through any of a wide variety of thin fiber melt spinning processes. Examples of such processes include, but are not limited to various spunbond, melt blown, yarn, and other processes, the details of which will be apparent to those of skill in the art. Such thin fibers may be used in production of various nonwoven structures, or carded fibers (e.g., in the case of yarn), or the like. The thin fiber could also be produced, and wound, then provided as an intermediate material from which a fabric or other article could be formed. Such fabrics could be nonwoven, or woven or knitted, etc. It will be apparent that thin fibers as described herein including a starch-based polymeric material may have a wide variety of uses. As the composition includes the starch-based polymeric material and one or more thermoplastic polymeric materials having specifically desired melt flow index characteristics, such components can be compounded (e.g., with or without a compatibilizer) together before spinning. By way of example, the materials may all be compounded together in advance, and then fed into the extruder.

In an embodiment, the starch-based material can be provided in the form of a masterbatch, which masterbatch already includes a thermoplastic diluent material, and optionally a compatibilizer. The masterbatch may be blended with additional thermoplastic diluent material in the extruder, in the same process during which spinning occurs. For example, the masterbatch may include the starch-based polymeric material, the compatibilizer, and a first thermoplastic diluent material with a desired MFI value. Such a masterbatch can then be further blended with another or additional thermoplastic polymer diluent material (e.g., having a desired MFI) just before spinning. It will be apparent that numerous possibilities exist for such blending or compounding. Where final blending or compounding occurs in the spinning process, for example, one or more of the thermoplastic polymers with specifically selected melt flow index characteristics and the starch-based material can be fed into an extruder (e.g., into one or more hoppers thereof). The different materials can be fed into the extruder into the same chamber, into different chambers, at approximately the same time (e.g., through the same hopper), or at different times (e.g., through different hoppers, one being introduced into the extruder earlier along the screw than the other), etc. It will be apparent that numerous possibilities exist for such processing.

It will be apparent that many blending possibilities are possible. In an embodiment, any provided masterbatch including the starch-based material may already include at least a portion of the one or more thermoplastic polymers with particularly selected melt flow index values. For example, where the thermoplastic polymers include two or more different polymers, with different melt flow index values (e.g., 35 and 500, or 100 and 500, or 35 and 1550, etc.), the masterbatch may already include one such thermoplastic polymer already compounded with the starch-based material. The compatibilizer may also typically be present in such a masterbatch. By way of example, where the final composition used to spin the thin fibers is intended to include 25% by weight of the starch-based polymer, 4% compatibilizer, and 71% of the thermoplastic polymers with particular melt flow index values, the masterbatch may include 50% by weight of the starch-based material, with 8% compatibilizer, and with 42% of one or more of the thermoplastic polymers. By way of example, the masterbatch may then be blended 1:1 (or other blending ratio) with additional thermoplastic polymer(s) with the specifically desired melt flow index value(s) to achieve the final composition from which the thin fibers are to be spun.

An important characteristic of the present compositions can be that the selected starch-based material have a high molecular weight, higher than many starch-based materials previously described as suitable for fiber spinning. For example, previous work in incorporation of starch-based materials into fibers has focused on efforts to increase the amylose content of the starch-based material (e.g., through enzymatic debranching), or to otherwise reduce the molecular weight of the starch-based material so that it has rheological characteristics that might allow the composition to be spun. Even with such modifications, U.S. Publication 2019/0330770 states that while such blends could be spun, the rheological characteristics of such blends were still incompatible with manufacturing processes run at commercial line speeds (e.g., 500-1000 m/min or higher), at commercial shear rates, and that the fibers would break if the production line were run at such speeds, with such starch-containing compositions. Such accommodations to reduce line speeds may also actually decrease strength of formed fibers, which is of course undesirable. In addition, the compositions described in such previous attempts invariably include significant water content. While it can be difficult to remove such residual water content (as much of it is present as bound water, bound to the starch molecules), the residual presence of water can undesirably affect various material properties or otherwise be undesirable. In contrast to such previous attempts, where bound water was retained, in at least some embodiments as contemplated herein, the water content of the high molecular weight starch-based material is minimal, e.g., no more than 2%, or no more than 1.5%, even including any bound water.

Using the same reactive extrusion process through which commercially available grades of NuPlastiQ have previously been available, Applicant has now prepared a high molecular weight NuPlastiQ material, which they have demonstrated can be incorporated into compositions suitable for spinning thin fibers. Such NuPlastiQ materials suitable for thin fiber spinning are available from Applicant. In any case, the presently described and contemplated starch-based polymeric materials exhibit significantly higher molecular weight values than any starch-based material previously shown to be spinnable. Previous attempts described in the literature to spin thin fibers from compositions including a starch-based material have only succeeded in spinning such fibers where the starch-based component has a molecular weight (weight average molecular weight) of up to about 1 million, sometimes up to perhaps as much as 2 million. For example, Star Dri-100, used in many such examples in the literature, has a molecular weight of only about 21,000, as measured using the same gel permeation chromatography methods used for molecular weight measurements for the starch-based polymeric materials described herein.

As something of an outlier in the field, U.S. Publication 2019/0330770 reportedly includes an example using a starch-based material having a molecular weight of 2.9 million, where the starch is included at no more than 30% by weight of the blend, although Applicant is not aware of the successful spinning of fibers from a composition including a significant fraction (e.g., at least 1%, at least 3%, at least 5%, at least 10%, at least 15%, or at least 20%) of a starch-based polymeric material having significantly higher weight average molecular weight, such as at least 3, 4, or 5 million Daltons. Such is not surprising, given that viscosity rises exponentially with molecular weight, and compositions with very high viscosity are poor candidates for thin fiber spinning. For example, at least one of the present inventors believed it to be impossible to spin thin fibers from a composition including a significant fraction of a starch-based polymeric material having a high molecular weight as described herein (e.g., see Tables 3A-3B), particularly at commercial line speeds (where the shear rate and applied shear stresses approach critical values at which melt instability occurs). The present disclosure describes how to achieve such.

The starch-based material can be formed from one or more starches from one or more plants, such as corn starch, tapioca starch, cassava starch, wheat starch, potato starch, rice starch, sorghum starch, algae starch and the like. In some embodiments, a mixture of different types of starches may be used, as described in various of Applicant's earlier applications, already incorporated by reference. In other embodiments, only a single starch may be used in forming the starch-based material. The starch-based material is typically formed with a plasticizer in addition to the starch. In an embodiment, the materials from which the starch-based polymeric material is formed may consist essentially of the starch and plasticizer. Additional components such as an odor reducing agent, or other adjuncts may optionally be included. Use of an odor reducing agent (e.g., vanillin) is described in Applicant's U.S. Pat. No. 10,920,044, herein incorporated by reference in its entirety. Once the starch-based polymeric material is formed from the starch and plasticizer, a compatibilizer or other adjuncts may be compounded into a masterbatch including the starch-based polymeric material and a thermoplastic diluent polymer (e.g., polypropylene with a selected MFI value).

The starch-based material can be formed from mostly starch. For example, at least 65%, at least 70%, at least 75%, or at least 80% by weight of the starch-based material may be attributable to the one or more starches. In an embodiment, from 65% to 90% by weight of the finished starch-based material may be attributed to the one or more starches. Other than negligible water content (e.g., no more than 1.5-2%), essentially the balance of the finished starch-based material may be or attributed to the plasticizer (e.g., glycerin). Where an odor reducing agent is included, the odor reducing agent is typically included in very small amounts (e.g., less than 1%, often far less than 0.1%, such as 1 to 100, or 1 to 10 ppm). The percentages above may represent starch percentage relative to the starting materials from which the starch-based material is formed, or that fraction of the finished starch-based material that is derived from or attributable to the starch (e.g., at least 65% of the starch-based material may be attributed to (formed from) the starch(es) as a starting material). Substantially the remainder may be attributable to the plasticizer.

By way of example, materials from which the starch-based material is formed can include at least 12%, at least 15%, at least 18%, at least 20%, at least 22%, no greater than 35%, no greater than 32%, no greater than 30%, no greater than 28%, or no greater than 25% by weight of a plasticizer. Such percentages may represent that fraction of the finished starch-based material that is derived from or attributable to the plasticizer.

Exemplary plasticizers include, but are not limited to glycerin, polyethylene glycol, sorbitol, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, other acid esters, or combinations thereof. Glycerin may work particularly well.

The finished starch-based material may include no greater than 5%, no greater than 4%, no greater than 3%, no greater than 2%, no greater than 1.5%, no greater than 1.4%, no greater than 1.3%, no greater than 1.2%, no greater than 1.1%, or no greater than 1% by weight water, including bound water. By way of example, the patent references that generally describe modification of starch-based polymeric materials to be suitable for spinning include substantial bound water (e.g., 5-16%), far higher than the water content typically present in the presently contemplated starch-based materials. Furthermore, while lower water content may be described in some references describing starch-based polymeric materials generally (e.g., used in forming films), no effort has been made to modify such materials to be suitable for spinning, and because of the very demanding specifications required for such, it is not a simple operation to simply swap one such material for another, particularly where those materials that have been specifically formed to be spinnable include significant water content.

Additional details relative to fractions of starch and glycerin or other plasticizers used in forming starch-based materials are described in Applicant's other patent applications, already incorporated herein by reference. Physical characteristics for NuPlastiQ GP are shown in Table 1 below. The properties for the described high molecular weight starch-based polymers used herein, for spinning thin fibers are believed to be similar to those shown in the table. By way of example, properties of density, glass transition temperature, tensile strength, Young's modulus, elongation at break, dart impact, and water content may be representative of the high molecular weight starch-based polymeric materials contemplated for use in the present embodiments. Any of such characteristics may be measured by any of various ASTM or other standards, as will be appreciated by those of skill in the art. Some characteristics may vary somewhat (e.g., ±25%, or ±10%) from values shown in Table 1.

TABLE 1

| PROPERTY | TEST METHOD | NuPlastiQ GP NOMINAL VALUE |
|---|---|---|
| Density | ASTM D-792 | 1.40 g/cm³ |
| THERMAL PROPERTIES | | |
| Melt Flow Index 170° C./21.6 kg | ASTM D-1238 | 6 g/10 min |
| Glass Transition Temperature | ASTM E-1356 | 50-70° C. |
| MECHANICAL PROPERTIES | | |
| Tensile Strength @ Yield | ASTM D-638 | >30 MPa |
| Tensile Strength @ Break | ASTM D-638 | >30 MPa |
| Young's Modulus | ASTM D-638 | 1.5 GPa |
| Elongation at Break | ASTM D-638 | <10% |
| Impact Resistance (Dart) | ASTM D-5628 | 3.5 kg |

TABLE 1-continued

| PROPERTY | TEST METHOD | NuPlastiQ GP NOMINAL VALUE |
|---|---|---|
| ADDITIONAL PROPERTIES | | |
| Water Content | ASTM D-6980 | ≤1.5% |

Weight average molecular weight may be relatively high, as described herein, e.g., greater than 2 million, greater than 3 million, greater than 4 million, greater than 5 million, such as from 3 to 20 million, 5 to 18 million, or 5 to 16 million. Such values may be determined through any of various suitable size exclusion chromatography methods, e.g., GPC and/or GFC. The values in the examples herein were determined through size extrusion chromatography with multi-angle light scattering (MALS) and refractive index (RI) detection. In any case, such molecular weight values are significantly higher than starch-based materials previously made to be spinnable. The starch from which the starch-based polymeric material is made may similarly have a very high molecular weight as described herein. That said, it will be appreciated that in other embodiments, it may be possible to use a starting starch or finished starch-based polymeric material having lower weight average molecular weight, e.g., less than 2 million, or perhaps even less than 1 million. Viscosity is strongly related to molecular weight. Due to high molecular weight, the presently contemplated starch-based materials also exhibit viscosity characteristics that are significantly higher than starch-based materials heretofore used in spinning fibers. For example, the zero shear viscosity, even at a given process temperature (e.g., 170-195° C.) or other relevant temperature may be at least an order of magnitude greater than starch-based materials heretofore employed in spinning.

While some of the properties may be similar to other thermoplastic starch materials, other properties may differ markedly from typical starch-based materials. For example, the density of NuPlastiQ materials is particularly high, e.g., greater than 1 g/cm³, at least 1.1 g/cm³, at least 1.2 g/cm³, or at least 1.25 g/cm³, (e.g., the 1.4 g/cm³, as shown above in Table 1). Various of the other properties may also differ substantially from superficially similar appearing starch-based polymeric materials. The NuPlastiQ materials have a low water content, as described. As this material absorbs moisture, it exhibits plastic behavior and becomes flexible. When removed from a humid environment, the material dries out and becomes stiff again (e.g., again exhibiting less than about 1.5% water content). Any moisture present in NuPlastiQ (e.g., in pellet form) may be released in the form of steam during processing. As a result, thin fibers, nonwoven webs or other articles produced from the contemplated starch-based materials may exhibit even lower water content, as the thermoplastic diluent material typically will include no or negligible water, and substantially all of the water in the starch-based polymeric material may typically be released during manufacture of a desired article.

Low water content in any starch-based material can be important, as significant water content can interfere with the ability to process the composition at elevated temperatures. While Applicant has observed relatively hydrophobic characteristics for films of blends including NuPlastiQ (e.g., as determined by dyne pen testing), the present composite fibers appear to exhibit more hydrophilic characteristics, which can be advantageous for applications where wettability or absorbency would be desirable (e.g., diapers, feminine hygiene pads, etc.). Such characteristics have been observed with fibers including 25% NuPlastiQ, and may be provided in fibers including more or less NuPlastiQ, within any of the ranges described herein.

Where there are differences in hydrophobicity of materials that may be included in a multi-component or bicomponent (i.e., "bico") fiber, it is of course also possible to separate phases or components in multi-component, or bicomponent (i.e., "bico") fibers, where a sheath may be of one composition, and the core of another composition. Other bicomponent geometries are of course also possible, and can similarly provide for differences in composition in the different fiber component geometries (e.g., segmented pie fibers, islands in a sea fibers, etc.). In such bicomponent fibers one or both of the locations (e.g., sheath vs. core, islands vs. sea, etc.) may include the starch-based polymeric material, while the other location may similarly have desired compositional characteristics (e.g., it may include the starch-based material at a higher or lower fraction compared to the other bicomponent fiber location, or it may include no starch-based material at all).

It is particularly advantageous to be able to form bicomponent fibers where at least one of the geometric structures of the bicomponent fiber (e.g., sheath, core, etc.) comprises the starch-based polymer. For example, it is surprising and advantageous that the present very high viscosity starch-based materials can be extruded through a small diameter spinneret die to form homogenous standard fibers as described herein. It is even more surprising that such very high viscosity starch-based materials can be extruded through an even thinner geometry, e.g., such as that associated with a sheath/core or other bicomponent fiber geometry. Figures showing such sheath/core bicomponent fibers that were formed, with the starch-based material in the core, and a thermoplastic material sheath (e.g., PP, or PLA) are shown in FIGS. 10-17. In other embodiments, the location of materials could be reversed, e.g., the starch-based polymer could be present in the sheath, with the thermoplastic material in the core, or the starch-based material could be present in both portions (e.g., at different ratios with the thermoplastic material, in each).

Low water content is not achieved in the NuPlastiQ material through esterification or etherification, as is common in some other TPS materials that may include relatively low water content. Such esterification or similar modifications can be expensive and complex to perform. Furthermore, the NuPlastiQ materials that are exemplary of the starch-based materials employable herein have been mechanically, physically or chemically reacted and/or altered, compared to the starting starch and glycerin materials. For example, the starch-based material may be the product of a reactive extrusion process, e.g., under pressure, at extrusion temperatures as described herein. The finished starch-based material may not be recognized as a simple mixture including native starch and glycerin, but has undergone chemical and/or physical changes, including changes in molecular weight relative to the starting starch material. The low water content achievable in the starch-based material may be due at least in part to the physical or chemical alteration of the starch and plasticizer materials into a starch-based thermoplastic polymer, which does not retain water as may be the case with native starch, or other conventional thermoplastic starch materials. In addition, the NuPlastiQ materials resist recrystallization or retrogradation, common with many other thermoplastic starches. For normal thermoplastic starches, they exhibit a tendency to "retrograde" which is exhibited as they recrystallize over time from a relatively amorphous state back into a more crystalline state—the natural state of native starch powder. Most thermoplastic starches recrystallize over time because the thermoplastic starch structure is not sufficiently stabilized to limit the mobility of starch molecules, plasticizer migration and evaporation over time. In contrast, NuPlastiQ does not retrograde or recrystallize to any significant degree. While some starch-based polymeric materials are enzymatically debranched (e.g., increasing the amylose fraction, decreasing the amylopectin fraction), decreasing the molecular weight thereof, the presently described starch-based polymeric materials are not typically enzymatically treated, for debranching, or for other purposes, although they may exhibit decreased (or increased) molecular weight as compared to the starting starch material, and/or increased amylose content. In any case, the resulting molecular weight of the starch-based polymeric material can be relatively high, as described herein.

In addition to the starch-based material being thermoplastic, the high molecular weight NuPlastiQ material may also be solid at ambient temperature, but flows as a liquid when heat, pressure and/or friction are applied. Advantageously, pellets of high molecular weight NuPlastiQ can be used generally the same as any typical plastic resin pellets in standard plastic production processes, including thin fiber spinning processes (spunbond, melt blown, or yarn processes), when blended with diluent thermoplastic polymer as described herein, to achieve the needed rheological characteristics for such spinning.

The starch-based polymeric material may also be strain hardening itself, without the addition of strain hardening components to achieve such. This apparent strain-hardening characteristic of the present NuPlastiQ starch-based materials is in contrast to the characteristics of other starch-based polymeric materials, which seem to exhibit strain thinning characteristics, exacerbating attempts to spin them. For example, a strain hardening material will actually increase in viscosity (flow resistance) over time, even under constant applied shear conditions, while a strain thinning material performs oppositely (decreased viscosity over time). The present starch-based materials may themselves exhibit such strain hardening, without any need to add a separate strain hardening adjunct to the formulation. This feature of strain hardening is important and valuable.

The present starch-based materials appear to exhibit strain hardening characteristics, which greatly aids in the ability to effectively spin such starch-based materials. This characteristic is one of those that appears to be important in allowing such spinning to occur, even with such a very high molecular weight starch-based material.

The starch-based material may be non-toxic, made using raw materials that are all edible. The resulting high molecular weight starch-based material may be water resistant. Applicant has interestingly observed that while films comprising the starch-based material in fractions as described herein (e.g., about 25% by weight) may have a surface wettability that is relatively low (e.g., 34 dynes/cm or less), similar to the hydrophobicity of many typical polyolefins (e.g., polyethylene or polypropylene), in contrast, in fiber form, Applicant has surprisingly observed that NuPlastiQ/PP nonwoven fabrics as formed as described herein may be significantly more hydrophilic, with wettability and absorbency that is greater than comparative standard polypropylene nonwoven fabrics and fibers. Such increased wettability may be advantageous for some applications (e.g. disposable hygiene products such as diapers, feminine hygiene products, and the like).

For example, by way of comparison, typical polyethylene and polypropylene films often have a surface wettability rating of about 29-32 dyne/cm. Blends of NuPlastiQ with such a polyolefin, in film form, may exhibit similar wettability, having a wettability value under dyne testing (e.g., measured according to DIN 53394/ISO 8296) of less than 40 dyne/cm, less than 38 dyne/cm, less than 36 dyne/cm, or less than 34 dyne/cm. As noted above, although Applicant may not fully understand why, the fiber forms of such blends as described herein appear to be considerably more hydrophilic (e.g., surface wettability of greater than 34 dyne/cm, greater than 36 dyne/cm, greater than 38 dyne/cm, or greater than 40 dyne/cm).

Similar to paper, NuPlastiQ does not typically undergo biodegradation under typical storage conditions, even in relatively humid conditions, as the other conditions typical of an anaerobic digester, industrial compost or similar disposal environment containing the particular needed microorganisms are not present. Of course, where such conditions are present, not only does NuPlastiQ biodegrade, but significant portions of otherwise non-biodegradable plastic materials blended therewith (e.g., polypropylene) surprisingly have been shown to biodegrade as well. Extensive evidence of such is described in Applicant's other applications, already incorporated herein by reference.

The starch-based material may be substantially amorphous. For example, raw starch powder typically has an approximately 50% crystalline structure. Many thermoplastic starch materials similarly have relatively high crystallinity. By way of example, the starch-based material used as described herein may have a crystallinity of less than about 40%, less than about 35%, less than about 30%, less than about 25%, less than about 20%, less than about 15%, less than about 10%, less than 9%, less than about 8%, less than 7%, less than about 6%, less than about 5%, or less than about 3%. Any suitable test mechanism for determining crystallinity may be used, e.g., including but not limited to FTIR analysis, X-ray diffraction methods, and symmetrical reflection and transmission techniques. Various suitable test methods will be apparent to those of skill in the art.

As described herein, blending of the starch-based material with a plastic material (e.g., the thermoplastic material having a higher melt flow index, selected to dilute and further plasticize the starch-based material) can result in not just the starch-based material being rapidly biodegradable, but non-biodegradable thermoplastic materials included in the blend actually become significantly more rapidly biodegradable as well (even where the high melt flow index thermoplastic material alone is not significantly otherwise biodegradable). Such results of course do not occur within previously reported blends. Such results have been documented when blending at least with NuPlastiQ. It is believed that the highly intimate blending of the starch-based component into the other plastic material, as well as other factors, may allow such to occur.

Without being bound to any particular theory, it is believed that the starch-based material (e.g., particularly in the case of NuPlastiQ), may interrupt the hygroscopic barrier characteristics of the polypropylene or other non-biodegradable plastic materials in a way that intimately blends the two together, and allows microorganisms to degrade the arrangements and linkages of otherwise non-biodegradable plastic molecules of the blend, along with the highly intimately dispersed starch-based material. The highly intimate dispersion of very small particles or domains of the starch-based component may also be important in any such mechanism, as microbes quickly encounter the other polymeric material, because the starch particles or domains are so well dispersed. Because of such dispersion, the microbes may continue "munching" on the polymeric material after consuming a given starch-based particle, until they encounter the next adjacent starch-based particle (which may be more easily digested).

In fact, PiFM analysis of such blends shows that the typical separate and relatively pure polyolefin "sea" surrounding starch domain "islands" does not form, but there is starch material even within the polyolefin "sea", and polyolefin within the starch "islands", so that separate, relatively pure domains as exist in conventional starch/polyolefin blends do not form. Additional details relative to such analysis is found in the prosecution history of Applicant's application Ser. No. 15/481,823 (now U.S. Pat. No. 10,919, 203), the prosecution history of which is herein incorporated by reference. Blends of the NuPlastiQ with another thermoplastic resin material exhibit a substantial lack of pure "sea-island" features, in contrast to conventional starches or starch-based materials. Such does not mean that the blend cannot exhibit some heterogeneous morphology characteristics, but rather, that there is starch material even within any polyolefin "sea", and polyolefin within the starch "islands", so that separate, relatively pure domains as exist in conventional starch/polyolefin blends do not form. Such morphology is also believed to occur with other plastics (e.g., polyesters, polystyrene and others) when blended with NuPlastiQ starch-based polymeric materials. By way of theory, the long polymer chains of polypropylene or other non-biodegradable plastic material may be more easily broken by in environments that are active in bacteria and microorganisms, when homogenously blended with the presently contemplated starch-based materials. Subsequently, the microorganisms that exist naturally in a disposal environment (e.g., in an anaerobic digester or industrial compost) can consume the broken molecules so that they are converted back into natural base mineralized components (such as $CO_2$, $CH_4$, and $H_2O$). Even where such articles may be disposed of in an undesirable environment (e.g., litter), biodegradation of non-starch components may be achieved much faster with NuPlastiQ present in the blend. In at least the case of NuPlastiQ, and in testing conducted to date in the form of films, the NuPlastiQ does not seem to promote fragmentation of the macro structure into small pieces, but the articles as formed tend to biodegrade, while appearing to remain substantially intact for much of such process. It is believed that this biodegradation effect is further enhanced, and more consistently achieved, when the starch-based component is intimately and homogenously dispersed, with very small domain sizes, e.g., as described in Applicant's U.S. application Ser. Nos. 16/925,747 and 16/925,705, each of which is herein incorporated by reference in its entirety. While some prior art references may describe blend morphologies where a starch or thermoplastic starch phase is in a discontinuous (or continuous) phase, and the polyolefin or other plastic phase is in the other phase (e.g., a continuous plastic phase, with a discontinuous starch phase, or vice versa), the NuPlastiQ blends may not be so structured, but include starch-based polymeric material in any polyolefin or other plastic resin phase, and the polyolefin or other plastic resin material in the starch-based polymeric material phase.

Biodegradable plastics are converted into natural base component compounds such as carbon dioxide, methane, water, inorganic compounds, or biomass via microbial assimilation (e.g., the enzymatic action of microorganisms on the plastic molecules). Such process is sometimes referred to as "mineralization".

Plastics made from petrochemical feedstocks generally begin life as monomers (e.g., single small molecules that can react chemically with other small molecules). When monomers are joined together, they become polymers ("many parts"), and may be known as plastics. Before being joined together, many monomers are readily biodegradable, although after being linked together through polymerization, the molecules become so large and joined in such arrangements and linkages that microbial assimilation by microorganisms is not practical within any reasonable time frame, in most instances, for numerous materials (e.g., including particularly polyethylene and polypropylene). However, the high molecular weight NuPlastiQ starch-based compositions described in the present invention can impart increased biodegradability to other non-plant based polymers.

Polyolefins such as rigid forms of polyethylene and polypropylene have a high degree of crystallinity and are made by converting monomer molecules (whether petroleum derived or derived from ethanol or other small building block molecules derived from plant sources) into long chain polymers. The bonds created when connecting the monomers to form long polymer chains are strong and difficult to break. Thin fibers and articles formed from such polymeric materials (e.g., polyethylene and polypropylene) are not biodegradable as defined herein, and have significant strength. Of course, there are now available some polymers which can be consumed through microbial assimilation, under certain conditions, and which can be made to be spinnable, (e.g., PLA can be industrially compostable under ASTM D-5338 or ASTM D-6400, and some PLAs can be spun), although such materials are significantly more expensive than polyethylene or polypropylene. Even where a given article is formed from a blend of conventional non-biodegradable plastic material and the conventional thermoplastic starch "TPS" materials described as suitable for spinning (e.g., as described in various references to Kimberly-Clark and P&G), any non-biodegradable plastic component in such formulations does not acquire significant biodegradability characteristics as a result of such blending. For example, only the starch portion or other recognized compostable resin components (e.g., PLA) of the blend are capable of microbial assimilation, where access to such components is not blocked or occluded by a non-biodegradable matrix, which may prevent access to portions of some such components (e.g., as may occur where the blend is of a morphology including a continuous non-biodegradable phase that encapsulates a biodegradable or compostable phase).

The one or more starch-based materials can be present in the mixture of materials in any desired fraction. By way of example, the starch-based material may be included in an amount of at least 0.5%, at least 1%, at least 2%, at least 3%, at least 4%, at least 5%, at least 10%, at least 15%, at least 20%, no greater than 99%, no greater than 95%, no greater than 90%, no greater than 80%, no greater than 70%, no greater than 60%, no greater than 50%, from 2% to 60%, from 5% to 40%, from 10% to 40%, from 20% to 35%, or from 20% to 30%, by weight of the mixture of materials. More than one starch-based material, and/or more than one thermoplastic material specifically selected for its melt flow index or other characteristics may be included in the blend, if desired. Examples of characteristics used to identify an additive or other component for inclusion in the blend may include molecular weight distribution, isotacticity (e.g., isotactic polypropylene), long chain branching, copolymers incorporating polypropylene isomers, and the like.

In at least some of the below examples, at least two thermoplastic materials are included, each exhibiting different melt flow index values. In an embodiment, at least some threshold amount of the high molecular weight starch-based material is included, although it is possible that the article may include another starch-based material that may be of lower weight average molecular weight (e.g., less than 3 million, less than 2 million, or less than 1 million) or have other characteristics that differ from the primary starch-based material. That said, in an embodiment, lower molecular weight starch-based materials may not be intentionally added. Of course, it will be appreciated that starch-based materials exhibit a distribution of molecular weights, and that even the high molecular weight starch-based material itself may include some fraction of lower molecular weight molecules.

The thermoplastic diluent material with which the starch-based material is blended can be present in the mixture of materials in an amount of at least 1%, at least 2%, at least 3%, at least 4%, at least 5%, at least 10%, at least 15%, at least 20%, at least 25%, at least 30%, at least 35%, at least 40%, at least 45%, at least 50%, no greater than 99%, no greater than 95%, no greater than 90%, no greater than 85%, no greater than 80%, no greater than 75%, more typically from 10% to 90%, from 20% to 85%, from 40% to 80%, or from 60% to 80% by weight of the mixture of materials. More than one such thermoplastic material (i.e., combinations of such thermoplastics, each with different melt flow index characteristics) may be included in the blend.

By way of example (e.g., useful in a spunbond process) the blend may include a significant fraction of at least one thermoplastic material selected for its melt flow index of from 50 to 600, from 50 to 150, from 75 to 125 (e.g., 100), or from 400 to 600 (e.g. 500). For example, such a thermoplastic material may be present in the formulation in an amount of at least 5%, at least 10%, at least 20%, at least 30%, at least 40%, such as 40-60% of such, along with additional $2^{nd}$ thermoplastic material having a significantly lower melt flow index (e.g., from 10 to 50, such as 35). Such second thermoplastic material may be present in an amount of at least 5%, at least 10%, or at least 15%, such as from 10% to 30%, or 15% to 25% by weight of the blend. The examples describe such blends, e.g., including 50% of a polypropylene having an MFI of 100 or 500, 21% of a polypropylene having an MFI of 35, 4% of a maleic anhydride modified polypropylene compatibilizer, and 25% of the high molecular weight starch-based polymer. Some examples collectively include 60-80% by weight total of two different diluent high melt flow index thermoplastic polymers (e.g., PP).

Blends formulated for melt blown processing may have similar fractions of a thermoplastic material selected for its melt flow index, but the selected melt flow index value may be higher than for spunbond, due to the more demanding processing associated with a melt blown process. For example, the melt flow index of one of the thermoplastic materials for a melt blown process may be at least 500, from 1000 to 2000 (e.g. 1500 to 1600) g/10 min (e.g., at 230° C. under 2.16 kg, particularly for polypropylene).

Blends formulated for yarn processing may have similar fractions of a thermoplastic material selected for its melt flow index, but the selected melt flow index value may be lower than for spunbond, due to the less demanding processing and strength requirements associated with a yarn process. For example, the melt flow index of one of the thermoplastic materials for a yarn process may be from 50 to 200 (e.g. 50 to 150, 75 to 125, such as about 100 g/10 min at 230° C. under a load of 2.16 kg). The same masterbatch material (e.g., including a 35 MFI diluent thermoplastic material) may be used for spunbond, melt blown, or yarn, with a principal difference being in the MFI of the diluent thermoplastic material that the masterbatch material is blended with. In any case, it will be apparent that the overall principle is to provide the resulting formulation with low enough BPI shear viscosity (as described below) to run through the given fiber spinning system (spunbond, melt blown, or yarn), while avoiding onset of melt flow instability within those portions of the process exhibiting the highest shear (e.g., at the spinneret). While use of the same masterbatch formulation may be advantageous, e.g., the ability to use a single masterbatch for any of such processes, it will be appreciated that any of a variety of masterbatches could be provided, e.g., where the starch-based polymeric material is blended with any desired MFI diluent thermoplastic material in the masterbatch (e.g., 35 MFI, 100 MFI, or other).

A compatibilizer may optionally be present in the mixture of materials, and is typically provided as a component of the masterbatch, although it could alternatively be provided separately. The compatibilizer can be a modified polyolefin or other modified plastic, such as a maleic anhydride grafted polyolefin (e.g., a maleic anhydride grafted polyethylene, a maleic anhydride grafted polypropylene, a maleic anhydride grafted polybutene, a maleic anhydride grafted polyolefin copolymer, a combination of any of the foregoing, etc.). The compatibilizer can include an acrylate based co-polymer. For example, the compatibilizer can include an ethylene methyl acrylate co-polymer, an ethylene butyl-acrylate co-polymer, or an ethylene ethyl acrylate co-polymer. The compatibilizer can include a poly(vinylacetate) based compatibilizer. In an embodiment, the compatibilizer may be a grafted version of one of the thermoplastic diluent materials (e.g., maleic anhydride grafted polypropylene where the plastic material is polypropylene) or a copolymer (e.g., a block copolymer) where one of the blocks is of the same monomer as the thermoplastic material (e.g., a styrene copolymer where the thermoplastic material is polystyrene or ABS). Selection of a particular compatibilizer often depends on the identity of the thermoplastic diluent resin materials included in the blend, and the compatibilizer (if even present) can be selected to provide good compatibility results between the high molecular weight starch-based material and whatever particular thermoplastic diluent material(s) are being used.

If present, the final blend may include at least 0.5%, at least 1%, at least 2%, at least 3%, at least 4%, at least 5%, no greater than 50%, no greater than 45%, no greater than 40%, no greater than 35%, no greater than 30%, no greater than 25%, no greater than 20%, no greater than 15%, no greater than 10%, no greater than 9%, no greater than 8%, no greater than 7%, no greater than 6%, from 0.5% by weight to 12%, from 2% to 7%, or from 4% to 6% by weight of a compatibilizer. In some embodiments, no such compatibilizer will be needed. The masterbatch may include double, or another multiplier, relative to such amounts, depending on the blend ratio of the masterbatch to the thermoplastic diluent material with which it is blended. For example, where the final blend may be desired to include 4% compatibilizer, the masterbatch may include 8% compatibilizer, which is to be downblended at a 1:1 ratio.

One or more additional "active" additives as known to be useful in the plastics' industry can be included in the mixture of materials in an amount of at least 0.5%, at least 1%, at least 1.5%, at least 2%, at least 2.5%, at least 3%, at least 4%, of no greater than 10%, no greater than 9%, no greater than 8%, no greater than 7%, no greater than 6%, no greater than 5%, from 0.2% to 12%, from 1% to 10%, from 0.5% to 4%, or from 2% by weight to 6% by weight of the mixture.

By way of example, a spunbond, melt blown, yarn or other spinning process for forming an article may include heating the mixture of materials. The viscosity of the present starch-based materials has been observed to be particularly sensitive to temperature. For example, even though the high molecular weight starch-based materials exhibit viscosity characteristics that are about an order of magnitude greater than what is required to spin conventional starch materials, Applicant has found that this viscosity can be reduced through a combination of actions, including, but not limited to selecting an appropriate process temperature at which the extrusion and spinning should occur.

In an implementation, the mixture of materials can be heated to a temperature above the melting point of the polypropylene or other diluent thermoplastic polymers of the blend. For example, many polypropylenes may melt at or above about 160° C., while many polyethylenes may melt at or above about 110° C. By way of example, the temperature may be at least 130° C., at least 140° C., at least 150° C., at least 155° C., at least 160° C., at least 165° C., at least 170° C., at least 175° C., at least 180° C., at least 185° C., no greater than 250° C., no greater than 230° C., no greater than 225° C., no greater than 220° C., no greater than 210° C., no greater than 205° C., no greater than 200° C., no greater than 195° C., from 180° C. to 210° C., from 185° C. to 205° C., or from 185° C. to 200° C. (e.g., 190° C. or 195° C.). While typical polypropylene processes may heat to about 230° C., such may be too high for the present compositions, where it is desired to minimize thermally induced degradation of the starch-based polymeric material. As such, in at least some embodiments, the temperature of the spinning system may not exceed 210° C., or even 200° C. One might think such lower temperatures would make spinning more difficult, as viscosity drops with temperature, although Applicant has found spinning possible, and even advantageous, at such lower temperatures, to minimize degradation of the starch-based polymeric material. As described herein, Applicant has also found that such temperatures are sufficient to provide the needed viscosity and other rheology characteristics for fiber spinning to be possible.

Heating of such materials may be within a multi-stage extruder, which heats the mixture of materials to a given temperature in each extruder stage, where progressive stages are heated to higher temperature than the preceding stage, e.g., as will be apparent to those of skill in the art. In an embodiment, the temperature of the first stage of such extruder for the blend where heating begins may be in the same range as the temperature of the starch-based material (e.g., NuPlastiQ) in the reactive extrusion process in which it was manufactured.

As noted, it can be important to ensure that the processing temperature at which fiber formation occurs is not so high as to be above a degradation temperature of the starch-based polymeric material. As noted, heating can be used to decrease the viscosity of the formulation, and the starch-based materials employed herein exhibit sharp reductions in viscosity with increasing temperature, which greatly aids in ensuring that it is possible to spin fibers at commercial line speeds, and accompanying high shear rates (e.g., typically ~1000 sec$^{-1}$ and higher in the spinneret), without the composition entering melt flow instability.

For example, shear stress is equal to melt (shear) viscosity times shear rate, and it is important that the applied shear stress be maintained below the critical shear stress of the formulation, in order to be able to spin fibers, e.g., at typical commercial spinneret shear rates of 1000 sec$^{-1}$ and higher. Typical resins (e.g., polypropylene) that are suitable for spinning exhibit critical shear stress values of about 100 kPa, above which severe problems occur, making usable fiber formation impossible. A few resins exhibit more favorable critical shear stress values of up to perhaps 300 kPa, providing additional latitude when engineering a system, to ensure that the critical shear stress is not exceeded. The presently employed starch-based polymeric materials appear to exhibit critical shear stress values that are higher than the typical 100 kPa limits, and may be as high as 300-400 kPa, offering additional latitude in the engineering of a system, which may allow for higher line speeds while still maintaining the system below the applicable critical shear stress. Even when blended in a masterbatch with a diluent material having relatively lower critical shear stress, the critical shear stress of the masterbatch including the starch-based polymeric material may still be greater than 100 kPa, greater than 125 kPa, such as about 200 kPa. Such a material is a very useful additive, for increasing critical shear stress of a formulation being processed under high shear conditions.

In any case, the mixture of materials including the thermoplastic diluent material and the starch-based material can be heated in one or more chambers of an extruder. In some cases, one or more chambers of the extruder can be heated at different temperatures. The speed of one or more screws of the extruder can be at any desired rate. In an embodiment, the system may be configured as a single screw extruder.

Figure 21:
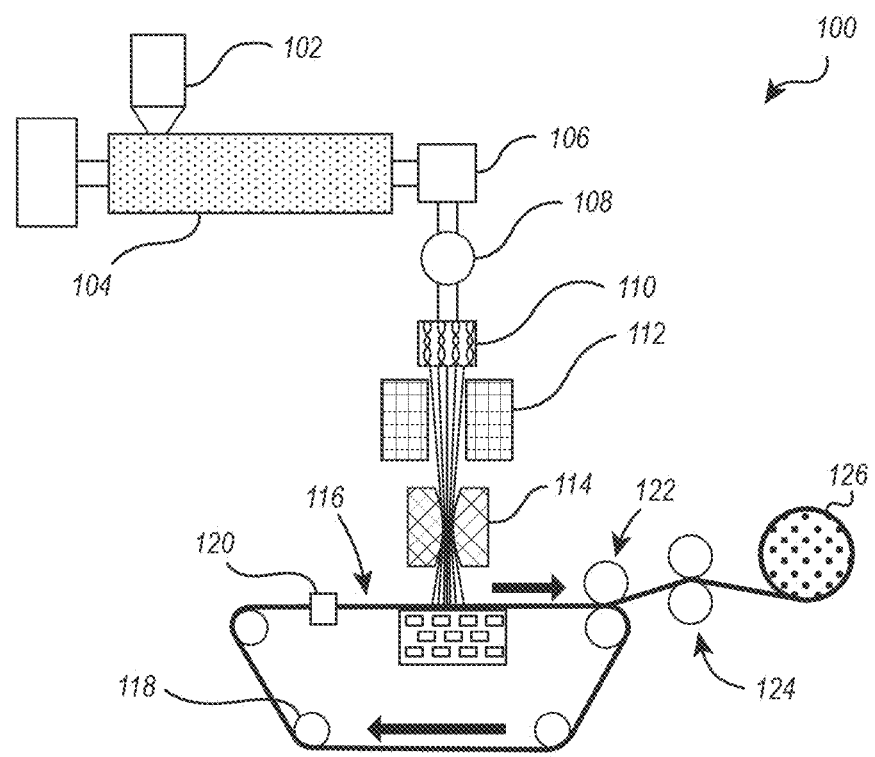
FIG. 21 schematically illustrates an exemplary spunbond process.
Figure 22:
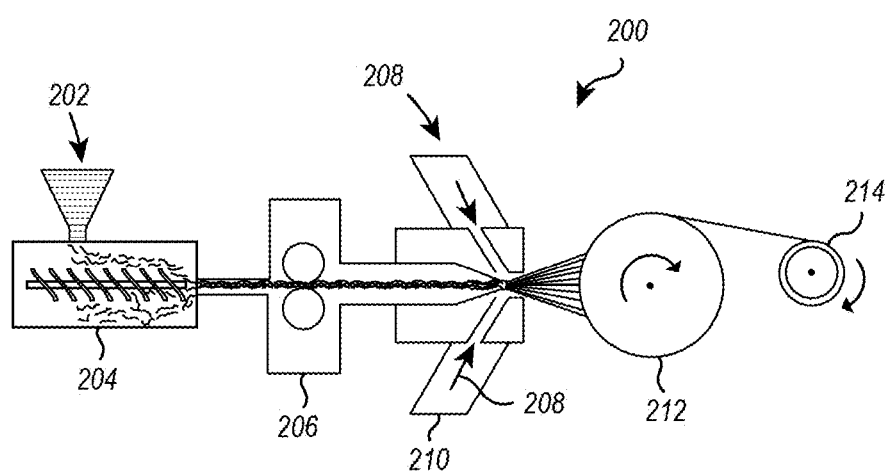
FIG. 22 schematically illustrates an exemplary melt blown process.
Figure 23:
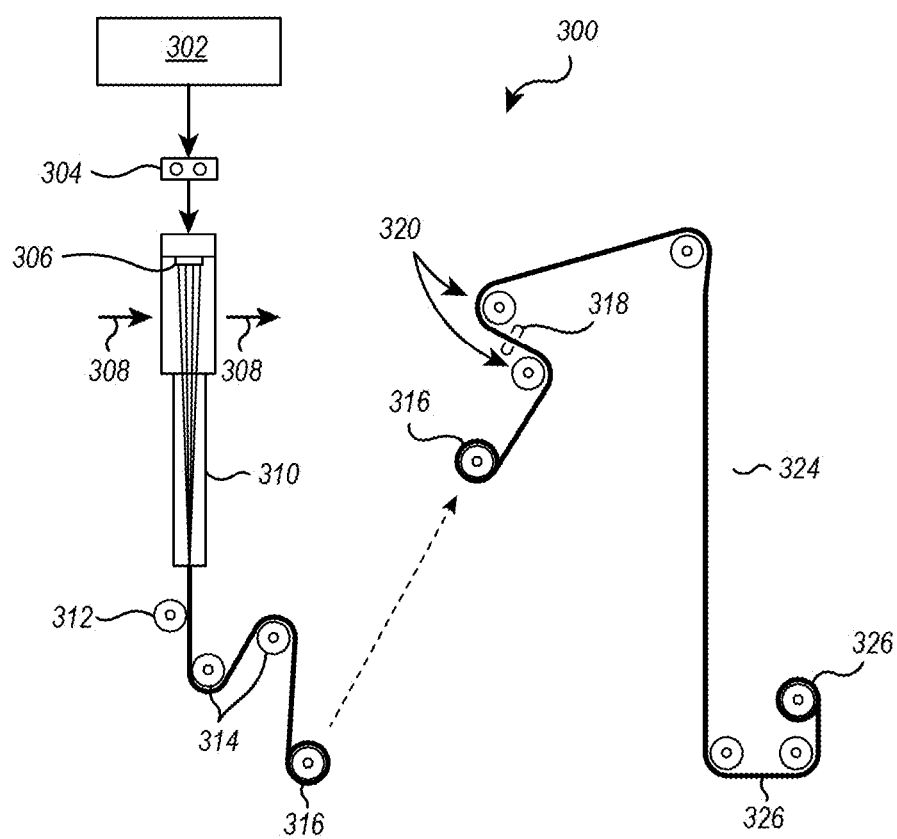
FIG. 23 schematically illustrates an exemplary yarn production process.

A thin fiber is spun using the mixture of materials, e.g., through a spunbond, melt blown, or yarn process. Depending on the process and desired use, the formed fibers may be produced and wound for use as an intermediate material used in manufacture of any of a wide variety of products. Also depending on the process and desired use, the process may convert the formed thin fibers into nonwoven webs of such fibers, which may be bonded together, e.g., through a thermal calendaring or other to produce a nonwoven. There are numerous other possible bonding mechanisms that can be used that will be apparent to those skilled in the art (e.g., including, but not limited to needle punching, hydroentangling, through-air-bonding, chemical adhesive bonding, etc.). Such processes may be used to bond fibers of an individual ply or layer together, or may also be used to bond separate plies or layers together, e.g., when forming a multi-ply or multi-layer composite structure, which may incorporate different nonwoven materials in different layers or films. FIGS. 21-23 described hereafter schematically illustrate exemplary spunbond, melt blown, and yarn processes.

Where a nonwoven is formed, the nonwoven web can be comprised of a single layer or multiple layers. The weight (e.g., basis weight) of such nonwoven layers or webs may be within any desired range. Exemplary weights often range from 10 g/m$^2$ (gsm) to 800 gsm, from 10 g/m$^2$ (gsm) to 500 gsm, from 10 g/m$^2$ (gsm) to 300 gsm, from 10 g/m$^2$ (gsm) to 150 gsm, or from 10 to 100 gsm. Light weight nonwovens may be particularly useful, e.g., from 10-20 gsm.

When subjected to biodegradation testing (e.g., under any applicable ASTM standard, such as ASTM D-5511, ASTM D-5526, ASTM D-5338, or ASTM D-6691), the articles described herein, may exhibit significant biodegradation. Under such testing, and within a given time period (e.g., 180 days, 365 days (1 year), 2 years, 3 years, 4 years, or 5 years, the articles may show substantial biodegradation of the total polymeric content, including typically non-biodegradable polymer components. Articles made from the compositions of this invention may show biodegradation that is greater than the high-molecular weight starch-based polymeric material content thereof, as a result of the thermoplastic material(s) also biodegrading. Such results are novel, in that all prior art blends including non-biodegradable plastic material (e.g., polypropylene) and starch-based materials known to Applicant exhibit biodegradation values that are always no more than (typically less than) the starch-based material content of the blended material. For example, materials such as those described in the Kimberley-Clark or P&G patent literature that include polypropylene do not exhibit biodegradation of the polypropylene portion thereof. The same is true of course, where such literature describes starch blends including other polymers recognized to not be biodegradable. Of course, some such references describe the use of recognized biodegradable or compostable polymers (e.g., PLA), to improve biodegradability of the articles. The present invention addresses biodegradability in an entirely different way, rendering the polypropylene and similar "inert" polymers susceptible to microbial assimilation. Of course, it is also within the scope of the present invention to incorporate or otherwise use PLA, PBAT or other more "green" polymers in the blend, e.g., as the thermoplastic material having particular selected melt flow index values. Biodegradation of polypropylene such as that included in the current blends has been confirmed by various third party testing using industry recognized respirometry-based biodegradation tests (e.g., ASTM D-5338, ASTM D-5526, ASTM D-5511, ASTM D-6991).

Particularly when subjecting the articles to testing simulating biodegradation under anaerobic digester or industrial compost conditions for 180 days, 365 days (1 year), 2 years, 3 years, or 5 years, the biodegradation can be greater than the weight percent of starch-based materials within the article, and where no other recognized biodegradable materials are included therein. In other words, inclusion of the described starch-based materials can result in at least some biodegradation of the other thermoplastic material(s) (which materials alone may not significantly biodegrade, absent the starch-based material).

When subjected to biodegradation testing, an article made from the compositions of this invention having an amount of starch-based material and the other thermoplastic material as described herein can exhibit excellent biodegradation. For example, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or even at least 95% of the non-starch-based material (e.g., the "other" plastic material, such a polypropylene, another polyolefin, or other plastic that is non-biodegradable on its own) may biodegrade over a period of at least about 1 year, at least about 2 years, at least about 3 years, or at least about 5 years when tested under any of ASTM D-5338, ASTM D-5526, ASTM D-5511, ASTM D-6991. Such biodegradation is particularly remarkable and advantageous.

With increased time, the amount of biodegradation can be very high, such that in at least some implementations, substantially the entire article biodegrades, e.g., biodegradation of at least about 85%, at least about 90%, at least about 95%, or at least equal to biodegradation of a positive control (e.g., cellulose) under the given test standard. Such results may be achieved within 180 days, or 365 days (1 year), within 2 years, within 3 years, within 5 years, or other period. Biodegradation may be considered to be substantially complete where the amount of biodegradation in the article is at least 90% of that achieved in a cellulose positive control, tested under the same conditions, for the same time period.

FIG. 21 schematically illustrates an exemplary spunbond process 100. Those of skill in the art will recognize that various components of the system may vary, and that the illustrated system and process 100 is simply exemplary. As shown, the polymer blend can be fed into extruder 104 through one or more hoppers 102. As described herein, the various components of the formulation (e.g., the starch-based polymeric material and the thermoplastic diluent plasticizing polymers (e.g., polypropylenes having desired MFI values) may be provided in a single hopper, through different hoppers, etc. As described herein, the starch-based polymeric material may be provided as a masterbatch (e.g., available from Applicant), in which the starch-based polymeric material is already pre-blended with at least one thermoplastic diluent material, and optionally a compatibilizer. Such a masterbatch may be further blended with additional thermoplastic diluent polymer in extruder 104.

The homogenously blended formulation for spunbonding may pass through a filter 106, to remove any undesirable contaminants. At 108 is provided a pump, which conveys the heated formulation (e.g., 195° C.) to the spinneret 110 where fibers are formed, because of the specifically provided rheological properties of the formulation as described herein. At 112 is shown the quenching portion of the system. At 114 is where the fibers are attenuated, for deposition onto a substrate (e.g., a conveyor belt) 116, to form the desired nonwoven from the fibers as spun from the spinneret, quenching portion, and attenuation portions of the system. The forming section associated with substrate 116 may include one or more guide rollers 118 and edge guides 120, to aid in forming the nonwoven web from the spun fibers. After formation, the nonwoven web may pass through compaction rollers 122 and calendaring rollers 124, after which the formed spunbond nonwoven web is taken up on winder 126.

As described above and in the Examples, the formulation used in a spunbond process such as process 100 includes the starch-based polymeric material (e.g., in any weight fraction as described herein, such as from 1%-30%, 5%-30%, 2%-5%, 5%-10%, 10%-20%, or 20%-30% by weight of the formulation blend). The thermoplastic diluent material is specifically selected to ensure that the shear viscosity of the resulting formulation is sufficiently low to be able to run through the system 100, and particularly through the high shear spinneret fiber formation portion of the process, without onset of melt flow instability. As described above and in the Examples, the thermoplastic diluent may include polypropylenes having different MFI values, such as an MFI value of 35, an MFI value of 100, and an MFI value of 500. In an embodiment, the masterbatch may include 50% starch-based polymeric material, 8% compatibilizer, and 42% 35 MFI polypropylene, while the other polypropylenes (e.g., 100 MFI and 500 MFI) are added separately, and blended with the masterbatch in extruder 104. Such examples are merely exemplary, illustrating one possible formulation suitable for use in such a spunbond system and process. By way of further example, the formulation may have a BPI (as described below) of less than 300 Pa·s, and may be processed at 195° C., through a die diameter of 0.35 mm, at 2000 m/min, to produce fibers having a diameter of about 20 μm. Tenacity of such fibers may be at least 1.4 gpd. Multi-structured fibers (such as sheath/core or other geometries as described herein) are of course possible.

FIG. 22 schematically illustrates an exemplary melt blown process 200. Those of skill in the art will recognize that various components of the system may vary, and that the illustrated system and process 200 is simply exemplary. As shown, the polymer blend can be fed into extruder 204 through one or more hoppers 202. As described herein, the various components of the formulation (e.g., the starch-based polymeric material and the thermoplastic diluent plasticizing polymers (e.g., polypropylenes having desired MFI values) may be provided in a single hopper, through different hoppers, etc. As described herein, the starch-based polymeric material may be provided as a masterbatch (e.g., available from Applicant), in which the starch-based polymeric material is already pre-blended with at least one thermoplastic diluent material, and optionally a compatibilizer. Such a masterbatch may be further blended with additional thermoplastic diluent polymer in extruder 204.

The homogenously blended formulation for producing melt blown fibers may pass through a gear pump 206, which conveys the heated formulation (e.g., 205° C.) to the die body 210 where fibers are formed, because of the specifically provided rheological properties of the formulation as described herein. At 208, heated air (e.g., hotter than the polymer formulation, e.g., at 220° C. to 250° C., such as 230° C.) is used to force the polymer melt through the die of die body 210, forming thin fibers which may pass through cooling air (not labeled), and where the fibers are collected on collector 212, and can be taken up on winder 214.

As described herein, such melt blown processes form fibers that are typically smaller than fibers formed in a spunbond process (e.g., 2-4 μm vs. 15-30 μm), and the formulation is subjected to conditions that are more extreme, typically requiring that the thermoplastic diluent materials employed in such a melt blown process be of higher melt flow index value. Melt blown fibers can be directly incorporated into a nonwoven structure, typically with spunbonded layers (SMS), hybrid structures, etc. or wound as a separate layer.

As described above and in the Examples, the formulation used in a melt blown process such as process 200 includes the starch-based polymeric material (e.g., in any weight fraction as described herein, such as from 1%-30%, 5%-30%, 2%-5%, 5%-10%, 10%-20%, or 20%-30% by weight of the formulation blend). The thermoplastic diluent material is specifically selected to ensure that the shear viscosity of the resulting formulation is sufficiently low to be able to run through the system 200, and particularly through the die portion of the process, without onset of melt flow instability, and drawn by the hot air into thin fibers. As described above and in the Examples, the thermoplastic diluent may include polypropylenes having different MFI values, such as an MFI value of 35, and an MFI value of 1550. In an embodiment, the masterbatch may include 50% starch-based polymeric material, 8% compatibilizer, and 42% 35 MFI polypropylene, while the other polypropylene (e.g., 1550 MFI) is added separately, and blended with the masterbatch in extruder 204 (e.g., at a 1:1 or other desired ratio). Such examples are merely exemplary, illustrating one possible formulation suitable for use in such a melt blown system and process. By way of further example, the formulation may have a BPI (as described below) of less than 200 Pa·s, and may be processed at 205° C., through a die diameter of 0.4 mm, to produce fibers having a diameter of 2-4 μm. Multi-structured fibers (such as sheath/core or other geometries as described herein) are of course possible.

FIG. 23 schematically illustrates an exemplary yarn process 300. Those of skill in the art will recognize that various components of the system may vary, and that the illustrated system and process 300 is simply exemplary. As in the other processes, the polymer blend can be fed into an extruder 302 through one or more hoppers. As described herein, the various components of the formulation (e.g., the starch-based polymeric material and the thermoplastic diluent plasticizing polymers (e.g., polypropylenes having desired MFI values) may be provided in a single hopper, through different hoppers, etc. As described herein, the starch-based polymeric material may be provided as a masterbatch (e.g., available from Applicant), in which the starch-based polymeric material is already pre-blended with at least one thermoplastic diluent material, and optionally a compatibilizer. Such a masterbatch may be further blended with additional thermoplastic diluent polymer in extruder 302.

The homogenously blended formulation for yarn formation may be conveyed to a pump 304, which conveys the heated formulation (e.g., 205° C.) to the filter pack spinneret 306 where fibers are formed, because of the specifically provided rheological properties of the formulation as described herein. At 308 is shown inlet air the quenching duct portion of the system. At 310 is shown the spinning duct, and at 312 the spin finish. The fiber exiting the spinning duct 310 (e.g., at 312) in such a yarn process may be relatively thick, e.g., 60 μm, and may be formed at a relatively low line speed (e.g., 650 m/min). At 314 are shown godet rollers, with a take up roller shown at 316. In such a yarn process, this initial portion (left side portion of the process in FIG. 23) results in formation of a yarn fiber that is relatively thick, where the as formed fiber can be drawn down to smaller diameter immediately after initial fiber formation, or later, as shown in the right side portion of the process seen in FIG. 23.

In any case, as shown in FIG. 23, the relatively thick yarn from take up roller 316 can be transferred to the drawing stage of the yarn process, on a supply spool (also labeled 316, as it may simply be one of the filled take up rollers). The relatively thick yarn is conveyed across drawing rollers 320, and through heater 318 (e.g., at 75° C. to 130° C., such as 100° C.), where the yarn is drawn down to a smaller diameter. By way of example, the drawing ratio may be from 2× to 5×, or from 2× to 4× (e.g., 2.8×). Depending on the materials employed, heating tubes (not shown), and a texturing device 324 may be present. By way of example, where a polyamide material is used, such a texturing step may be present. Where the thermoplastic diluent material employed is polypropylene or other similar materials, no texturing may be provided. At 326, the finished yarn is wound on a roller. By way of example, the finished yarn at 326 may have a diameter of about 20 μm, and be produced at a line speed of about 1800 m/min (as compared to the as spun yarn at 60 μm and 650 m/min, which is subsequently drawn). The fiber bundle may be relaxed between the draw godets and the winder by adjusting the speed differential and fiber temperature.

As described above and in the Examples, the formulation used in a yarn process such as process 300 includes the starch-based polymeric material (e.g., in any weight fraction as described herein, such as from 1%-30%, 5%-30%, 2%-5%, 5%-10%, 10%-20%, or 20%-30% by weight of the formulation blend). The thermoplastic diluent material is specifically selected to ensure that the shear viscosity of the resulting formulation is sufficiently low to be able to run through the system 300, and particularly through the spinneret fiber formation portion of the process, without onset of melt flow instability. As described above and in the Examples, the thermoplastic diluent may include polypropylenes having different MFI values, such as an MFI value of 35, and an MFI value of 100. In an embodiment, the masterbatch may include 50% starch-based polymeric material, 8% compatibilizer, and 42% 35 MFI polypropylene, while the other polypropylene (e.g., 100 MFI and/or a blend of 100 MFI and additional 35 MFI PP) is added separately, and blended with the masterbatch in extruder 302. Such examples are merely exemplary, illustrating one possible formulation suitable for use in such a yarn system and process. By way of further example, the formulation may have a BPI (as described below) of less than 600 Pa·s, or less than 500 Pa·s, and may be processed at 205° C., through a die diameter of 0.35 mm, at 650 m/min in the spinning portion of the process, and at 1800 m/min in the drawing portion of the process to produce fibers having a diameter of about 20 μm. Tenacity of such fibers may be at least 2.5 gpd. Multi-structured fibers (such as sheath/core or other geometries as described herein) are of course possible.

IV. Examples

Example 1

An exemplary formulation with ranges for various components is shown in Table 2 below, along with some exemplary rheology characteristics for melt blown, spunbond, and yarn.

TABLE 2

| Component | Function | Amount |
| --- | --- | --- |
| PP (MFI 1) | Matrix | >10% |
| PP (MFI 2) | Other Viscosity modifier (MFI 2 > 1) | >5% |
| random poly(propylene/ethylene) copolymer | Elastic Component | 0-15% |
| Long Chain Branched PP | Strain Hardener | 0-10% |
| High MW PE | Strain Hardener | 0-5% |
| High MW Polyacrylamide | Strain Hardener | 0-1% |
| Maleic Anhydride PP | Compatibilizer | 0-10% |
| High MW NuPlastiQ | Starch-based Component | 1-60% |
| Blend Shear Viscosity at 190° C. and 1000 sec$^{-1}$ | | Generally: <50-125 Pa · s<br>Melt blown: 10-70 Pa · s<br>Spunbond: 50-85 Pa · s<br>Yarn: 75-95 Pa · s |
| Blend Shear Viscosity at 190° C. and 200 sec$^{-1}$ | | Generally: <50-600 Pa · s<br>Melt blown: 30-180 Pa · s<br>Spunbond: 150-225 Pa · s<br>Yarn: 175-600 Pa · s |

Various starch-based polymeric materials were evaluated rheologically for the present application, and one particular starch-based polymeric material was selected for spinning based on measured characteristics. The base starch, or majority starch in the evaluated materials was a corn starch (Corn1 or Corn2). Corn1 is an unmodified starch from native yellow dent corn. Corn2 is a modified corn starch. In the formulation used in the spinning examples described herein, the starch-based polymeric material was formed from just a single starch (Corn2), rather than a mixture of two different starches (Corn1 or Corn2+Potato). The formed starch-based materials exhibited very high weight average molecular weights, e.g., as described herein. In an embodiment the molecular weight (e.g., number average and/or weight average molecular weight) of the starting starch material (e.g., corn starch) may actually be less than the molecular weight of the resulting starch-based polymeric material, after reactive extrusion with the plasticizer, as determined through size exclusion chromatography. In other words, in some cases, the reactive extrusion process may actually result in an increase in average molecular weight, for example with a decrease in polydispersity. By way of example, analysis on Corn2 (a modified corn starch) shows the following molecular weight characteristics.

TABLE 3A

|  | Run 1 | Run 2 |
| --- | --- | --- |
| Mn | 3,410,000 | 2,230,000 |
| Mw | 8,700,000 | 7,190,000 |
| Mz | 28,900,000 | 82,000,000 |

The polydispersity (Mw/Mn) for Run 1 and Run 2 for this modified corn starch material was 2.55 and 3.22, respectively. An exemplary starch-based polymeric material formed from the corn starch of Table 3A and a plasticizer (e.g., glycerin) included the following molecular weight characteristics, shown in Table 3B. The formed starch-based polymeric material had a polydispersity (Mw/Mn) of 1.99. The reported Mz values refer to the "third moment" molecular weight, which has more weighting with regards to higher molecular weights.

TABLE 3B

|  | Starch-Based Polymeric Material |
| --- | --- |
| Mn | 5,370,000 |
| Mw | 10,700,000 |
| Mz | 33,400,000 |

In performing the rheological studies, 190° C. was determined to be a good temperature for the study, being hot enough to melt the polypropylene and other components of the formulation, but low enough to comfortably manage stability (i.e., prevent degradation) of the starch-based polymeric material. Limited additional testing was performed at additional temperatures (e.g., from 180° C. to 205° C.).

On three samples, Cogswell elongation viscosity measurements were taken. Temperature sweep measurements were also run on two other samples. The viscosity versus shear rate for sample 984 is shown in FIG. 1. Sample 984 was formed from Corn1 as the base corn starch, blended with some potato starch (e.g., 30%) The sample was dried for 2 hours at 60° C. to remove any residual water. Two test runs of sample 984 were performed, and the test runs exhibited good reproducibility. As shown in FIG. 1 and the other Figures (e.g., FIG. 7A), the high molecular weight starch-based polymeric material has very high viscosity. As noted above, the starch-based polymeric material used in the spinning examples is formed from Corn2, and exhibited somewhat lower viscosity, although the viscosity characteristics are still at least an order of magnitude higher than those of starch-based materials that have been adapted for thin fiber spinning in the past. Such enormous difference is due (at least in part) to the very high molecular weight of the present starch-based materials. For example, referring to FIG. 1, at a shear rate of 10 sec$^{-1}$, high molecular starch-based material sample 984 exhibits a melt or shear viscosity of over 4,000 Pa·s (e.g., at 190° C.). Although such a low shear viscosity is incredibly high, the material exhibits excellent shear thinning characteristics, as at a shear rate of 200 sec$^{-1}$, the shear viscosity has dropped to about 600 to 700 Pa·s, and at a shear rate of 1000 sec$^{-1}$, the shear viscosity has dropped to about 200 to 300 Pa·s (also at 190° C.). Although this is a significant decrease in viscosity, it is still higher than a desired target of no more than 125, no more than 95 or no more than 50-65 Pa·s at 1000 sec$^{-1}$ (at 190° C.).

From testing the various formulations prepared, it was observed that the rheological behavior of the starch-based materials is dominated by the base corn starch, with Corn1 having considerably higher viscosity than Corn2. That said, in both cases, the weight average molecular weight of the starch-based materials was very high, e.g., over 5 million. Starch-based polymeric materials prepared from both base corn starch materials exhibited generally similar shear viscosity at low shear, as compared to 1 MI (melt index) LLDPE (see FIG. 2), but also exhibited higher shear sensitivity. It was also observed that the flow curves were smooth, and essentially parallel at high shear rates (with perhaps a 3-5× factor difference between the two), but also exhibited a non-linear "tail up" characteristic at shear rates below about 100 sec$^{-1}$. Such a significant non-linearity tail up (where shear viscosity increases even more sharply than the already exponential increase associated with a linear relationship on the logarithmic scale shown in FIGS. 1-2) is unusual, and perhaps unique to the present high molecular weight starch-based materials.

Figure 2:
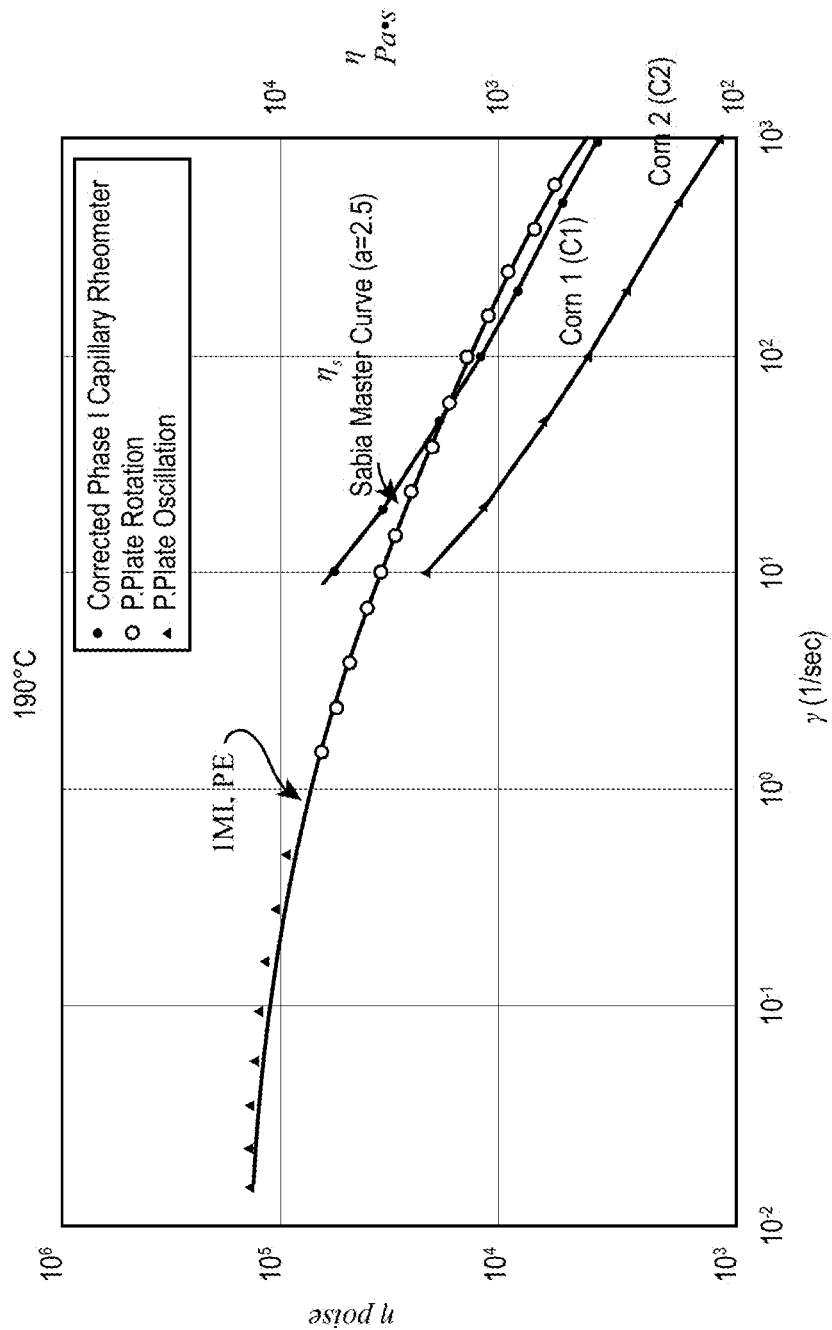
FIG. 2 shows flow curves for various high molecular weight starch-based materials formed from different starting starch materials.

FIG. 2 shows flow curves for both the starch-based material formed from the Corn1 corn starch, as well as the starch-based material formed from the Corn2 corn starch, while also showing the comparative curve for 1 MI PE (1 MI LLDPE). As seen in FIG. 2, the shear viscosity of the starch-based polymeric material formed from Corn2 is significantly lower (e.g., about 3-5 times lower) than that of the otherwise similar material, made from Corn1. As shown in FIG. 2, for example, the shear viscosity of the material formed from Corn2 is about 2,000-3,000 Pa·s at 10 sec$^{-1}$, about 300-400 Pa·s at 200 sec$^{-1}$, and about 100 Pa·s at 1000 sec$^{-1}$. As noted above, the shear viscosity of the material formed from Corn1 is about 6,000 Pa·s at 10 sec$^{-1}$, about 1000 Pa·s at 200 sec$^{-1}$, and about 400 Pa·s at 1000 sec$^{-1}$ (all measurements at 190° C.).

Figure 3:
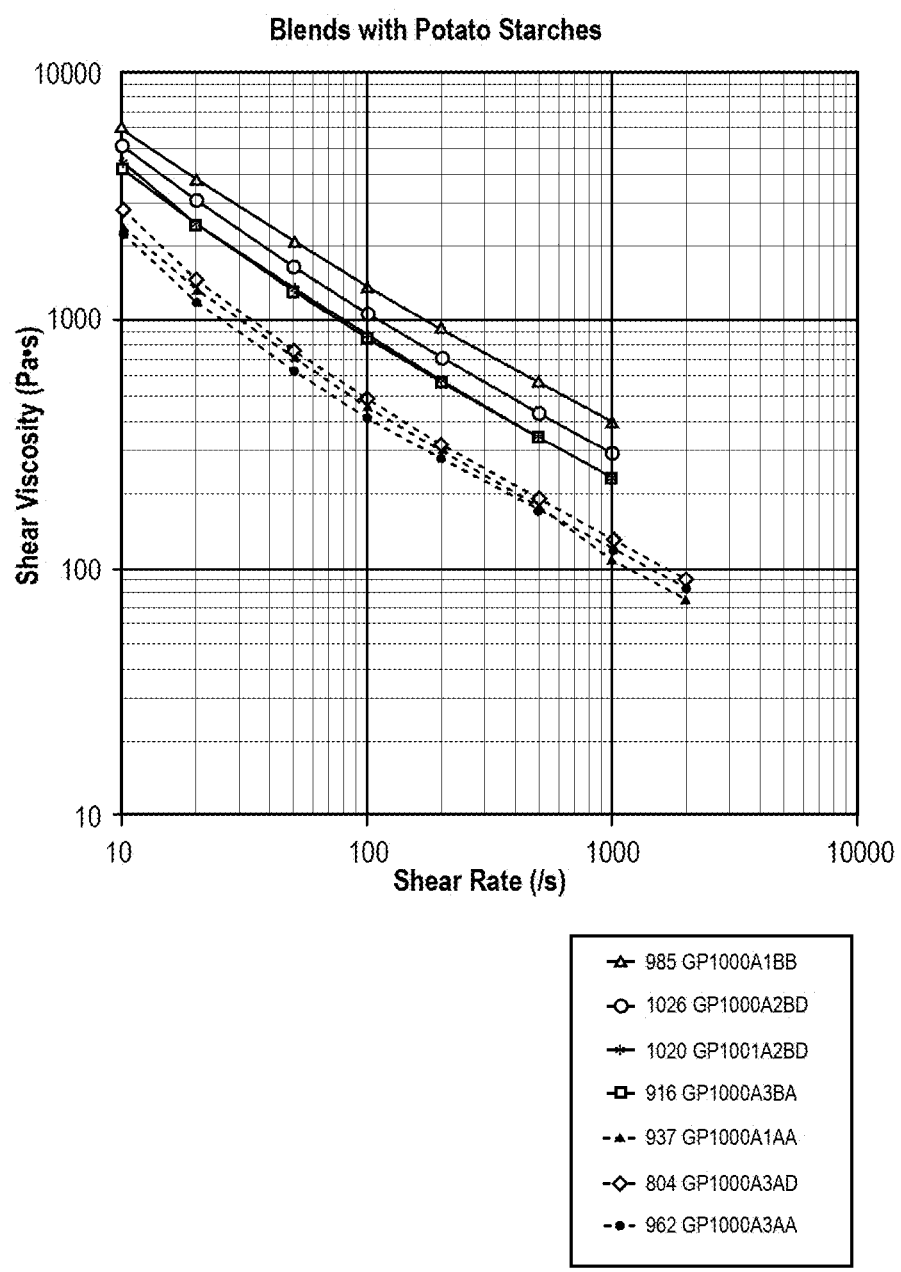
FIG. 3 illustrates additional flow curves for other exemplary high molecular weight starch-based materials that were formed, according to the present invention.

FIG. 3 illustrates additional flow curves for other exemplary starch-based materials that were formed from one or more starches and plasticizer as at ratios as described herein. These curves include flow curves for various examples formed from a single starch or a combination of different starches. The flow curves illustrate how addition of a potato starch to the blend of starches from which the starch-based polymeric material is formed, decreases the resulting viscosity characteristics, as starch content increases. Also shown are the curves for various examples in which Corn2 was the base starch, showing different flow curves for inclusion of varying amounts and/or types of potato starch within the mixture of starches from which the starch-based material was formed. In FIG. 3, sample 985 was formed from corn starch C1, sample 937 was formed from corn starch C2, while the other samples were formed from blends of corn and potato starch. Choice of starch materials used in forming the starch-based material can greatly impact the resulting rheological characteristics.

Figure 4:
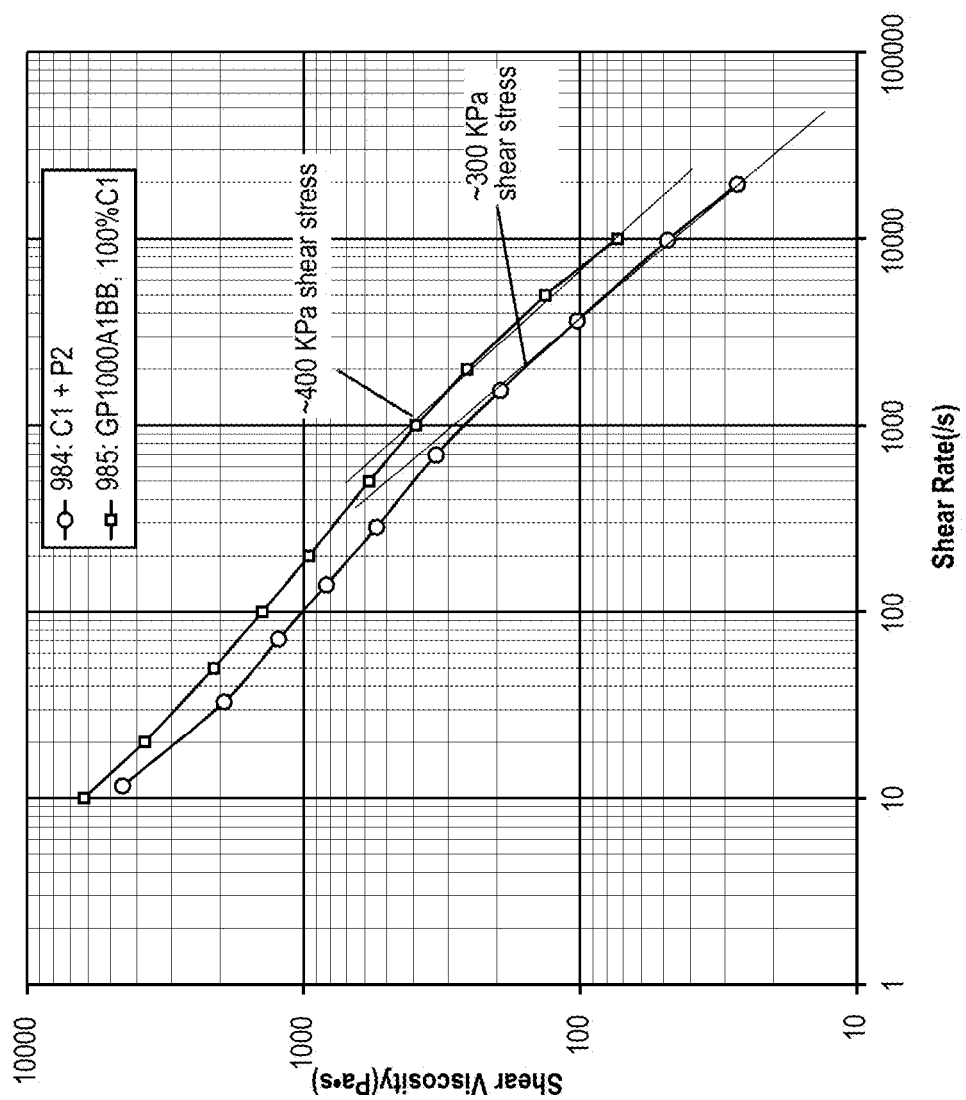
FIG. 4 shows data relative to the melt flow instability characteristics of exemplary prepared high molecular weight starch-based materials.

Referring to FIG. 4, the higher viscosity samples allow exploration of the melt flow instability characteristics of the high molecular weight starch-based material. Note the sharp break or inflection point in the flow curves above 300 kPa, which break is typical of land fracture (i.e., indicative of melt flow instability and the threshold of critical shear stress). Such very high critical shear stress values are also advantageous, and aid in making it possible to spin the present compositions including substantial fractions of the starch-based polymeric material at commercial line speeds. For example, by comparison, polypropylene widely used in spinning thin fibers has a critical shear stress of only about 100 kPa. This characteristic of the present starch-based materials allows deferral or retardation of the onset of melt flow instability as more starch-based material is included in the formulation being spun. Such characteristic also advantageously allows addition of a fraction (e.g., even a small fraction) of the present starch-based materials as an additive to conventional polypropylene or other spinning formulations that exhibit relatively low critical shear stress values (e.g., of about 100 kPa), to effectively increase the critical shear stress of such formulations. Such would allow faster line speeds, etc., which would be another particular advantage offered by the presently disclosed starch-based materials.

For example, one embodiment of the present invention may thus be directed to use of such starch-based materials to increase the critical shear stress of a given spinning formulation, by adding such material in a desired amount. The amount of the starch-based material added may be within any desired range, and does not need to be particularly high, to retard the onset of melt flow instability for the composition. By way of example, the amount of the starch-based polymer added as a critical shear stress elevating agent may be any of the values disclosed herein. In an embodiment, the addition may be relatively small, e.g., less than 20%, less than 15%, less than 10%, less than 5%, etc.

As shown in the Figures, the flow curves for the formed starch-based materials are essentially parallel at shear rates above 100 sec$^{-1}$. Since processing in a spunbond or other fiber spinning system (e.g., extruder, piping, die manifold, etc.) typically involves application of shear rates in the range of 10 to 500 sec$^{-1}$, a shear viscosity at a shear rate of 200 sec$^{-1}$ is fairly representative of the viscosity in such a processing environment. A BiologiQ Processing Index (BPI) based on the viscosity of such components used in the formulation can be calculated or measured at such conditions (e.g., 200 sec$^{-1}$, at 190° C., with a 1 mm die, having a L/D=30), for use as a benchmark, in evaluating various components and resulting formulations. BPI can be a good process control tool. Finally, as the flow curves for the various starch-based materials are generally parallel to one another, this also provides information on die pressure up to the critical shear stress (e.g., τ≥300 kPa). A BPI (in poise or Pa·s) can quickly be calculated by linearly adding the contributions of the components included in the formulation.

Examples of thermoplastic elastomers may include but are not limited to random or block poly(propylene/ethylene) copolymers e.g., comprised primarily of isotactic propylene repeating units with random ethylene distribution therein, SEBS, SBS, SIS, or another styrenic (e.g., block) copolymer.

A flow curve was prepared for a formulation including 50% of a high molecular weight starch-based material with a 35 MFI PP. The high molecular weight starch-based material was formed from a 90/10 mixture of corn and potato starch (e.g., 90% Corn2, 10% Potato1). The formulation had the composition shown below in Table 4.

TABLE 4

| Component | Amount | BPI |
|---|---|---|
| High MW Starch-Based Material | 50% | 293 |
| PP (MFI 35) | 37% | 240 |
| random PE-PP copolymer | 5% | 396 |
| Compatibilizer | 8% | 31 |

The rheological properties of the blend were very similar to those calculated. For example, using the BPI values, a BPI of 259 is calculated.

In order to evaluate the effect of temperature on the starch-based materials, sample 877 (based on Corn2) was run at 180° C., 190° C., and 200° C. A sample formed from Corn2 was also evaluated at 205° C. Table 5 below shows the obtained temperature data for sample 877, another sample formed from Corn2 (without potato starch), and 35 MFI PP.

TABLE 5

| Temperature | Shear Viscosity Sample 877 (at 1000 s$^{-1}$) | Shear Viscosity Corn2 (at 1000 s$^{-1}$) | Shear Viscosity 35 MFI PP (at 1000 s$^{-1}$) |
|---|---|---|---|
| 180° C. | 300 | | |
| 190° C. | 110 | 112 | 93 |
| 200° C. | 50 | | |
| 205° C. | | 34 | |
| 230° C. | | | 65 |

Key materials were selected for blending with the prepared starch-based materials to produce formulations suitable for spunbonding, melt-blowing, and yarn production of thin fibers. In an embodiment, the formulations may be prepared to attain a target of no more than 125, or no more than 95, (e.g., no more than 50-65) Pa·s shear viscosity at 1000 sec$^{-1}$ shear rate (which shear rate is typical of commercial line spinneret process characteristics for at least spunbond processes), and/or no more than 500, 300, 275, 250, 240, 230, 220, 200 190, 180, 170, 160, 150, 140, or 130 Pa·s shear viscosity at a shear rate of 200 sec$^{-1}$ (representative of the other process structures in a wide variety of commercial spinning process). Such evaluations may be at 190° C. As described herein, a yarn process may employ a formulation with a BPI shear viscosity value of less than 600, or no more than 500 Pa·s, a spunbond process may employ a formulation with a BPI shear viscosity value of less than 300 Pa·s no more than 250 Pa·s, or no more than 225 Pa·s, and a melt blown process may employ a formulation with a BPI shear viscosity value of less than 200 Pa·s or no more than 180 Pa·s.

Figure 5:
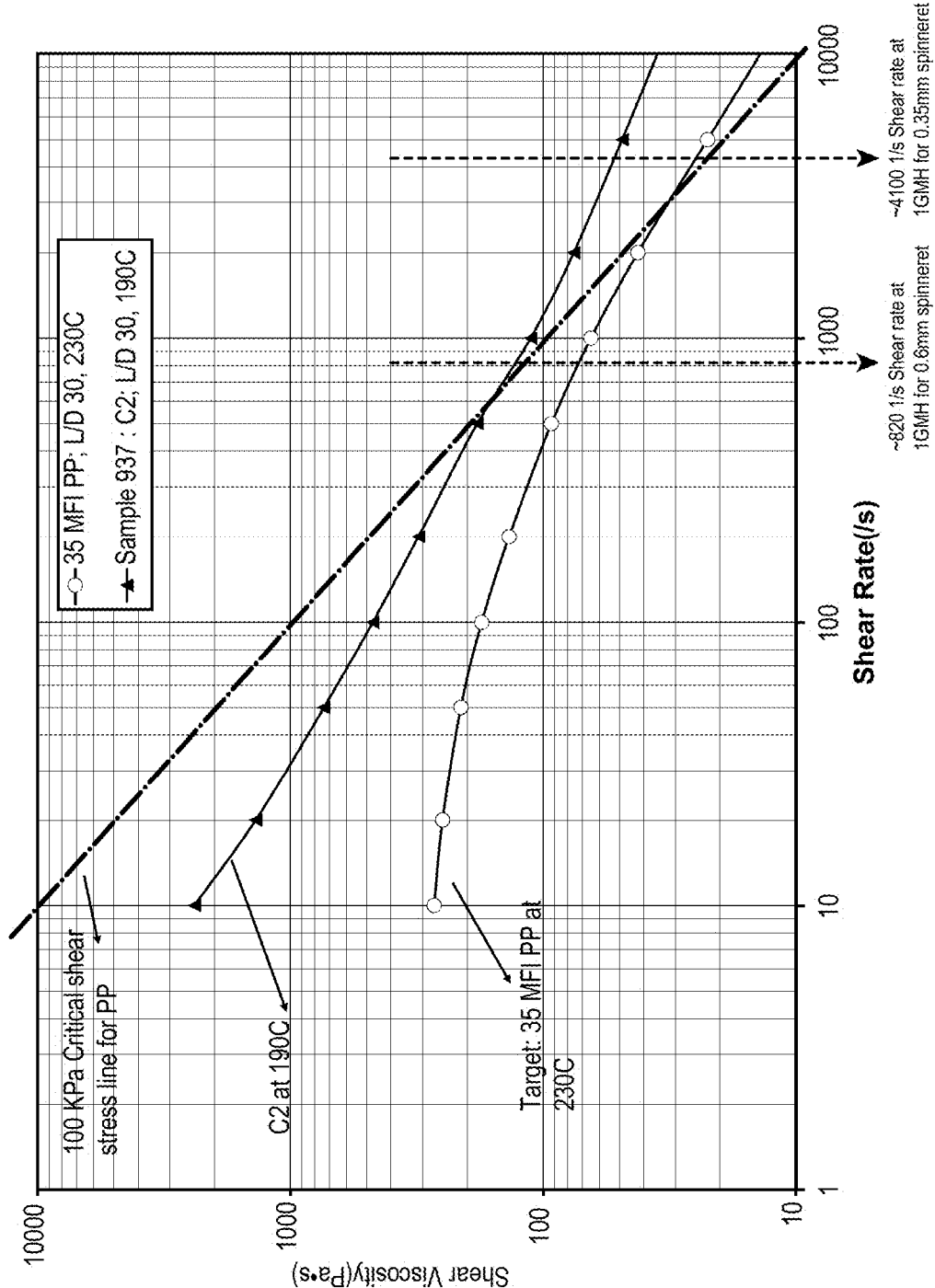
FIG. 5 shows a flow curve for an exemplary high molecular weight starch-based polymer material, as well as a constant shear stress line of 100 kPa (typical onset of instability for PP).
Figure 6:
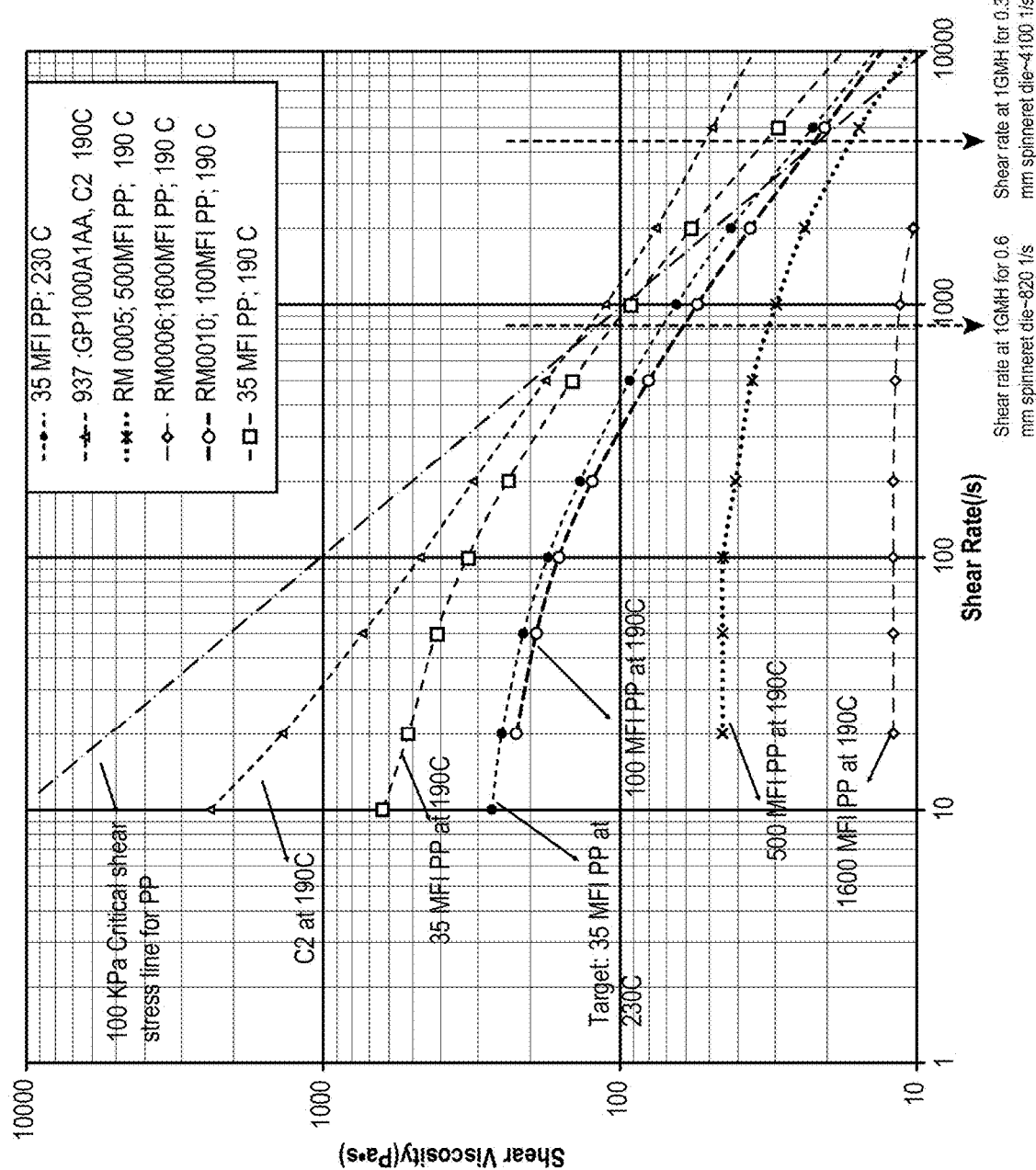
FIG. 6 shows additional flow curves, e.g., for various additives (e.g., PP thermoplastic diluents having varying MFI values from 35 to 1600 g/10 min).

FIG. 5 shows a flow curve for an exemplary starch-based polymer material formed from Corn2, as well as a constant shear stress line of 100 kPa (typical onset of instability for PP). FIG. 5 also shows spinneret hole diameters (e.g., 0.35 mm to 0.6 mm) that may be typical for use as contemplated for various spinning processes as described herein. Shear rates were calculated using a typical throughput rate of 1 g/min per hole. As noted, PP is pushed to the limit in current large volume commercial processes (i.e., high line speeds). FIG. 6 shows additional flow curves, e.g., for various additives (e.g., PP having varying MFI values from 35 to 1600 g/10 min).

Particularly suitable blend materials for spunbond applications may include a combination of 100 MFI and 500 MFI PP. A blend of 35 MFI and 500 MFI PP can also be used as the thermoplastic polymer diluent material having particularly selected melt-flow index characteristics. Table 6 below shows shear viscosity for exemplary blend components at different shear rates (100, 1000, and 10,000 sec$^{-1}$) at 190° C.

TABLE 6

| Component | 100 sec$^{-1}$ | 1000 sec$^{-1}$ | 10,000 sec$^{-1}$ |
|---|---|---|---|
| Corn2 NuPlastiQ | 472 | 112 | 35 |
| 45 MFI PP-PE copolymer | 313 | 117 | 23 |
| 22 MI PP homopolymer | 350 | 104 | 21 |
| 2.5 MI PP homopolymer | 533 | 122 | 26 |
| 35 MFI PP | 350 | 93 | 17 |
| 500 MFI PP | 44 | 30 | 11 |

Table 7 below shows estimated shear viscosity values (at 1000 s$^{-1}$) for different compositions that are a blend (50/50, 35/65, 25/75) of the starch-based material and 35 MFI polypropylene (PP).

TABLE 7

| Temperature | 50/50 Pa · s | 35/65 Pa · s | 25/75 Pa · s |
|---|---|---|---|
| 190° C. | 102 | 100 | 98 |
| 200° C. | 67 | 73 | 77 |
| 205° C. | 58 | 65 | 71 |

As shown in the various flow curves, the starch-based material has very high viscosity at low shear rates (e.g., 100 sec$^{-1}$, 10 sec$^{-1}$, or less), as well as very high viscosity at applicable strain rates. A formulation including 25% of the starch-based material in 35 MFI PP (e.g., the masterbatch) has manageable low shear viscosity, which can be further improved by compounding with a high MFI PP (e.g., 100 to 2000 MFI PP). A formulation including 25% of the starch-based material, 50% 500 MFI PP, 21% 35 MFI PP, and 4% maleic anhydride PP compatibilizer was successfully used to spin thin fibers with fiber diameters <16 μm. This same formulation was used to coextrude bicomponent fibers with 100 MFI PP down to 10/90 sheath/core ratio. Images of such thin fibers formed are shown in the Figures. Bicomponent core/sheath fibers were also formed with high molecular weight NuPlastiQ in the core, with PP, PLA, or PE in the sheath. Different types of core/sheath fibers with up to 22% NuPlastiQ in the core were formed. Fibers were drawn down to less than 20 μm, which fiber sizes are suitable for spunbound nonwoven webs. Nonwoven fabrics having weight basis values of 45-50 gsm and 10-15 gsm were also produced from homopolymer fibers. Fabrics can also be produced from coextruded fibers.

Figure 7:
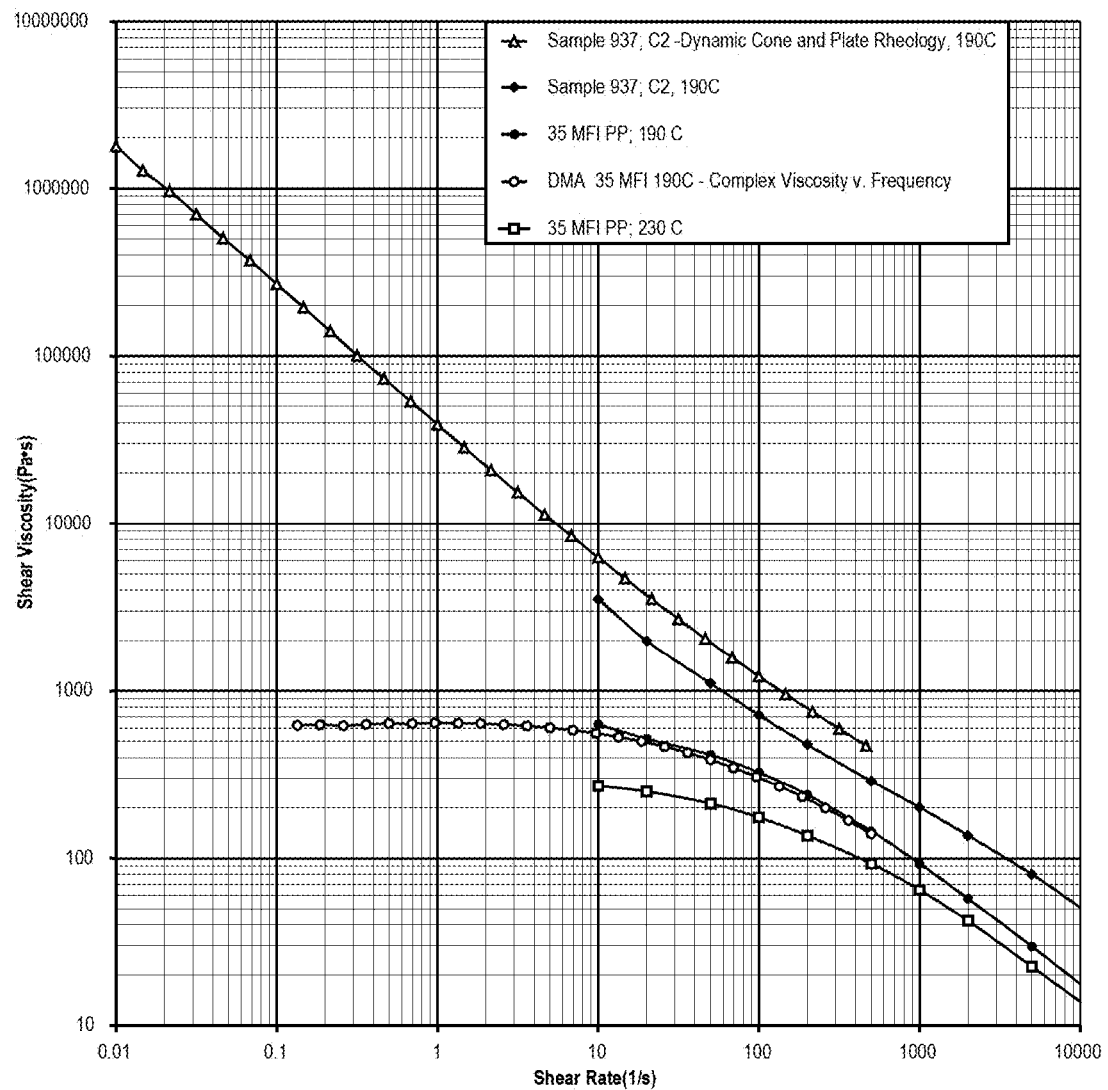
FIGS. 7-7A show additional flow curve data for various prepared and tested formulations.
Figure 7A:
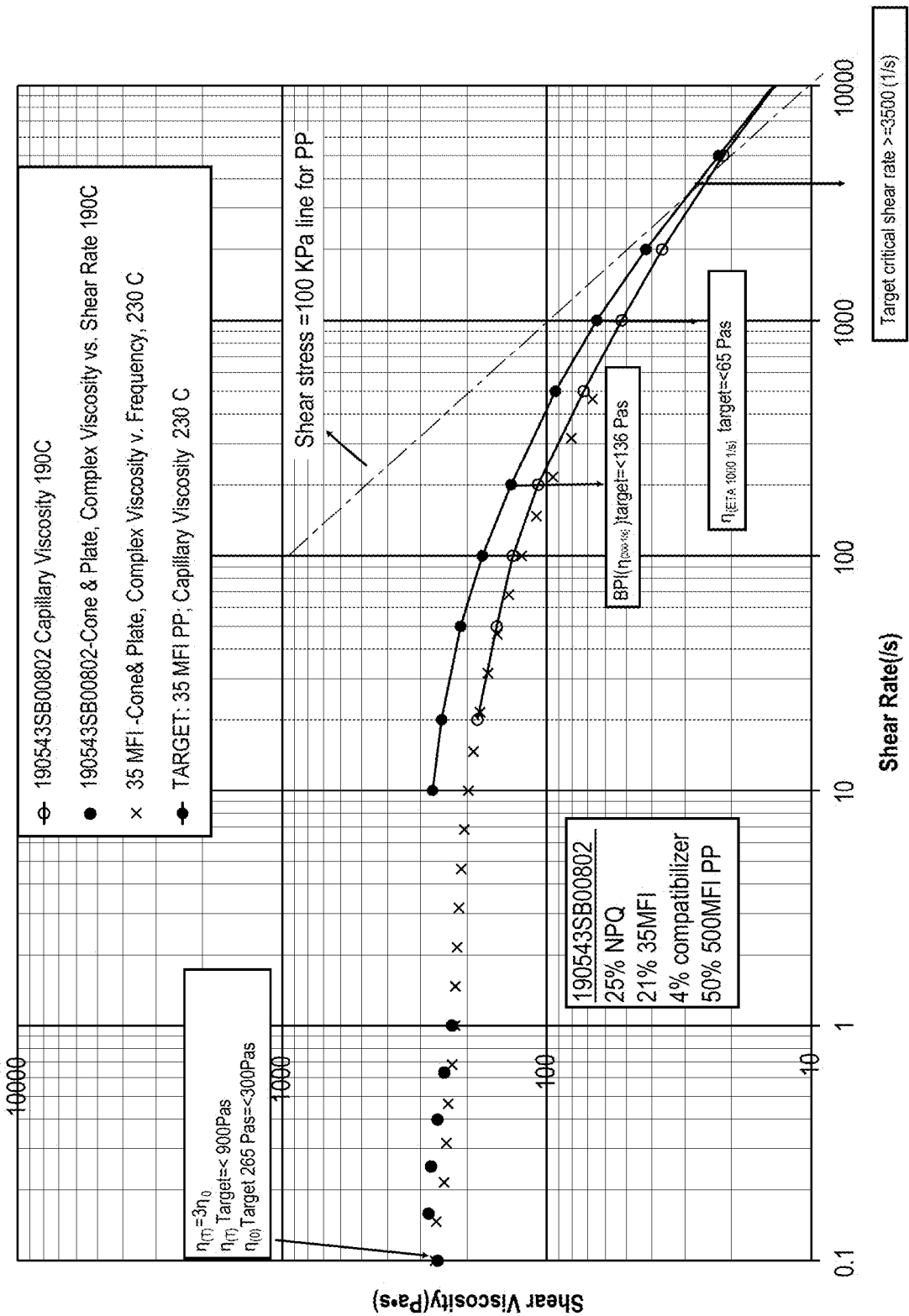

FIGS. 7-7A show additional flow curve data for various prepared and tested formulations. These Figures show that low shear viscosity is high for starch-based polymeric materials as described herein, and that they can be lowered by blending with diluent plasticizers, as described herein. The specific target values illustrated in FIG. 7A are exemplary, initial target points. As described herein, Applicant has successfully spun fibers with formulations having BPI values higher than the target values listed in FIG. 7A.

Table 8 shows process characteristics for various formulations that were used to spin thin fibers.

TABLE 8

| Formulation | Pack Pressure before spinerets (psi) | Min. or Avg. fiber diameter (μm) |
|---|---|---|
| 50% 500 MFI PP + 50% HMW NuPlastiQ Masterbatch[1] | 470 | 15.6 |

TABLE 8-continued

| Formulation | Pack Pressure before spinerets (psi) | Min. or Avg. fiber diameter (μm) |
|---|---|---|
| 50% 500 MFI PP + 50% HMW NuPlastiQ Masterbatch[2] | 500 | 19.0 |
| 50% 500 MFI PP + 50% HMW NuPlastiQ Masterbatch[3] | 540 | 21.0 |
| 50% 100 MFI PP + 50% HMW NuPlastiQ Masterbatch[1] | 827 | 27.0 |
| 50% 100 MFI PP + 50% HMW NuPlastiQ Masterbatch[2] | 830 | 29.0 |
| 50% 60 MFI PP + 50% HMW NuPlastiQ Masterbatch[1] | 1060 | 25.0 |

Figure 8:
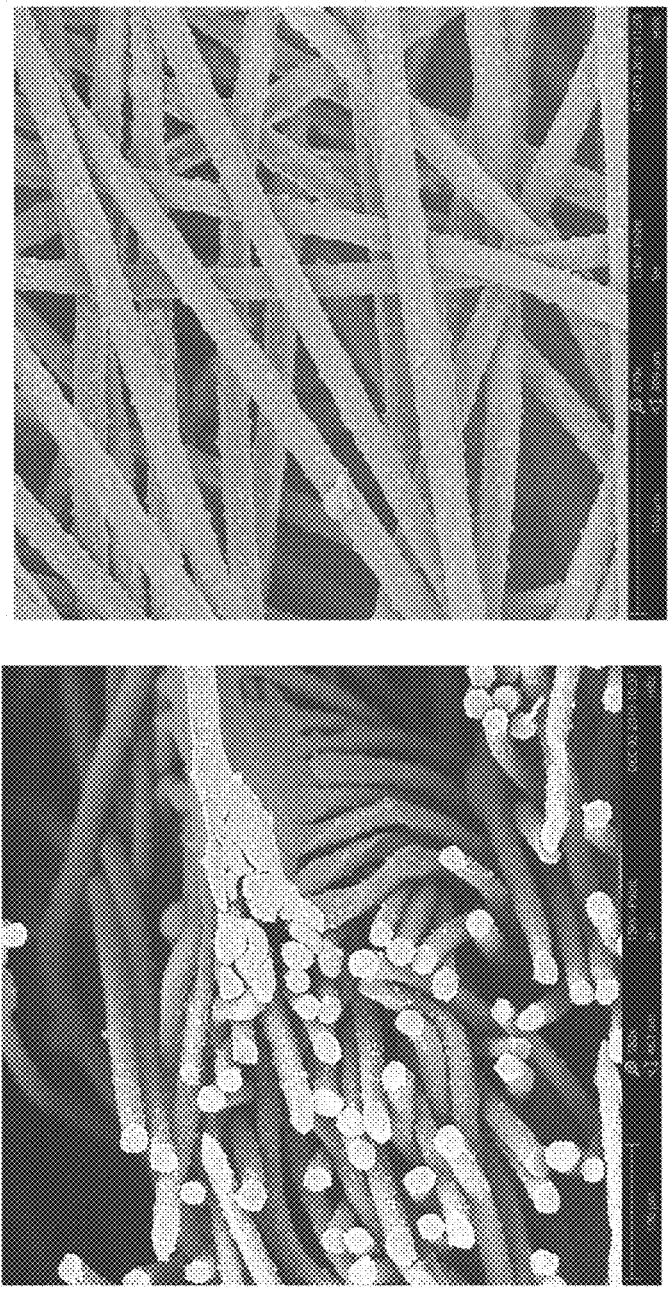
FIGS. 8-9 show exemplary fibers that were formed as described in the examples.
Figure 9:
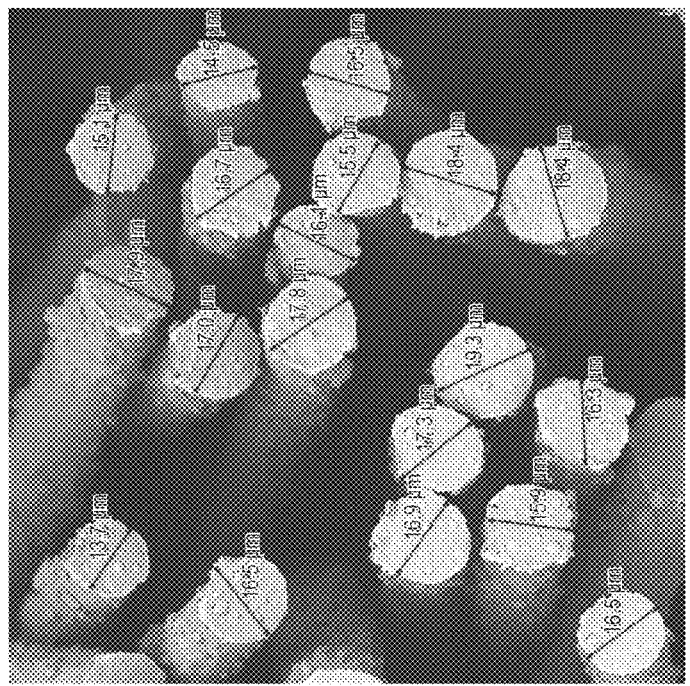
Figure 10:
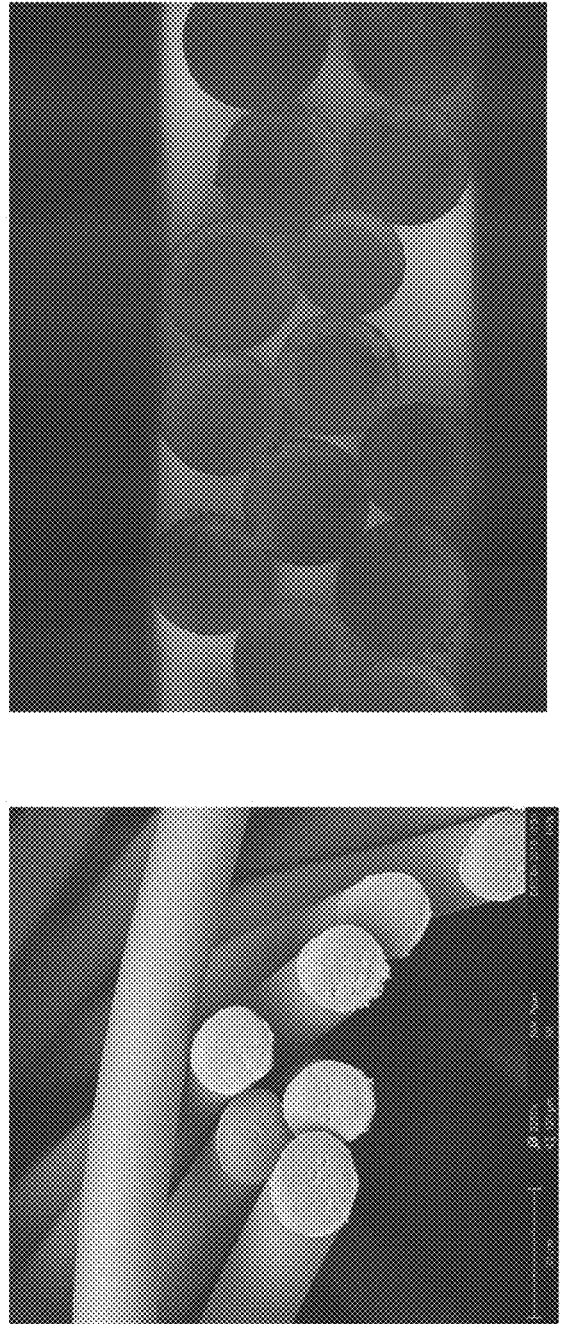
FIGS. 10-17 illustrate various bicomponent fibers that were formed as described in the examples.
Figure 11:
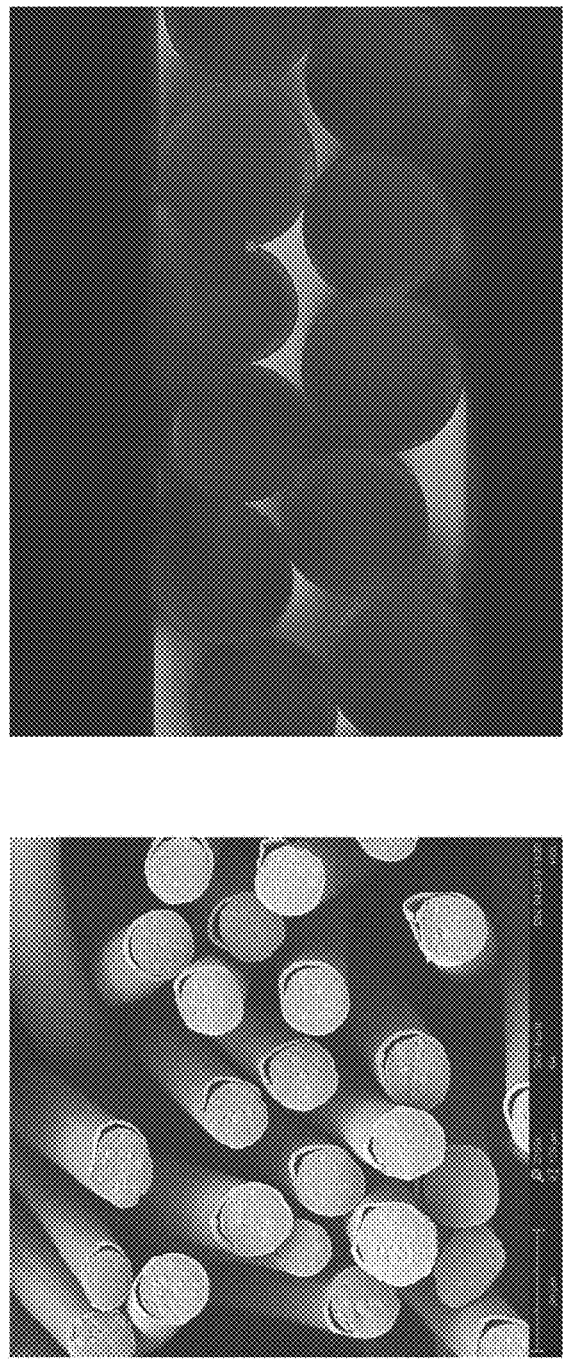
Figure 12:
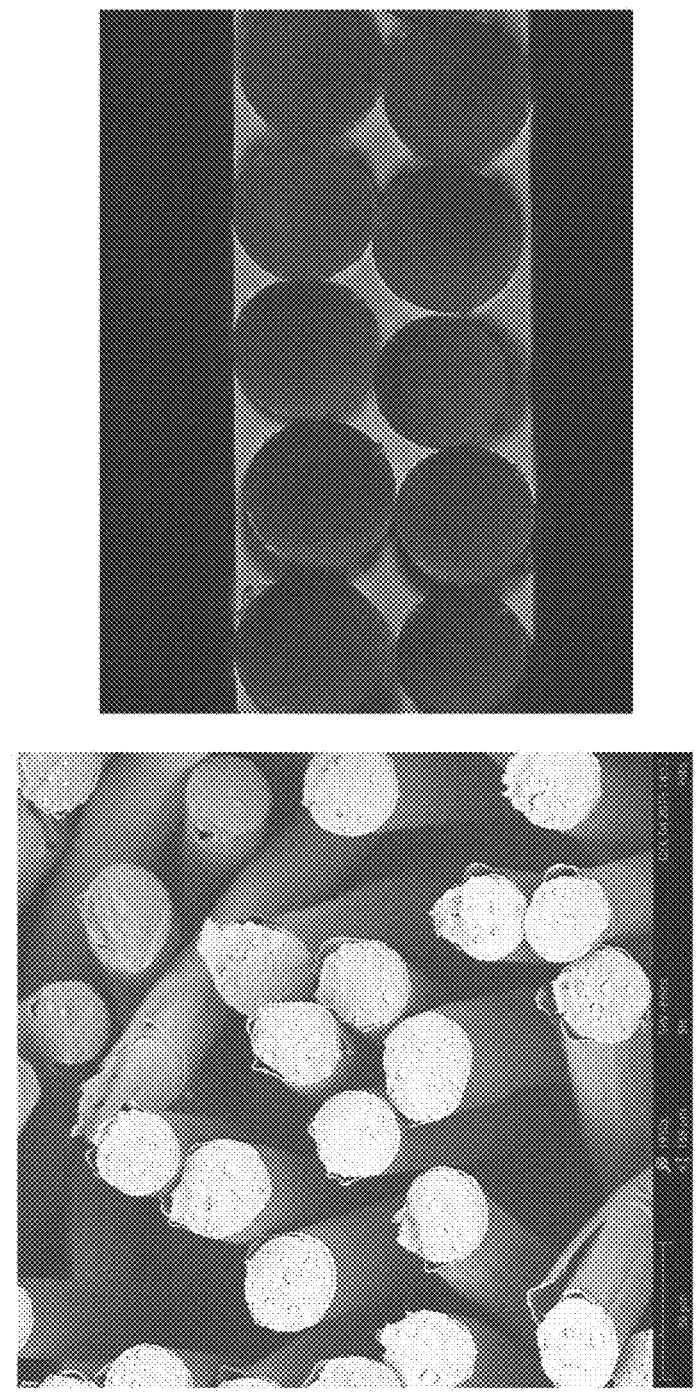
Figure 13:
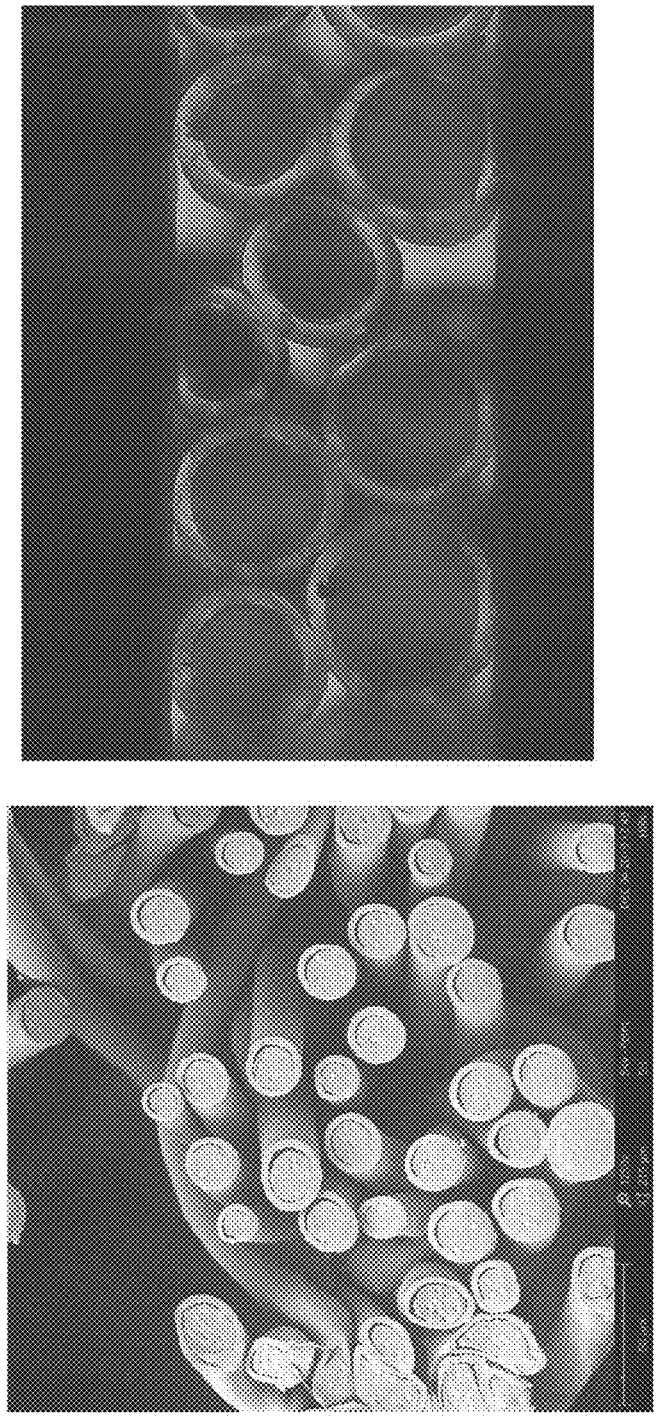
Figure 14:
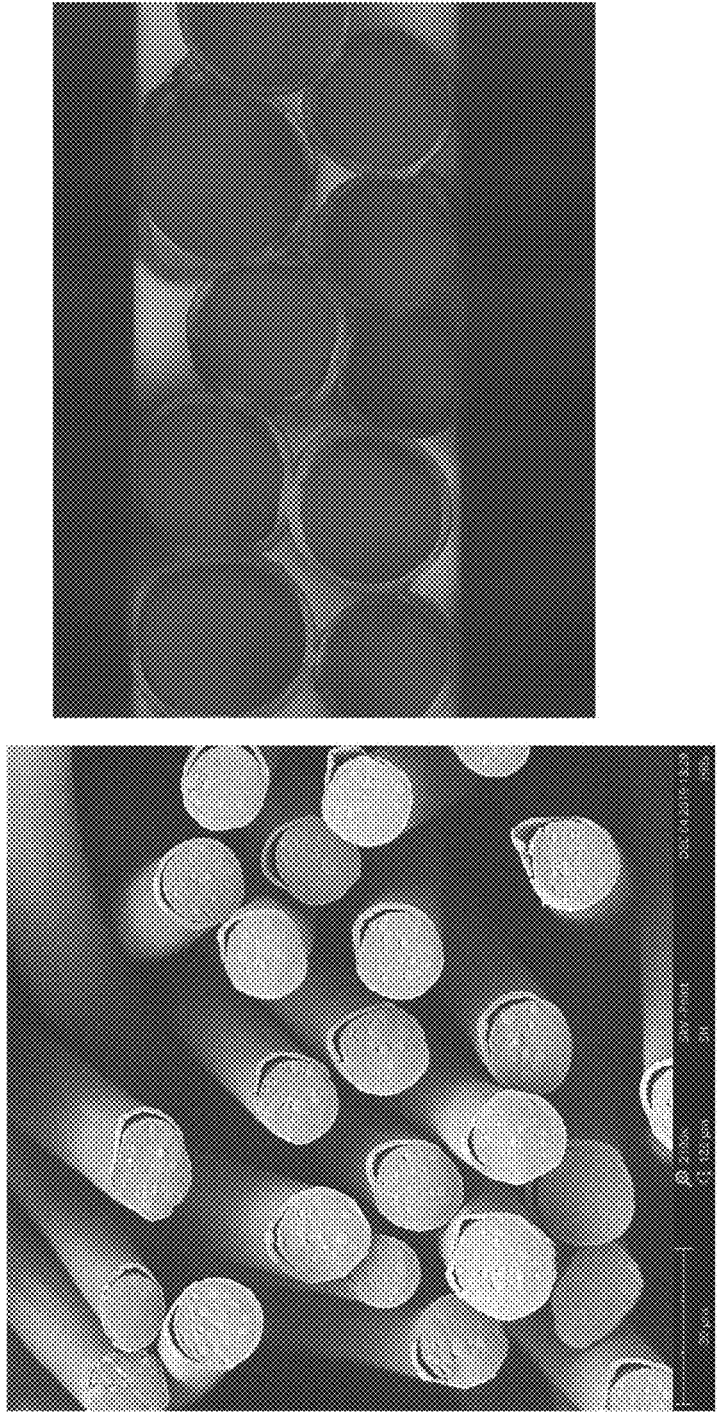
Figure 15:
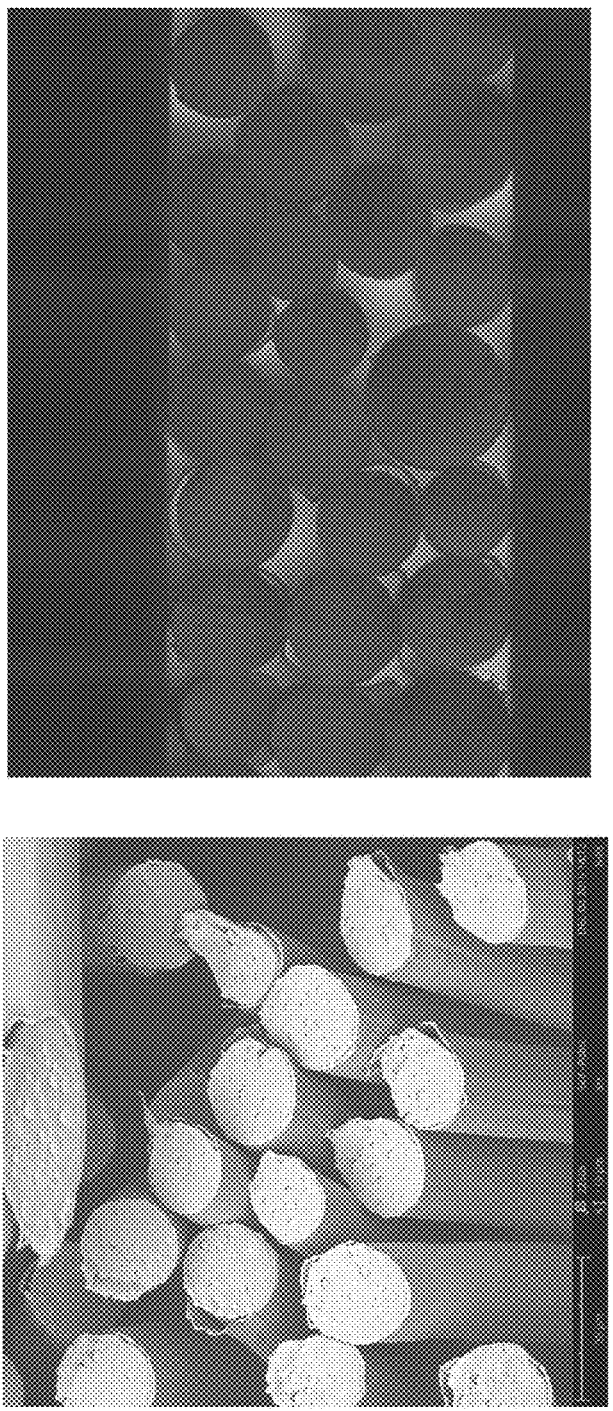
Figure 16:
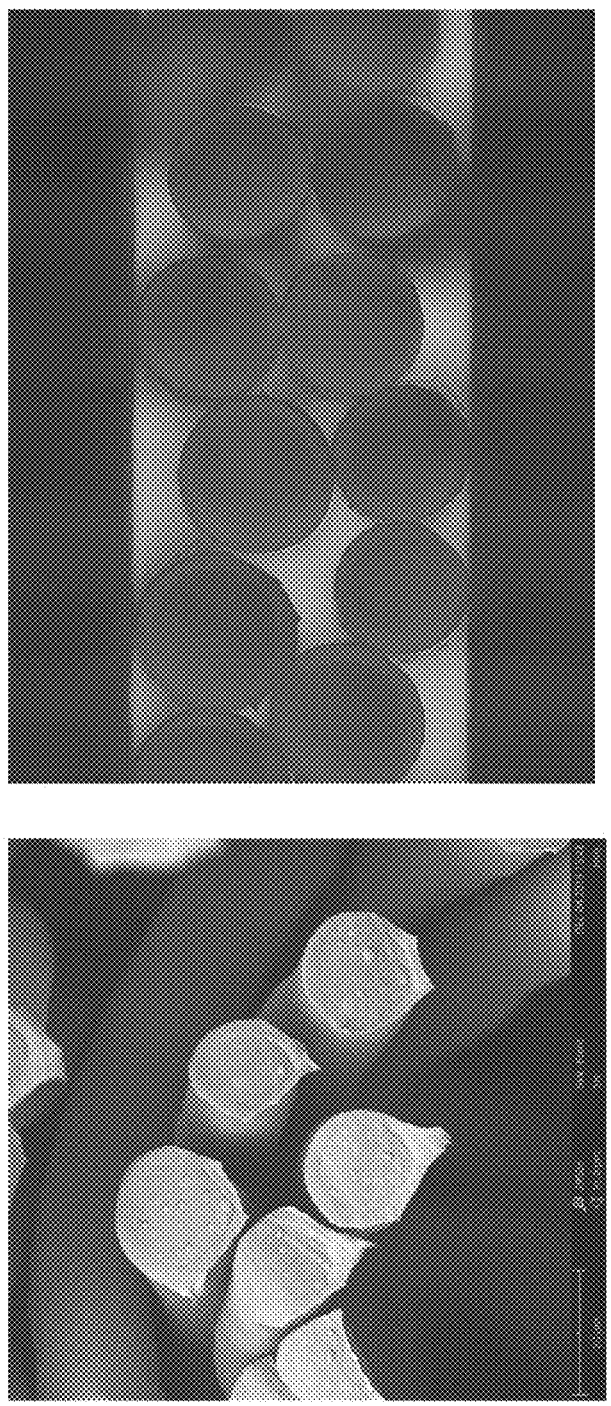
Figure 17:

1, 2 and 3 designate first, second, and third high molecular weight NuPlastiQ masterbatches. Each masterbatch included 50% of the HMW NuPlastiQ, 32%-42% 35 MFI PP, 8% compatibilizer, and 0%-10% other additives (e.g., copolymers). FIGS. 8-9 illustrate some such fibers that were formed.

Table 9 illustrates similar data as Table 8, but for the sheath/core fibers that were spun.

TABLE 9

| Formulation | Pack Pressure before spinerets (psi) | Min. or Avg. fiber diameter (μm) |
|---|---|---|
| 50% 100 MFI PP (Sheath) + 50% HMW NuPlastiQ Masterbatch[1] (Core) | C: 515; Sh: 595 | 22.5 |
| 25% 100 MFI PP (Sheath) + 75% HMW NuPlastiQ Masterbatch[1] (Core) | C: 695; Sh: 426 | 18.1 |
| 10% 100 MFI PP (Sheath) + 90% HMW NuPlastiQ Masterbatch[1] (Core) | C: 826; Sh: 380 | 19.5 |
| 50% PLA (Sheath) + 50% HMW NuPlastiQ Masterbatch[1] (Core) | C: 1090; Sh: 1217 | 23.0 |
| 25% PLA (Sheath) + 75% HMW NuPlastiQ Masterbatch[1] (Core) | C: 1118; Sh: 845 | 20.0 |
| 10% PLA (Sheath) + 90% HMW NuPlastiQ Masterbatch[1] (Core) | C: 1308; Sh: 760 | 20.0 |
| 50% PE (Sheath) + 50% HMW NuPlastiQ Masterbatch[1] (Core) | C: 1020; Sh: 1029 | 21.0 |
| 25% PE (Sheath) + 75% HMW NuPlastiQ Masterbatch[1] (Core) | C: 1113; Sh: 806 | 20.0 |
| 10% PE (Sheath) + 90% HMW NuPlastiQ Masterbatch[1] (Core) | C: 1265; Sh: 380 | 24.0 |

Bicomponent fibers can have unusual physical and aesthetic properties, which can make them a high value product compared to standard fibers. Such is often done to combine the characteristics of polymers, or to exploit differences in a property, such as melting point (e.g., by putting a lower melting point component in the sheath). Exemplary bicomponent fibers include core/sheath fibers, eccentric core/sheath fibers, side-by-side fibers, segmented pie fibers, and islands-sea fibers. Others are of course also possible. FIGS. 10-17 illustrate some of such bicomponent fibers that have been formed.

Referring to the bicomponent fibers of FIGS. 10-17, the ratio of sheath to core was varied from 50/50 to 10/90. Those skilled in the air will understand that sheath/core ratios below 10/90 are also possible, e.g., 5/95, or even thinner sheaths. Such values refer to the fraction of material (mass fraction) directed to each geometric segment (e.g., 50% of mass in sheath, 50% of mass in core, or 10% of mass in sheath, and 90% of mass in core). Assuming densities of the different feeds are approximately equal, such values may also refer to a ratio of cross-sectional area of the different geometry portions (e.g., sheath vs. core). By way of example, where a bicomponent sheath/core fiber has a diameter of about 15-20 µm (e.g., 18 µm), the core may thus have a diameter of about 13 µm for a 50/50 sheath/core ratio (sheath thickness=2.5 µm). At a 10/90 sheath/core ratio, the core may thus have a diameter of about 17 µm, while the sheath would have a thickness of 0.5 µm. While calculated for an 18 µm diameter fiber, it will be appreciated that other sizes are of course possible. More generally, the core diameter may thus be from 70-90% that of the fiber diameter, while the sheath thickness may thus be from 1-15% that of the fiber diameter. While the location of the starch-based material was in the core in the illustrated bicomponent fibers, the locations could be switched (e.g., starch-based material in the sheath). It will be apparent that in such bicomponent fibers (whether sheath/core or other geometry), the dimensions of the portion of the fiber including the high molecular starch-based material may be significantly smaller than where the entire fiber is formed from the same composition. It is surprising that the present high molecular weight starch-based compositions can be pushed or otherwise extruded through such a tiny geometry.

It is surprising and unexpected that the present Applicant was able to spin fibers from compositions including a large fraction of high molecular weight starch-based material (e.g., having a weight average molecular weight as described herein). The present examples show development of formulations using higher MFI PP homopolymers to dilute the formulation, reducing the viscosity characteristics, allowing formation of spunbond filaments or fibers containing 25% of the starch-based material, down to 17 microns, which is a suitable size for spunbond processes. In addition, the examples show the ability to coextrude such a formulation with PP, PLA, PBAT and PE in a sheath/core configuration.

It was also observed that the formulation including 25% starch-based material could be processed at 190° C. at a very high shear rate, of 6400 sec$^{-1}$, without melt fracture. Such characteristics are advantageous, as this is not possible with conventional PP materials, which exhibit melt-flow instability at such high shear rates.

Figure 18:
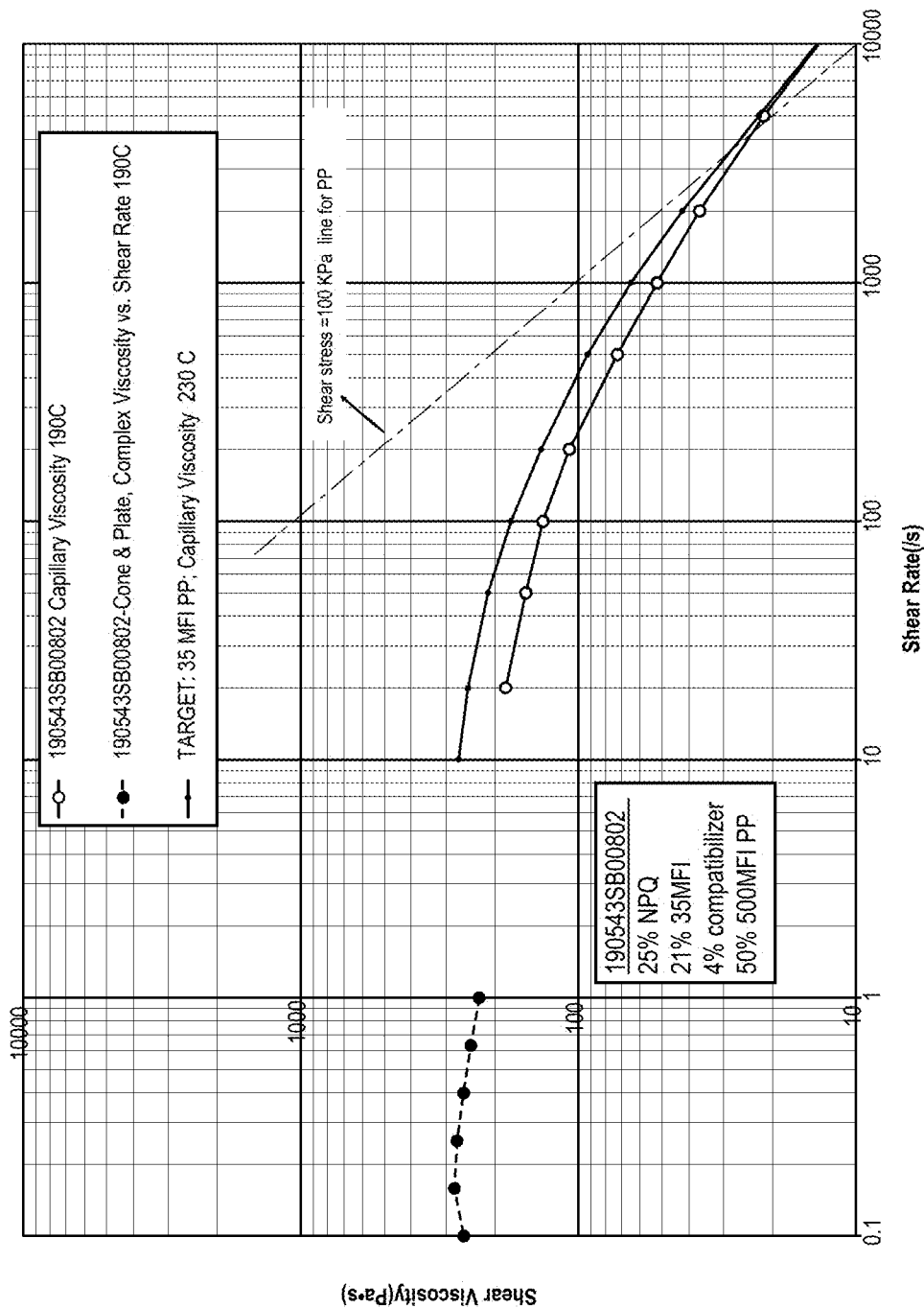
FIG. 18 shows a flow curve for an exemplary formulation including 25% of a high molecular weight starch-based material, 50% 500 MFI PP, 21% 35 MFI PP, and 4% compatibilizer, at 190° C. The low shear data was obtained using a cone and plate rheometer.

FIG. 18 shows a flow curve for an exemplary formulation including 25% of the high molecular weight starch-based material, 50% 500 MFI PP, 21% 35 MFI PP, and 4% compatibilizer at 190° C., including low shear data obtained using a cone and plate rheometer. BPI data for such formulation is shown in Table 10.

TABLE 10

| | Target (Pa · s) | Actual (Pa · s) |
|---|---|---|
| BPI (η) (at 200 sec$^{-1}$) | ≤300 | 108 |
| (η) (at 1000 sec$^{-1}$) | ≤125 | 52 |

Table 11 shows the effect of inclusion of the 500 MFI diluent component on go.

TABLE 11

| Composition | η$_0$ (Pa · s) |
|---|---|
| 100% HMW NuPlastiQ | Likely >10$^7$ |
| 25% HMW NuPlastiQ, 71% 35 MFI PP, 4% Compatibilizer | 1500 |
| 25% HMW NuPlastiQ, 50% 500 MFI PP, 21% 35 MFI PP, 4% Compatibilizer | 275 |

While the Examples show thin fiber spinning with high molecular starch-based polymer materials where a high melt flow index thermoplastic diluent material is added to decrease the shear viscosity, so as to be able to process such formulations at 190-195° C., it may also be possible to process formulations including higher concentration of the starch-based component, by increasing process temperature, or adjusting various other parameters (e.g., formulation additives), at commercial line speeds (i.e., without slowing down the line, which is incredibly costly, and should be avoided). For example, at 190° C. and below, for a 100% high molecular weight starch-based material, the shear viscosity is too high, leading to excessive pressures. In addition, elongational viscosity is too high. Elongational viscosity opposes filament drawing and causes the filaments to break right below the spinneret. It may be possible to process such formulations including 100% (or close to 100%, e.g., such as 80-100%) of the high molecular weight starch-based polymeric material at higher temperature, e.g., such as 220° C. or above, so long as degradation of the material can be avoided.

Example 2

Figure 19:
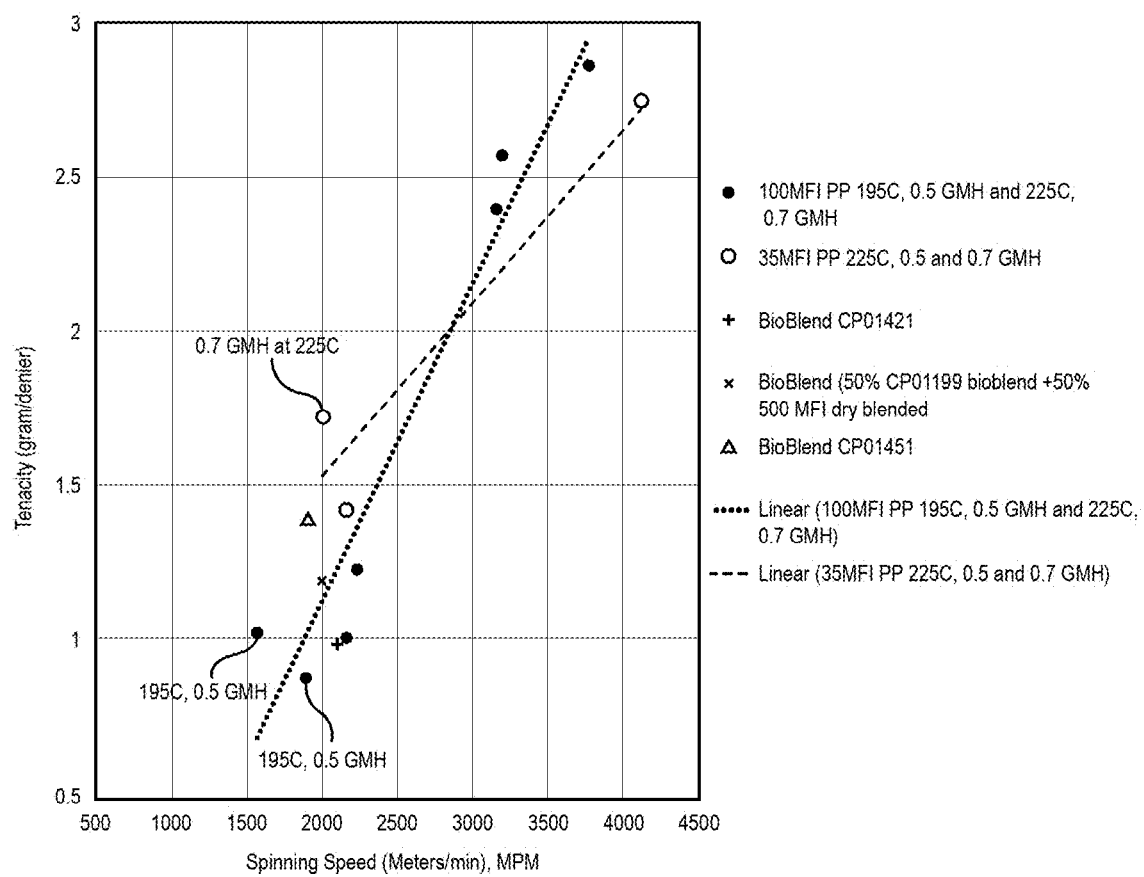
FIG. 19 shows a spinning envelope plot for exemplary polypropylene compositions, at 35 MFI, and 100 MFI, at 195° C. and 225° C.

Example 2 shows additional spunbond fiber production. FIG. 19 shows a spinning envelope plot for 100 MFI PP and 35 MFI PP, both run at 225° C. The plot also shows 100 MFI PP at 195° C. Using such data and additional gained knowledge, a tenacity target of 1.75 grams/denier (gpd) was set. It was observed that 100 MFI PP has almost identical rheology as a composition according to the present invention, formed from 25% starch-based polymeric material, 21% 35 MFI PP and 50% 500 MFI PP. As such, the 100 MFI curve can be used as a target or template for desired parameters for compositions according to the present invention, which would include the starch-based polymeric material. The data suggested that the tenacity of nonwoven fabric prepared in earlier tests was less than 0.8 gpd. In order to measure tenacity, filaments were collected just below the aspirator. The data shown in FIG. 19 indicates that a spinning speed of 2500 MPM or more, for fibers sized 18-20 µm, would be desirable. Such may be achieved with a flow through the system of 0.7 g/min/hole, or higher.

The extrusion part of the test production line was used to extrude into a feed roll, to measure tenacity. Contrary to the aspirator that depends on the inter filament friction, the feed roll provides a well-defined spinning speed. Samples were run on a homo pack at 195° C. and 0.7 g/min/hole, as well as a bico pack at slightly higher g/min/hole values. It was observed that the starch-containing formulations could be run up to about 2000 MPM, while 100 MFI PP could be run at up to 2500 MPM. A 50/50 dry blend of sample CP1199 (a starch-based polymeric material masterbatch as described herein) with 500 MFI PP as well as a 50/50 double compounded blend of sample CP1199 with 500 MFI PP (labeled sample 1421 in FIGS. 19-20) gave a tenacity of about 1.1 gpd, which is consistent with the spinning envelope shown in FIG. 19. Sample 1451 performed best, with a tenacity of 1.4 gpd. This formulation differed from sample 1421, in that in this composition some of the 500 MFI PP was replaced with 100 MFI PP. Specifically, sample 1451 included 50% of the CP1199 starch-based material masterbatch, 20% 100 MFI PP, and 30% 500 MFI PP. The main factor contributing to the improved tenacity was the reduction in the amount of low molecular weight PP (i.e., the 500 MFI PP). Of course, higher spinning speed also increases tenacity, as shown in FIG. 19.

The particular characteristics of the selected polypropylene can also affect tenacity. For example, the thermoplastic polymer with which the starch-based polymeric material is mixed may be particularly selected for its ability to decrease strain rate in spinning (e.g., resulting in a more tapered draw profile). By way of example, inclusion of such a thermoplastic polymer at 10% concentration of the blend may increase tenacity by 15%. For example, inclusion of Vistamaxx may increase tenacity to some degree (but at the expense of additional cost and higher BPI). Sample 1451 already exhibits higher BPI than sample 1421. In addition, the zero-shear viscosity of either such sample should be greater than the target, as low shear viscosity is important for drawing the fiber below the spinneret.

A summary of the rheology data for the samples on which tenacity was measured is shown below in Table 12.

TABLE 12

| | BPI (Pa · s) | $\eta_{(1000sec^{-1})}$ (Pas) | $\eta_0$ (Pa · s) |
|---|---|---|---|
| 35 MFI PP @ 230° C. (Target) | 148 | 69 | 300 |
| 100 MFI PP Control (FIG. 20) | 122 | 55 | 292 |
| Sample 1421 (50% MasterBatch/ 50% 500 MFI PP) | 126 | 58 | 275-300 |
| Sample 1451 (50% MasterBatch/ 30% 500 MFI PP/20% 100 MFI PP) | 183 | 80 | >300 |
| Sample 1450 (50% MasterBatch/ 30% 500 MFI PP/20% Vistamax) | 197 | 86 | >300 |

The copolymer was added to the blend in the extruder. As noted above, samples 1451 and 1450 nominally included similar components. Sample 1450 included a polypropylene copolymer (e.g., MFI of less than about 1000, or less than about 100 g/10 min as measured at 230° C. under a load of 2.16 kg) with both isotactic and atactic structures, to decrease strain rate in spinning (e.g., resulting in a more tapered draw profile, versus the typical neck draw of polypropylene) as compared to the polypropylene used in sample 1451.

Figure 20:
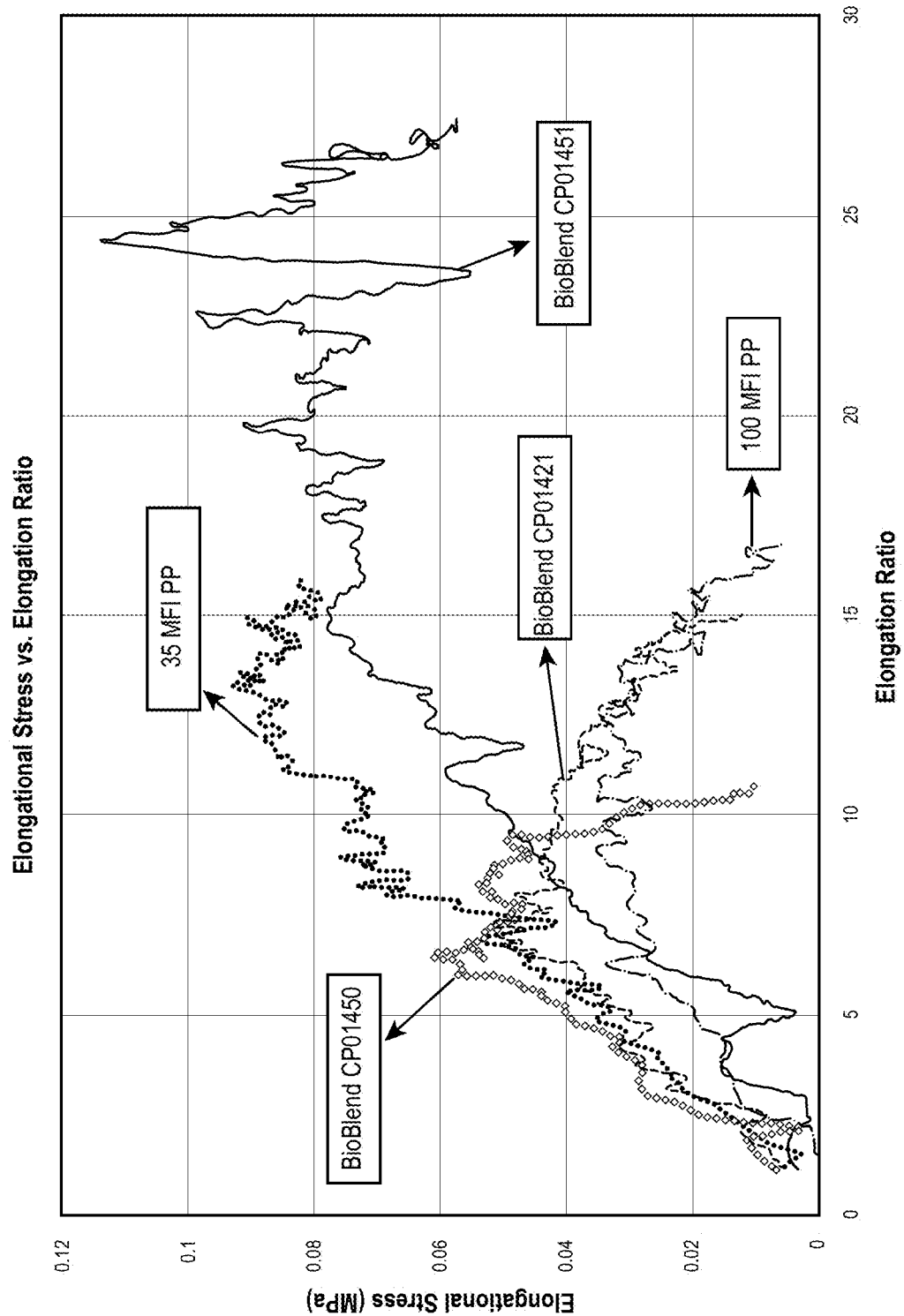
FIG. 20 shows a Rheotens plot for various exemplary and comparative compositions.

FIG. 20 shows a Rheotens plot for the various samples. The Rheotens data indicates that sample 1451 was superior to the others, although there is significant variability shown in the test data. Each sample was run 3 times, while the best of each was taken for comparison.

In addition to the benefits provided by increased sustainability provided by replacing some of the conventional thermoplastic resin material of a spinnable formulation with the present high molecular weight starch-based polymers, other benefits are also provided, by making such adjustments to the formulation. For example, extrusion rate may be improved by extending the onset of melt flow instability at higher shear rates (increased output). In addition, the rheological data indicate an advantageous high critical shear stress associated with such high molecular weight starch-based materials, which can provide an increase over the typical onset of melt flow instability. During the conducted experiments, Applicant was able to extrude at shear rates above 6400 sec$^{-1}$ at 190° C. without observable instability. Polypropylene is reported to exhibit melt flow instability at 100 kPa. For example, if the starch-based polymeric material itself may exhibit a critical shear stress of 300 kPa or more, its inclusion even at a level of 25% in a formulation being spun may result in an increase of the critical shear stress from about 100 kPa for the polypropylene composition alone to perhaps 150 kPa for the blend including the starch-based polymeric material. Such would allow processing at increased shear rates, higher line speeds, etc., without onset of melt flow instability.

Strength of nonwoven webs formed from the presently described thin fibers can be increased, e.g., through compositional adjustments, post-extrusion bonding methods employed (e.g., specifics of a calendaring or other bonding process), or adjustment of other parameters. Strength may also be increased through improved compounding (e.g., taking advantage of the high molecular weight of the starch-based material), by addition of an additive configured to increase elongation (e.g., adjuncts available under the tradename Vistamaxx, a random poly(propylene/ethylene) copolymer comprised primarily of isotactic propylene repeating units with random ethylene distribution therein, or others), increasing process temperature while reducing the amount of the highest MFI component (which may be something of a "weak link"), blending the high molecular weight starch with lower molecular weight starches (so as to be able to reduce the concentration of high melt flow index thermoplastic component), or combinations of the above.

The present embodiments may promote biodegradation of polypropylene or other non-biodegradable components of the formulation, enhance biodegradability of other materials (e.g., polyesters), may increase softness, may increase wettability and/or absorption as compared to polypropylene alone, may replace a portion of fossil-fuel resins (e.g., polypropylene) with a renewable starch-based component, and/or reduce cost.

Filament diameter uniformity was excellent, even at 16 µm. In some fibers, as shown in the Figures, bumps were observed on the exterior surface or within the formed fibers. The bumps were typically variations in diameter of 1-4 µm. Such bumps may be desirable and advantageous, in at least some embodiments. Where bumps are not desired, they may be covered (e.g., application of a sheath in a bicomponent fiber), or by adjusting various parameters described herein.

Example 3

Example 3 shows melt blown fiber production. The same or similar masterbatches as used in the spunbond examples were used to produce melt blown fibers. The masterbatches included 50% NuPlastiQ, 42% 35 MFI polypropylene, and 8% compatibilizer. The masterbatches were blended at various ratios (10/90, 20/80, 30/70, 40/60, and 50/50) up to 50:50 with 1550 MFI polypropylene, and used to produce melt blown fibers, the results of which are shown in Table 13. For the melt blown testing, 2 masterbatches were tested.

TABLE 13

| Blend | % NuPlastiQ | Diameter (µm) | Avg. Pressure (psi) | BPI |
|---|---|---|---|---|
| 1550 MFI PP | 0 | 2.64 | 61 | 11 |
| 10/90 | 5 | 4.13 | 52 | 34 |

TABLE 13-continued

| Blend | % NuPlastiQ | Diameter (μm) | Avg. Pressure (psi) | BPI |
|---|---|---|---|---|
| 20/80 | 10 | 2.21 | 67 | 58 |
| 30/70 | 15 | 3.01 | 82 | 82 |
| 40/60 | 20 | 3.94 | 122 | 105 |
| 50/50 | 25 | 2.84 | 150 | 129 |
| 50/50 | 25 | 2.39 | 187 | 180 |

The last 50/50 sample was prepared using the second masterbatch sample, while the first 50/50 sample and those samples including 5-25% NuPlastiQ were prepared using the first masterbatch sample. The melt blown line included a 31 hole spinning pack, with 0.4 mm diameter die orifice, and was run at 0.19 g/min/hole, at 205° C. polymer melt temperature, with 230° C. air. Fabrics were made from the melt blown fibers, having a fabric weight of about 18 gsm±4 gsm. As shown in Table 13, fiber diameters were from 2 to 4 μm. Grams per hole values may more generally range from 0.05 to 1 g/min/hole, or from 0.13 g/min/hole to 0.5 g/min/hole. Polymer melt temperature may more generally be less than 225° C., although above 230° C. is typical for polypropylene. The BPI values of the 2 NuPlastiQ samples are 248 and 350 Pa·s respectively, both of which are suitable for melt blown, after appropriate dilution. Machine direction (MD) tensile strength of the pure polypropylene sample (1550 MFI PP in Table 13), and the sample including 20% NuPlastiQ (40/60 in Table 13) were both measured at 1.1 kg. Elongation was measured at 13.2% and 31.5% for these samples, respectively.

Example 4

Example 4 shows yarn production. The same 1631 masterbatch as used in the melt blown example was used to produce yarn fibers. The masterbatch includes 50% NuPlastiQ, 42% 35 MFI polypropylene, and 8% compatibilizer. The masterbatch is blended with additional 35 MFI polypropylene and 100 MFI polypropylene, to provide a blend that includes 50% of the masterbatch, and 25% each of the added 35 MFI polypropylene and the 100 MFI polypropylene. The formulation includes 25% starch-based polymeric material (NuPlastiQ). The system was run at a melt temperature of 205° C., with a 72 hole spinning pack, and 0.35 mm die orifice diameter. The spinning speed in the spinning portion of the yarn process was 638 m/min, producing an as spun yarn fiber having a diameter of about 60 μm. For the drawing portion of the process, the draw temperature was 100° C., at a draw ratio of 2.8× and a winding speed of 1750 m/min. The produced fibers were 2.5 denier per filament (dpf), with a tenacity of 2.49 gpd, and an elongation of 70.38%. Such yarn fibers may be used as a precursor for production of air laid or wet laid substrates, carded nonwovens, cut or crimped fibers, for weaving, knitting, etc.

In addition to yarn production using the blends as described above, similar yarn can be produced from (1) a formulation prepared by blending 50% of the masterbatch with 50% of 100 MFI polypropylene or (2) a formulation prepared by blending 50% of the masterbatch with 50% of 35 MFI polypropylene.

Features from any of the disclosed embodiments or claims may be used in combination with one another, without limitation. It will be appreciated that the scope of the present disclosure extends to rewriting any of the claims to depend from any other claim, to include multiple dependencies from any combination of other claims, and/or to combine multiple claims together. Such also extends to any individual or combinations of features of any of the embodiments as described in the Summary section, as well as the Detailed Description section. The scope of the present disclosure extends to inserting and/or removing any feature or combination of features from any claim or described embodiment, for insertion into another claim or embodiment, or drafting of a new claim including any combination of such features from any other claim(s) or embodiments.

It will also be appreciated that the present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

The invention claimed is:

1. A method for melt blowing a composition that includes a starch-based polymeric material to produce thin fibers therefrom, the method comprising:
   providing a composition that includes a starch-based polymeric material;
   wherein the starch-based polymeric material has a crystallinity of less than about 20%, and resists recrystallization; and
   melt blowing the composition to produce fibers including the starch-based polymeric material, wherein the composition exhibits a shear viscosity of above 50 Pa·s and no more than about 200 Pa·s at 190° C. at a process shear rate of 200 $s^{-1}$, and avoids onset of melt flow instability during melt blowing.

2. The method of claim 1, wherein the composition exhibits a shear viscosity of no more than about 200 Pa·s at 190° C. at a process shear rate of 200 $s^{-1}$, and a shear viscosity of no more than about 85 Pa·s at 190° C. at a spinneret shear rate of 1000 $s^{-1}$.

3. The method of claim 1, wherein the starch-based polymeric material is a high molecular weight starch-based polymeric material having a weight average molecular weight of at least 3 million g/mol.

4. The method of claim 1, wherein the composition is a blend of the starch-based polymeric material and at least one thermoplastic polymer.

5. The method of claim 4, wherein the at least one thermoplastic polymer includes a polymer having a melt flow index as measured at 230° C. under a load of 2.16 kg, of greater than 500 g/10 min.

6. The method of claim 4, wherein the at least one thermoplastic polymer includes at least two grades of polypropylene, a first grade having a melt flow index as measured at 230° C. under a load of 2.16 kg, of 1000 g/10 min to 2000 g/10 min, and a second grade having a melt flow index as measured at 230° C. under a load of 2.16 kg of no more than 100 g/10 min.

7. The method of claim 6, wherein the at least one thermoplastic polymer further comprises an additional grade of polypropylene with both isotactic and atactic structures, having a melt flow index as measured at 230° C. under a load of 2.16 kg, of less than 1000 g/10 min.

8. The method of claim 4, wherein the at least one thermoplastic polymer includes a polymer having a melt flow index as measured at 230° C. under a load of 2.16 kg, of from 1000 g/10 min to 2000 g/10 min.

9. The method of claim 4, wherein the at least one thermoplastic polymer comprises at least one of polypropylene, polyethylene, another polyolefin, PLA, PBAT, another polyester, or a polyamide.

10. The method of claim 1, wherein the starch-based polymeric material has a water content, including any bound water, of no more than 2%.

11. The method of claim 1, wherein the method produces fibers having a diameter from about 2 μm to about 10 μm.

12. The method of claim 1, wherein the starch-based polymeric material is included in the composition in an amount of up to 60% by weight.

13. The method of claim 1, wherein the starch-based polymeric material has a weight average molecular weight of from 3 million g/mol to 20 million g/mol.

14. The method of claim 1, wherein the starch-based polymeric material is a high molecular weight starch-based polymeric material having a weight average molecular weight of at least 5 million g/mol.

15. The method of claim 1, wherein the starch-based polymeric material is included in the composition in an amount of up to 40% by weight.

16. The method of claim 1, wherein the starch-based polymeric material is included in the composition in an amount of from 1% to 35% by weight.

17. The method of claim 1, wherein the starch-based polymeric material has a weight average molecular weight of from 5 million g/mol to 16 million g/mol.

18. The method of claim 1, wherein the starch-based polymeric material has a weight average molecular weight of from 3 million g/mol to 10 million g/mol.

19. The method of claim 1, wherein the starch-based polymeric material has a weight average molecular weight of from 5 million g/mol to 7 million g/mol.

20. The method of claim 1, wherein the starch-based polymeric material has a water content no greater than 1.5% by weight, including any bound water.

21. A method for melt blowing a composition that includes a starch-based polymeric material to produce thin fibers therefrom, the method comprising:

providing a composition that includes a starch-based polymeric material, wherein the starch-based polymeric material is a high molecular weight starch-based polymeric material having a weight average molecular weight of at least 3 million g/mol;

wherein the starch-based polymeric material has a crystallinity of less than about 20%, and resists recrystallization; and melt blowing the composition to produce fibers including the starch-based polymeric material, wherein the composition exhibits a shear viscosity of no more than about 200 Pa·s at 190° C. at a process shear rate of 200 $s^{-1}$, and avoids onset of melt flow instability during melt blowing.

22. The method of claim 21, wherein the starch-based polymeric material has a water content of no greater than 2% by weight, including any bound water.

23. A method for melt blowing a composition that includes a starch-based polymeric material to produce thin fibers therefrom, the method comprising:

providing a composition that includes a starch-based polymeric material, wherein the starch-based polymeric material is a high molecular weight starch-based polymeric material having a weight average molecular weight of at least 3 million g/mol and wherein the starch-based material has a crystallinity of less than about 20%, and resists recrystallization, and has a water content no greater than 2% by weight; and melt blowing the composition to produce fibers including the starch-based polymeric material, wherein the composition exhibits a shear viscosity of above 50 Pa·s and no more than about 200 Pa·s at 190° C. at a process shear rate of 200 $s^{-1}$, and avoids onset of melt flow instability during melt blowing.

* * * * *